United States Patent
Dai et al.

(10) Patent No.: US 12,517,697 B2
(45) Date of Patent: *Jan. 6, 2026

(54) COMMUNICATION ASSISTANCE PROGRAM, COMMUNICATION ASSISTANCE METHOD, COMMUNICATION ASSISTANCE SYSTEM, TERMINAL DEVICE, AND NON-VERBAL EXPRESSION PROGRAM

(71) Applicant: Sumitomo Electric Industries, Ltd., Osaka (JP)

(72) Inventors: Guiming Dai, Osaka (JP); Toshiaki Kakii, Osaka (JP); Toshifumi Hosoya, Osaka (JP); Yasushi Nomura, Osaka (JP); Yuna Okina, Osaka (JP); Tingting Fang, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 1 day.

This patent is subject to a terminal disclaimer.

(21) Appl. No.: 18/597,974

(22) Filed: Mar. 7, 2024

(65) Prior Publication Data

US 2024/0211208 A1  Jun. 27, 2024

Related U.S. Application Data

(63) Continuation of application No. 17/630,944, filed as application No. PCT/JP2021/010187 on Mar. 12, 2021, now Pat. No. 11,960,792.

(30) Foreign Application Priority Data

Oct. 14, 2020  (JP) ................. 2020-173201

(51) Int. Cl.
  *G06F 3/16*   (2006.01)
  *G06T 13/20*  (2011.01)

(52) U.S. Cl.
  CPC .............. *G06F 3/167* (2013.01); *G06T 13/20* (2013.01)

(58) Field of Classification Search
  CPC .......... G06F 3/167; G06T 13/20; H04N 7/157
  (Continued)

(56) References Cited

U.S. PATENT DOCUMENTS 6,476,815 B1   11/2002  Ando
2005/0190188 A1  9/2005  Anzawa et al.
(Continued)

FOREIGN PATENT DOCUMENTS

CN  110036412 A  7/2019
CN  111596985 B  3/2023
(Continued)

OTHER PUBLICATIONS

Office Action issued on Apr. 5, 2022, in corresponding Japanese patent Application No. 2021-574939, 9 pages.
(Continued)

*Primary Examiner* — Stephen S Hong
*Assistant Examiner* — Broderick C Anderson
(74) *Attorney, Agent, or Firm* — XSENSUS LLP

(57) ABSTRACT

A communication assistance program is a communication assistance program assisting communication of a user, the communication assistance program causing a computer to perform a step of integrally displaying identification information that can be used for identifying a communication target and a state animation representing a state of the communication target.

20 Claims, 32 Drawing Sheets

(58) Field of Classification Search
USPC .......................................................... 715/727
See application file for complete search history.

(56) References Cited

U.S. PATENT DOCUMENTS

| | | | |
|---|---|---|---|
| 2008/0215973 A1* | 9/2008 | Zalewski | A63F 13/77 |
| | | | 715/764 |
| 2010/0164946 A1 | 7/2010 | Hyndman | |
| 2012/0130717 A1 | 5/2012 | Xu et al. | |
| 2012/0223952 A1 | 9/2012 | Kanemaru et al. | |
| 2014/0152758 A1 | 6/2014 | Tong et al. | |
| 2016/0037130 A1 | 2/2016 | Liu | |
| 2016/0335052 A1* | 11/2016 | Faaborg | G06F 3/0484 |
| 2017/0215655 A1* | 8/2017 | Ophardt | G06F 3/017 |
| 2019/0188895 A1 | 6/2019 | Miller, IV et al. | |
| 2020/0320767 A1 | 10/2020 | Al Majid et al. | |
| 2020/0320997 A1 | 10/2020 | Wagatsuma et al. | |
| 2021/0158815 A1* | 5/2021 | Lee | G06V 10/764 |

FOREIGN PATENT DOCUMENTS

| | | | | |
|---|---|---|---|---|
| JP | 2000-123191 A | 4/2000 | | |
| JP | 2000-184345 A | 6/2000 | | |
| JP | 2002-091642 A | 3/2002 | | |
| JP | 2002-358146 A | 12/2002 | | |
| JP | 2003-106846 A | 4/2003 | | |
| JP | 2003-323628 A | 11/2003 | | |
| JP | 2005-216149 A | 8/2005 | | |
| JP | 2007-272533 A | 10/2007 | | |
| JP | 2012-181704 A | 9/2012 | | |
| JP | 2015-038725 A | 2/2015 | | |
| JP | 2015-092347 A | 5/2015 | | |
| JP | 2020-501210 A | 1/2020 | | |
| JP | 2020-021025 A | 2/2020 | | |
| JP | 2020-144712 A | 9/2020 | | |
| WO | WO-2011136786 A1 * | 11/2011 | ........... | G06Q 10/101 |
| WO | 2018/102007 A1 | 6/2018 | | |
| WO | 2018/158852 A1 | 9/2018 | | |
| WO | 2018/212802 A1 | 11/2018 | | |
| WO | 2018/213500 A1 | 11/2018 | | |
| WO | 2020/204000 A1 | 10/2020 | | |

OTHER PUBLICATIONS

Decision to Grant a Patent issued on Nov. 8, 2022, in corresponding Japanese patent Application No. 2021-574939, 6 pages.
Hazime Akedo, et al., "Development of Rabbit-Type Pet Robot for Soothing People", The Robotics Society of Japan, Sep. 7, 2016, 5 pages. (with Partial English Translation).

* cited by examiner

*Fig.15*

| TYPE | PHONE CALL SCREEN |
|---|---|
| A | |
| B | |

*Fig.16*

| TYPE | PHONE CALL SCREEN |
|---|---|
| A | |
| B | |

COMMUNICATION ASSISTANCE PROGRAM, COMMUNICATION ASSISTANCE METHOD, COMMUNICATION ASSISTANCE SYSTEM, TERMINAL DEVICE, AND NON-VERBAL EXPRESSION PROGRAM

CROSS-REFERENCE TO RELATED APPLICATIONS

The present application is a continuation of U.S. application Ser. No. 17/630,944, filed Jan. 28, 2022, which is based on PCT filing PCT/JP2021/010187, filed Mar. 12, 2021, which claims priority to JP 2020-173201, filed Oct. 14, 2020, the entire contents of each are incorporated herein by reference.

TECHNICAL FIELD

One aspect of the present disclosure relates to a communication assistance program, a communication assistance method, a communication assistance system, a terminal device, and a non-verbal expression program.

BACKGROUND ART

Regarding communication using a computer, for example, Japanese Unexamined Patent Publication No. 2015-38725 (Patent Literature 1) discloses a speech animation generating device that generates a face image by generating a visual sense element series by gradually performing voice recognition on a voice signal using an acoustic model, a language model, and a correspondence table of a plurality of phonemes and a plurality of visual sense elements that are prepared in advance, generating mixture weights for the plurality of visual sense elements by smoothing the visual sense element series, and mixing a plurality of face models corresponding to each of the plurality of visual sense elements in accordance with the mixture weights for the plurality of visual sense elements.

CITATION LIST

Patent Literature

[Patent Literature 1] Japanese Unexamined Patent Publication No. 2015-38725

SUMMARY OF INVENTION

According to one aspect of the present disclosure, there is provided a communication assistance program assisting communication of a user, the communication assistance program causing a computer to perform a step of integrally displaying identification information that can be used for identifying one or a plurality of communication targets and a state animation representing a state of the communication target.

BRIEF DESCRIPTION OF DRAWINGS

FIG. 15 is a diagram illustrating an example of a screen displayed for a user.

FIG. 16 is a diagram illustrating an example of a screen displayed for a user.

FIG. 17 is a diagram illustrating an example of a screen displayed for a user.

FIG. 18 is a diagram illustrating an example of a screen displayed for a user.

DESCRIPTION OF EMBODIMENTS

Figure 1:
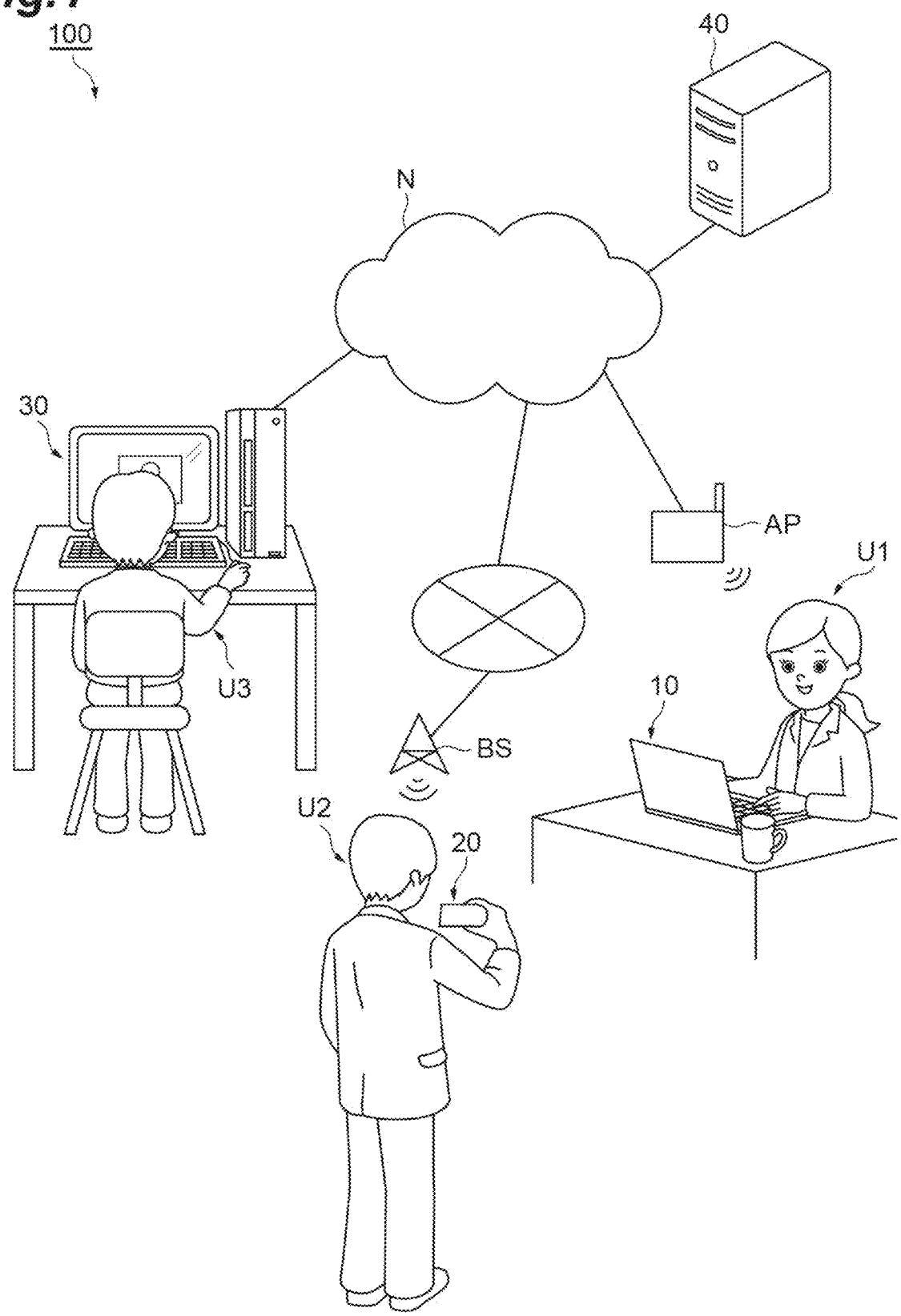
FIG. 1 is a diagram illustrating an example of a schematic configuration of a communication assistance system according to a first embodiment.

Problem to be Solved by Present Disclosure

In recent years, telework has increased, and opportunities to perform a video conference (a web conference) are increasing. When a video conference is used, there are cases in which participation in a conference is performed using only voices without using a camera from a point of view of communication environments (a band limitation and the like) and privacy. In such cases, icons of users participating in the conference and the like are displayed on a terminal of each user. For this reason, it is difficult to recognize (perceive) a state/situation such as whether a phone call partner shows interest in speech generation or the like. For this reason, it is difficult to achieve smooth communication.

An object of one aspect of the present disclosure is to provide a communication assistance program, a communication assistance method, a communication assistance system, a terminal device, and a non-verbal expression program capable of realizing smooth communication.

Effect of Present Disclosure

According to one aspect of the present disclosure, smooth communication can be realized.

Description of Embodiment of Present Disclosure

First, details of embodiments of the present disclosure will be listed and described. At least some of the embodiments described below may be arbitrarily combined.

According to one embodiment of the present disclosure, there is provided a communication assistance program assisting communication of a user, the communication assistance program causing a computer to perform a step of integrally displaying identification information that can be used for identifying one or a plurality of communication targets and a state animation representing a state of the communication target.

In the communication assistance program according to one embodiment of the present disclosure, the identification information and the state animation representing a state of the communication target are integrally displayed. In this way, the communication assistance program can recognize the state of the communication target. Thus, the communication assistance program can realize smooth communication.

In one embodiment, the state animation may be an animation that expresses the state of the communication target in a form different from an actual operation part of the communication target. In such a configuration, by forming an animation expressed (rendered) in a different form, a simple animation can be formed. For this reason, a user can easily perceive the state of the communication target.

In one embodiment, the state animation may be displayed on an outer side of a display area of the identification information to protrude from the display area. In such a configuration, the identification information and the state animation can be clearly differentiated, and the operation of the state animation can be easily understood.

In one embodiment, the state animation may be displayed in the vicinity of a display area of the identification information to accompany the display area. In such a configuration, the identification information and the state animation can be clearly differentiated, and the operation of the state animation can be easily understood.

In one embodiment, a display form of the state animation may be transformed in accordance with the state of the communication target. In such a configuration, by transforming the state animation, a variation for expressing the state of the communication target can be increased. Thus, the state of the communication target can be perceived more accurately.

In one embodiment, the state animation may be an animation imitating ears and operate in accordance with a change in the state of the communication target. For example, in a case in which the state animation is a face animation of the communication target, changes in feelings and the like need to be read from delicate changes in the face on the screen. In addition, since operations of various parts of the face animation need to be focused on, it is not easy to perceive the state of the user. In one embodiment, since a change in the state of the user is expressed using the operation of the state animation imitating ears, only the state animation may be focused on. Thus, the state of the communication target can be easily perceived.

In one embodiment, the identification information, the state animation, and an animation that operates in accordance with a change in the state of the communication target and imitates at least one of an arm, a hand, and a leg may be integrally displayed. In this way, since an animation imitating at least one of the arm, the hand, and the leg is displayed in addition to the ears, the state of the communication target can be perceived more accurately.

In one embodiment, an operation of the state animation may be changed in accordance with an attribute of the communication target. In such a configuration, by changing the operation of the state animation, for example, in accordance with an attribute such as nationality, occurrence of misunderstanding according to a difference in culture can be avoided. In this way, various different cultures can be handled, and thus smooth communication can be realized.

In one embodiment, the state animation may be operated on the basis of at least one of a set operation strength and an operation speed. In such a configuration, for example, even in a case in which the user is poor at expressing feelings, by appropriately setting the operation strength and the operation speed, the user's state can be conveyed more strongly. Thus, the state can be effectively conveyed to a partner.

In one embodiment, the identification information may include at least one of an image representing the communication target and text representing the communication target. In such a configuration, the communication target can be recognized at a glance.

In one embodiment, the state animation may operate in accordance with at least one of a feeling of the user, an operation of the user, a voice of the user, a feeling of the communication target, an operation of the communication target, and a voice of the communication target. In such a configuration, the feeling and the operation of the communication target can be recognized.

In one embodiment, the state animation may operate in accordance with a conversation state between the user and the communication target. In such a configuration, the state animation can be operated in accordance with a conversation state between the user and the communication target. In accordance with this, for example, in a case in which the communication target is an AI assistant, the state animation of the communication target can be operated for words spoken by the user.

In one embodiment, predetermined words and an operation pattern of the state animation are associated with each other, and in a case in which the predetermined words are spoken, the state animation may be operated on the basis of the operation pattern associated with the predetermined words. In such a configuration, predetermined words (including text and voice) and the operation pattern of the state animation are associated with each other in advance, and thus the state animation that is appropriate for the state of the user can be displayed accurately and quickly.

In one embodiment, the operation pattern may be selected from at least one of a standard operation pattern set in advance and a generation pattern generated in advance and be associated with the predetermined words. In such a configuration, the operation pattern of the state animation can be arbitrarily set.

In one embodiment, the state animation may operate in accordance with an input from the communication target. In such a configuration, the state animation can be operated by performing a key operation or the like on the communication target (for example, a phone call partner), and thus the state of the communication target can be perceived more accurately.

In one embodiment, the input may include a detection result acquired by a wearable sensor. In such a configuration, the state animation operates in accordance with a detection result acquired by the wearable sensor. For this reason, an actual operation of the communication target can be reflected in the state animation.

In one embodiment, the input may include an operation result for a device operated by the communication target, and the operation of the state animation may be changed in accordance with an operation time of the device. In such a configuration, the state of the communication target can be reflected in the state animation more accurately. For this reason, the state of the communication target can be perceived more accurately.

In one embodiment, at least one of a pictograph, an image, and text set in advance may be integrally displayed with the state animation. In such a configuration, the state of the communication target can be perceived more accurately using pictographs and the like.

In one embodiment, a character may be composed of a body in which the identification information is displayed and the state animation, and the character drawn using three-dimensional computer graphics may be displayed. In such a configuration, the state of the communication target is displayed using a three-dimensional character, and thus the state of the communication target can be perceived more accurately.

In one embodiment, a shadow may be displayed in the character, and the shadow displayed on the character may be changed in accordance with the state of the communication target. In such a configuration, the state of the communication target is expressed using a shadow, and thus the state of the communication target can be perceived more accurately.

In one embodiment, an observation point of view of a space in which the character is displayed may be changed in accordance with an operation of the user. In such a configuration, the user can freely change the observation point of view.

In one embodiment, at least one of a position and a size of the character may be changed in accordance with at least one of an operation of the user and a voice of the user. In such a configuration, the user can freely change the position and the size of the character.

In one embodiment, information relating to a visual line of at least one of the user and the communication target that are detected using a sensor, the identification information, and the state animation may be integrally displayed. In such a configuration, the visual line of the user or the communication target can be checked.

In one embodiment, the information relating to the visual line may include visual line transmission information indicating that the visual line of the user is present in a predetermined area including the identification information and the state animation, and the visual line transmission information, the identification information, and the state animation may be integrally displayed. In such a configuration, it can be checked that the user's visual line is facing the communication target.

In one embodiment, the information relating to the visual line may include visual line reception information indicating that the visual line of the communication target is present in a predetermined area including the identification information of the user and the state animation, and the visual line reception information, the identification information, and the state animation may be integrally displayed. In such a configuration, the visual line of the communication target can be checked.

In one embodiment, the computer may be caused to perform a step of estimating the state of the communication target on the basis of at least one of voice data of the communication target detected by a sensor and appearance data representing an appearance of the communication target detected by a sensor, a step of generating control data used for controlling an operation of the state animation on the basis of the state of the communication target, and a step of outputting the control data. In such a configuration, since control data for controlling operations of the state animation is output, a volume of data output (transmitted) from the terminal can be configured to be smaller than that of a case in which all the data relating to the states of the communication target is output. For this reason, even in a communication environment in which a communication speed is low, or data communication of a large volume cannot be performed, smooth communication can be realized in a phone call performed using the terminal.

In one embodiment, the computer may be caused to perform: a step of estimating the state of the communication target on the basis of at least one of voice data of the communication target detected by a sensor and appearance data representing an appearance of the communication target detected by a sensor; and a step of outputting state data relating to the estimated state of the communication target. In such a configuration, reduction of the processing load in the terminal can be achieved.

In one embodiment, a form of the operation of the state animation may be set on the basis of at least one of the voice data and the appearance data. In such a configuration, the form of the operation of the state animation corresponding to the state of the communication target can be appropriately set.

In one embodiment, a speed of the operation of the state animation may be set on the basis of at least one of the voice data and the appearance data. In such a configuration, the speed of the operation of the state animation corresponding to the state of the communication target can be appropriately set.

In one embodiment, in the step of estimating the state of the communication target, the state of the communication state may be estimated using a learned model, and when at least one of the voice data and the appearance data is input, the learned model may output the state of the communication target. In such a configuration, the state of the communication target can be estimated with high accuracy.

In one embodiment, the computer may be caused to perform a step of integrally displaying a speech generation animation that is based on voice data of a speaker and is different from the state animation with the identification information of the speaker, and the speech generation animation may operate in accordance with a speech generation form of the speaker. In such a configuration, the speaker can be recognized at a glance, and the speech generation state of the speaker can be recognized using the speech generation animation.

In one embodiment, the computer may be caused to perform a step of integrally displaying the identification information that can be used for identifying the user and the state animation representing the state of the user. In such a configuration, the user can check his or her state animation. In addition, the state animations of the user and the communication target are displayed together, and thus an impression of the user and the communication target being present in the same space can be given, and a conversation having a sense of presence and a sense of unity can be realized. As a result, smooth communication can be realized.

In one embodiment, the identification information of the communication target and the state animation of the communication target and the identification information of the user and the state animation of the user may be displayed with the same size. In such a configuration, by performing display with the same size, an impression of the user and the communication target being present in the same space can be further given, and thus a conversation having a sense of presence and a sense of unity can be realized.

In one embodiment, a character that is composed of a body in which the identification information is displayed and the state animation and is drawn using three-dimensional computer graphics may be displayed, and in a case in which a plurality of communication targets are present, the character of the user may be displayed to be on a rear side. In such a configuration, the state animation of the character of the communication target can be easily viewed, and thus the state of the communication target can be perceived accurately.

In one embodiment, a character that is composed of a body in which the identification information is displayed and the state animation and is drawn using three-dimensional computer graphics may be displayed, and the character may be operated on the basis of information relating to visual lines of the user and the communication target detected using a sensor, voices of the user and the communication target, and an operation performed by the user. In such a configuration, the character operates in accordance with the visual line and calling of the user or the like. Thus, a conversation having a sense of unity can be realized.

In one embodiment, the character of the user and the character of the communication target may be operated to face each other. In such a configuration, a conversation is performed with characters facing each other, and thus a conversation having a sense of unity can be realized.

In one embodiment, the identification information and the state animation may be displayed in a cyber space. In such a configuration, the identification information and the state animation can be displayed in a cyber space (virtual space) realized in virtual reality (VR), augmented reality (AR), mixed reality (MR), or the like.

In one embodiment, the state animation may be operated as basic biological presence information of the communication target. In such a configuration, for example, even in a case in which the communication target is not generating speech or operating, the presence of the communication target can be conveyed using the operation of the state animation. For this reason, the user can be notified of the presence of the communication target.

In one embodiment, the communication target may be an AI assistant that operates using artificial intelligence. In such a configuration, smooth communication with the AI assistant can be realized.

In one embodiment, the state animation may not include a facial expression that dynamically changes. Like an avatar, when the state animation is generated to imitate the face of the communication target or the like and is expressed as a facial expression that dynamically changes, there is an uncanny valley effect. In addition, in a case in which a facial expression that dynamically changes is included, a large transmission volume is necessary. In contrast to this, the state animation does not include a facial expression that dynamically changes, and thus an uncanny impression is not given. In addition, the transmission volume can be decreased.

In one embodiment, a color of the state animation may be changed in a case in which the communication target is silent. In such a configuration, it can be recognized using the state animation that the communication target is silent due to being in through or the like.

In one embodiment, a use status of an operation pattern used in the state animation may be displayed at a predetermined timing. In such a configuration, by displaying a use status (a use history) of operation patterns of the state animation at a predetermined timing (for example, during communication or after the end of communication), a trend of reactions of the user and the communication target and the like can be checked.

In one embodiment, at least one of a use ratio of the operation pattern in the user and the communication target and a change in a use frequency of the operation pattern corresponding to a time axis may be displayed as the use status. In such a configuration, the use status can be checked in various forms.

According to one embodiment of the present disclosure, there is provided a communication assistance method for assisting communication of a user, the communication assistance method including a step of integrally displaying identification information that can be used for identifying a communication target and a state animation representing a state of the communication target.

In the communication assistance method according to one embodiment of the present disclosure, the identification information and the state animation representing a state of the communication target are integrally displayed. In this way, in the communication assistance method, the state of the communication target can be recognized. Thus, the communication assistance method can realize smooth communication.

According to one embodiment of the present disclosure, there is provided a communication assistance system assisting communication of a user, the communication assistance system including a control unit configured to integrally display identification information that can be used for identifying a communication target and a state animation representing a state of the communication target.

In the communication assistance system according to one embodiment of the present disclosure, the identification information and the state animation representing a state of the communication target are integrally displayed by the control unit. In this way, in the communication assistance system, the state of the communication target can be recognized. Thus, the communication assistance system can realize smooth communication.

According to one embodiment of the present disclosure, there is provided a terminal device assisting communication of a user, the terminal device including a control unit configured to integrally display identification information that can be used for identifying a communication target and a state animation representing a state of the communication target.

In the terminal device according to one embodiment of the present disclosure, the control unit integrally displays the identification information and the state animation representing a state of the communication target. In this way, the terminal device can recognize the state of the communication target. Thus, the terminal device can realize smooth communication.

DETAILS OF EMBODIMENT OF PRESENT DISCLOSURE

Specific examples of embodiments of the present disclosure will be described below with reference to the drawings. The present disclosure is not limited to such examples, but is defined by the claims and is intended to include all changes within meanings and scopes equivalent to the claims. In description of the drawings, the same reference signs will be assigned to the same elements, and duplicate description thereof will be omitted.

First Embodiment

FIG. 1 is a diagram illustrating an example of a schematic configuration of a communication assistance system (which may be simply referred to hereinafter as a "system") according to a first embodiment. A system 100 is a computer system that assists communication. Examples of communication are a video conference, a diagnosis, counseling, an interview (an evaluation of a person), telework, and the like accompanying a phone call with other users.

<Configuration of System>

The system 100 includes a terminal (a terminal device) 10, a terminal 20, and a terminal 30. In the example illustrated in FIG. 1, the terminal 10 is a personal computer (PC) of a laptop type that is used by a user U1. The terminal 20 is a portable phone (a smartphone or the like) that is used by a user U2. The terminal 30 is a PC of a desktop type that is used by a user U3. The terminal 10, the terminal 20, and the terminal 30 are connectable to a network N. In this example, the terminal 10 is connected to the network N through an access point AP, the terminal 20 is connected to the network N through a base station BS, and the terminal 30 is connected to the network N using lines (not illustrated). As the terminal 10, the terminal 20, and the terminal 30, a tablet terminal, a wearable terminal, a head mount display (HMD) terminal, and any of various terminals other than the PC and the portable telephone described above may be used. The number of terminals included in the system 100 is not limited to that of the example illustrated in FIG. 1.

The system 100 includes a server 40. The server 40 is connected to the network N. Thus, the terminal 10, the terminal 20, the terminal 30, and the server 40 can communicate with each other through the network N. The number of servers included in the system 100 is not limited to that of the example illustrated in FIG. 1.

The configuration of the network N is not particularly limited. For example, the network N may be configured to include the Internet (a public network), a communication carrier network, an enterprise network, and the like.

Figure 2:
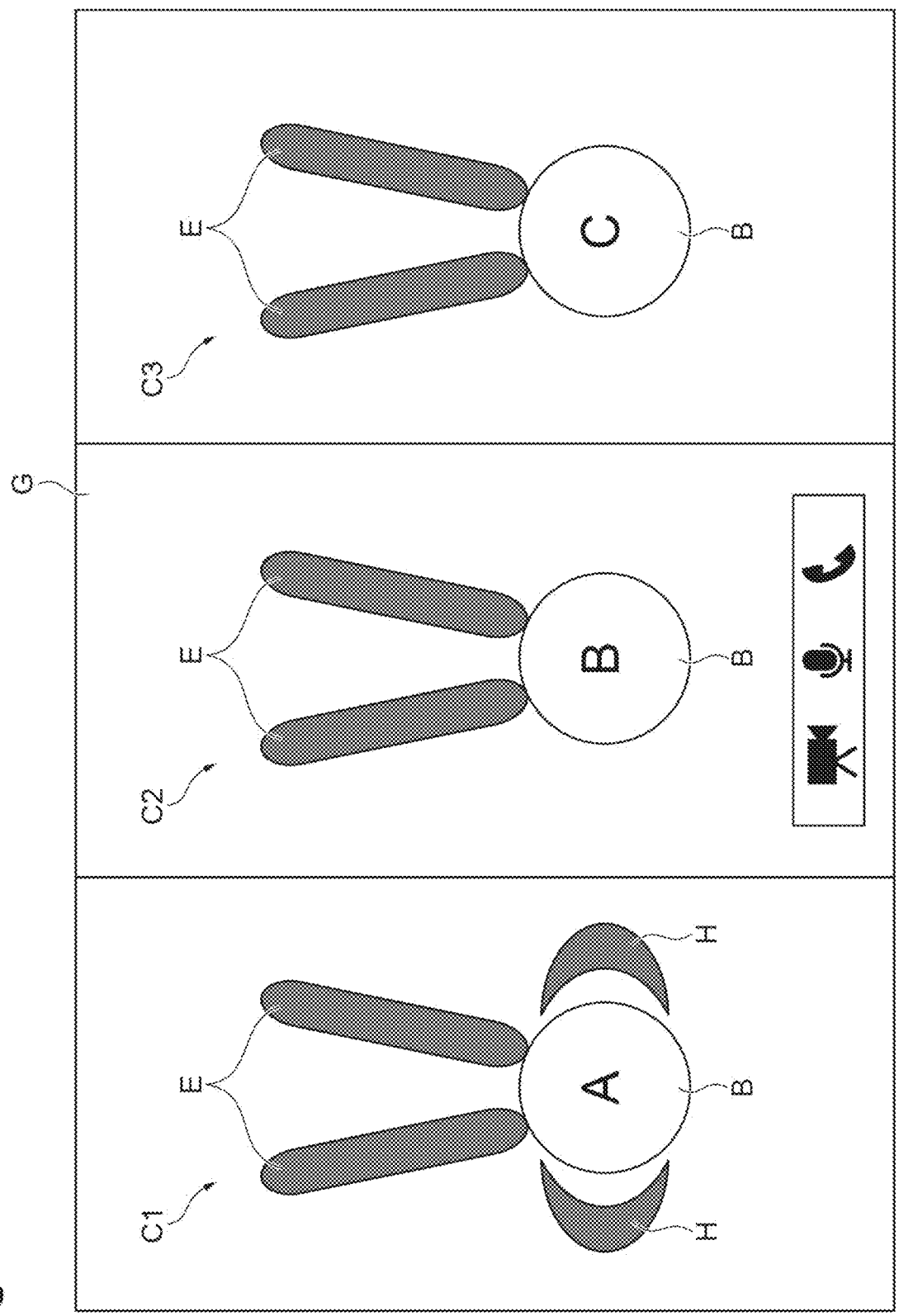
FIG. 2 is a diagram illustrating an example of communication provided by the communication assistance system according to the first embodiment.

FIG. 2 is a diagram illustrating an example of communication provided by the system 100. The communication is performed on a phone call screen G (an output unit 15) represented on a computer. The phone call screen G is displayed in the terminal 10, the terminal 20, and the terminal 30, thereby being respectively presented to the user U1, the user U2, and the user U3. The users U1, U2, and U3 are mutual communication targets. In the example illustrated in FIG. 2, a character C1 of the user U1, a character C2 of the user U2, and a character C3 of the user U3 appear on the phone call screen G as participants in the communication. FIG. 2 illustrates that the user U1 is in a speech generation state.

The characters C1, C2, and C3 respectively represent the users U1, U2, and U3 on the phone call screen G. The characters C1, C2, and C3 are dynamic characters. The characters C1, C2, and C3 are generated using image materials that are independent from actual images (captured data or the like) of the users U1, U2, and U3. The image materials are materials used for generating an animation character. The characters C1, C2, and C3 may be drawn using two-dimensional or three-dimensional computer graphics (CG).

Each of the characters C1, C2, and C3 is configured to include an icon B and an ear animation E. In each of the characters C1, C2, and C3, the icon B and the ear animation E are integrally displayed on the phone call screen G. Being integrally displayed represents that the icon B and the ear animation E are visually recognized as one entity when each of the characters C1, C2, and C3 are seen. In other words, being integrally displayed may be a state in which the icon B and the ear animation E can be recognized at a glance as being combined (being in correspondence with each other) at a glance. For this reason, being integrally displayed may be a state in which the icon B and the ear animation E are in contact with each other or a state in which the icon B and the ear animation E are separated from each other.

The icon B is identification information that can be used for identifying a user who is a phone call partner. The icon B includes at least one of an image representing a user and text representing the user. In the example illustrated in FIG. 2, the icon B represents a circular shape and includes text ("A," "B," or "C") that can be used for identifying a user. The text is displayed in a display area of the icon B. In this embodiment, the display area can be regarded to represent a circular shape. In this embodiment, for example, "A" in the display of the icon B represents the user U1, "B" in the display of the icon B represents the user U2, and "C" in the display of the icon B represents the user U3. The shape of the icon B may be another shape. The icon B may include an image (a face photograph or the like) set by a user. The icon B may be freely selected and set by a user.

The ear animation E is a state animation that represents a state of the user. The state animation is an animation representing a state of a user in a form different from that of an actual operation part of the user. The state animation does not include a facial expression that continuously changes dynamically. In other words, the state animation does not include a facial expression that changes in accordance with a state of a user. The state animation is displayed to protrude from a display area on the outer side of the display area of the icon B. The ear animation E is an animation imitating ears of an animal (for example, a rabbit or the like) and operates in accordance with a change in the state of a user. The ear animation E operates in accordance with at least one of a feeling and an operation of a user. For example, a feeling of a user is happiness, surprise, or the like. For example, an operation of a user is a visual line (movement of a visual line), a posture, a gesture, an expression, or the like. The ear animation E, for example, performs an operation of expansion/contraction, bending, shaking, or the like.

The character C1 (C2 and C3) is configured to further include a speech generation animation H. In the character C1 (C2 and C3), the icon B, the ear animation E, and the speech generation animation H are integrally displayed on the phone call screen G. The speech generation animation H is an animation that is based on voice data of a speech generating person (speaker). The speech generation animation H operates in accordance with a speech form of a speech generating person. The speech generation animation H, for example, performs an operation of horizontally expanding/contracting.

Figure 3:
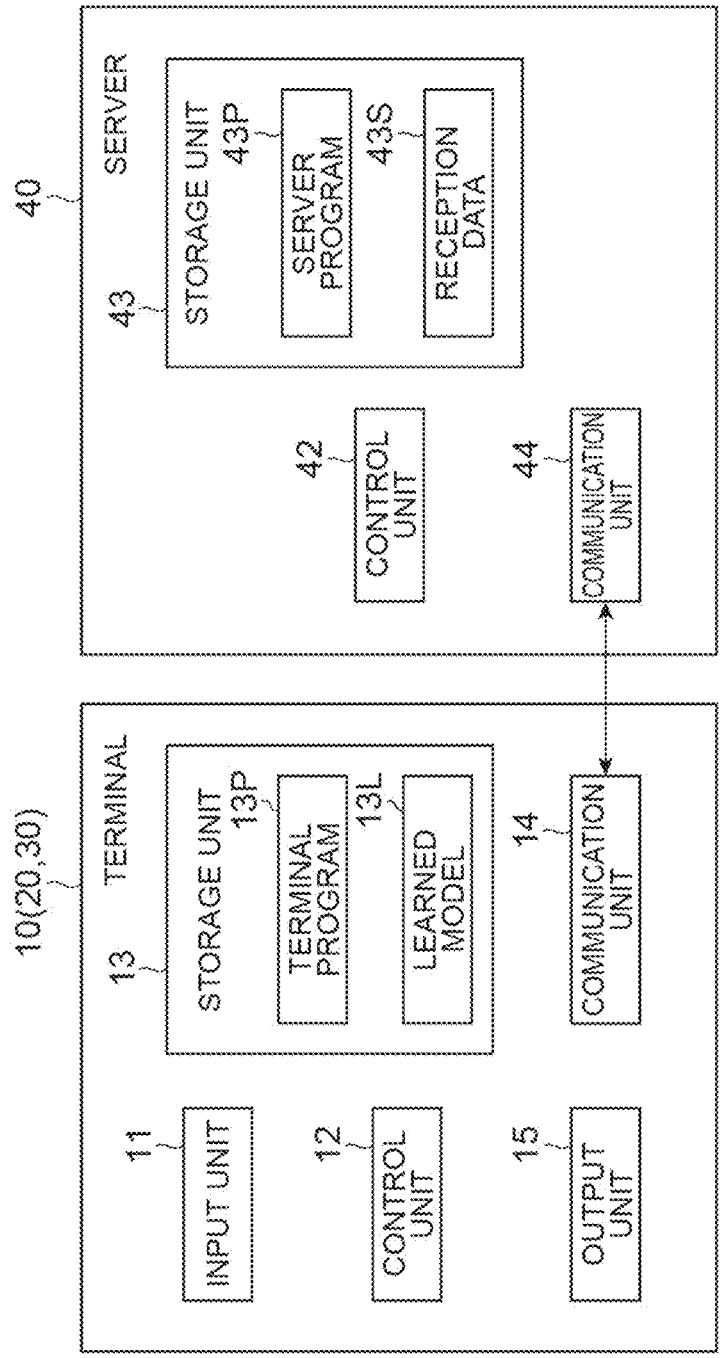
FIG. 3 is a diagram illustrating an example of functional blocks of a terminal and a server.

FIG. 3 is a diagram illustrating an example of functional blocks of the terminal 10, the terminal 20, the terminal 30, and the server 40. The functional blocks of the terminal 20 and the terminal 30 are similar to the functional blocks of the terminal 10, and thus the terminal 10 and the server 40 will be described hereinafter. First, the terminal 10 will be described, and then, the server 40 will be described.

<Configuration of Terminal>

The terminal 10 includes an input unit 11. The input unit 11 is a part to which voice data and image data of a user U1 are input. Video data of the user U1 may be input to the input unit 11. A video includes voice data and image data of the user U1.

The terminal 10 includes a control unit 12. The control unit 12 is a part that generates control data of the user U1. The control data of the user U1 is generated on the basis of the voice data and the image data of the user U1 input to the input unit 11. The image data is composed of a plurality of consecutive unit frames. Generally, a unit frame includes image information of the user U1. For example, image data of 60 frames/second includes 60 unit frames for one second.

The control unit 12 estimates a state of the user U1 on the basis of at least one of voice data (language data) of the user U1 and appearance data representing an appearance of the user U1. Appearances of the user U1 at least include non-verbal behaviors. Non-verbal behaviors are behaviors not using a language. The appearances of the user U1, for example, are a visual line (movement of a visual line), a posture, a gesture, an expression, and the like. Examples of postures or operations of a face include nodding, shaking, tilting of the head, and the like. Examples of postures or operations of an upper-half body include orientation of a trunk body, twisting of the shoulder, bending of the elbow, raising/lowering of the hand, and the like. Examples of movement of fingers include hand clapping, stretching, bending, eversion, inversion, and the like. Examples of expressions include thinking, happiness, surprise, sadness, anger, and the like.

The control unit 12 estimates a state of the user U1 on the basis of the voice data and the image data. The state of the user U1 may include at least one of a feeling and an operation of the user U1. The control unit 12 estimates the state of the user U1 from keywords of a speech generation language of the user U1, a feeling of the user U1, a posture of the user U1, a gesture of the user U1, a rhythm (a speech generation speed) of a voice of the user U1, an operation speed of the user U1, and the like.

The control unit 12, for example, estimates the state of the user U1 using the following operations as a trigger and generates control data.

Keyword (thank you, I'm sorry, agreement, disagreement, and the like) generated by the user U1

Feeling recognition (happiness, surprise, and thinking) of the user U1

Gesture recognition (nodding, raising of the hand, tilting of the head, and hand clapping) of the user U1

Detection of speech generation speed of the user U1

Detection of operation speed of the user U1.

In this embodiment, the control unit 12 estimates a state of a user using a learned model 13L. The learned model 13L is stored in a storage unit 13 to be described below. For example, the learned model 13L can be generated using deep learning. The learned model 13L may include a plurality of learned models.

By inputting image data to a first learned model, the control unit 12 acquires a first estimation result based on the image data. By inputting voice data to a second learned model, the control unit 12 acquires a second estimation result based on the voice data. By inputting the first estimation result and the second estimation result to a third learned model, the control unit 12 acquires an estimation result relating to the state of the user U1. The control unit 12 estimates the state of the user U1 on the basis of the estimation results of the learned models.

The control unit 12 generates control data for controlling operations of the ear animation E and the speech generation animation H on the basis of the estimated state of the user U1. Hereinafter, an example in which the control unit 12 generates control data will be described with reference to FIGS. 4 to 7.

Figure 4:
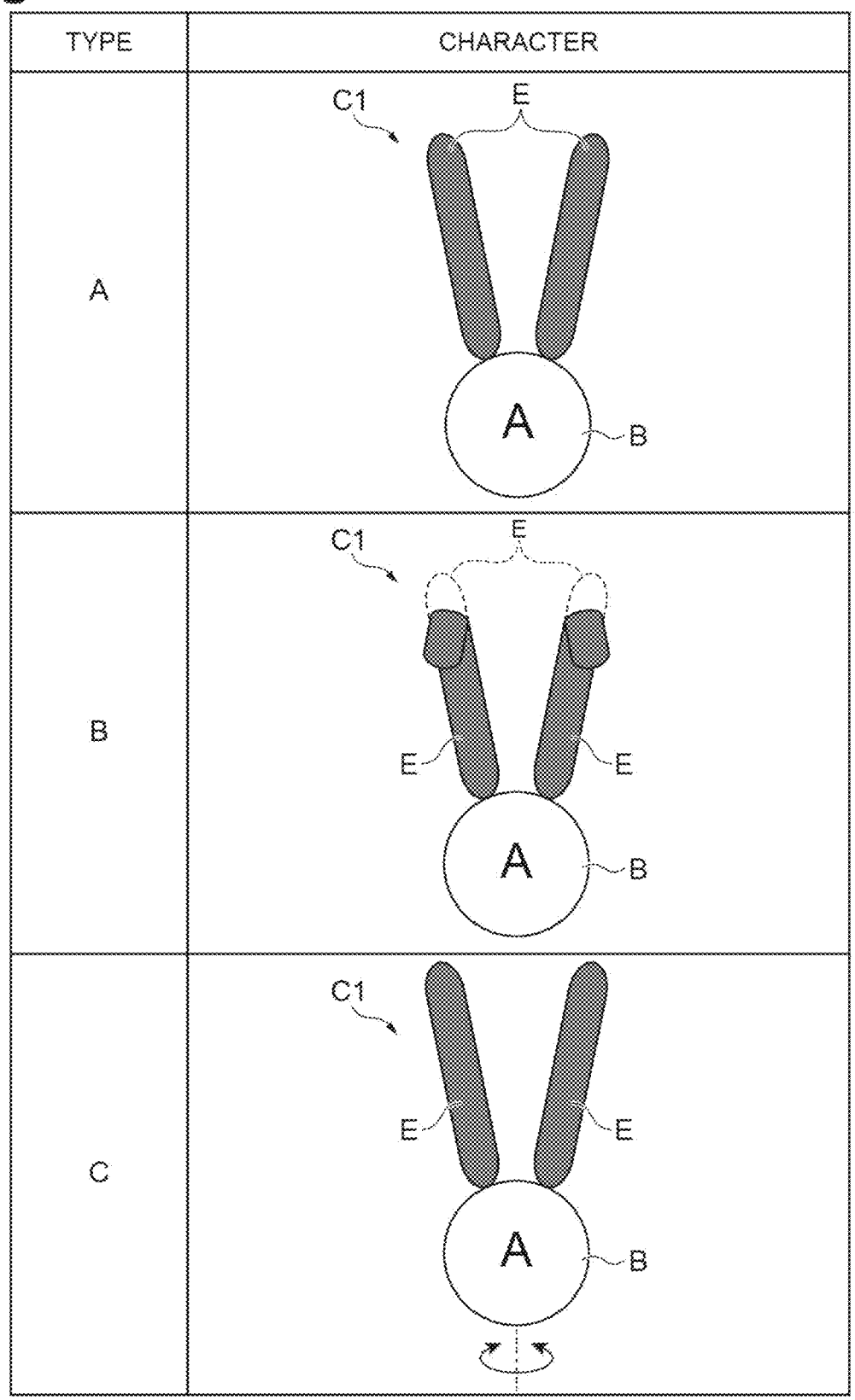
FIG. 4 is a diagram illustrating an example of an animation operation.

For example, in a case in which the visual line of the user U1 pays attention to the phone call screen G of the terminal 10, as illustrated in type A in FIG. 4, the control unit 12 generates control data for causing the ears to stand up and changing a color (coloring) in the ear animation E of the character C1.

For example, in a case in which the user U1 is nodding or expressing an agreement and/or the user U1 gives predetermined words (for example, "OK", "yes", or the like), as illustrated in Type B in FIG. 4, the control unit 12 generates control data for repeating bending of upper ⅓ parts of the ears back and forth in the ear animation E of the character C1.

For example, in a case in which the user U1 shows a feeling of happiness and/or in a case in which the user U1 generates a laugh sound, as illustrated in Type C in FIG. 4, the control unit 12 generates control data for slightly rotating (vibrating) the character C1 around the axis for a predetermined time (for example, for two seconds).

Figure 5:
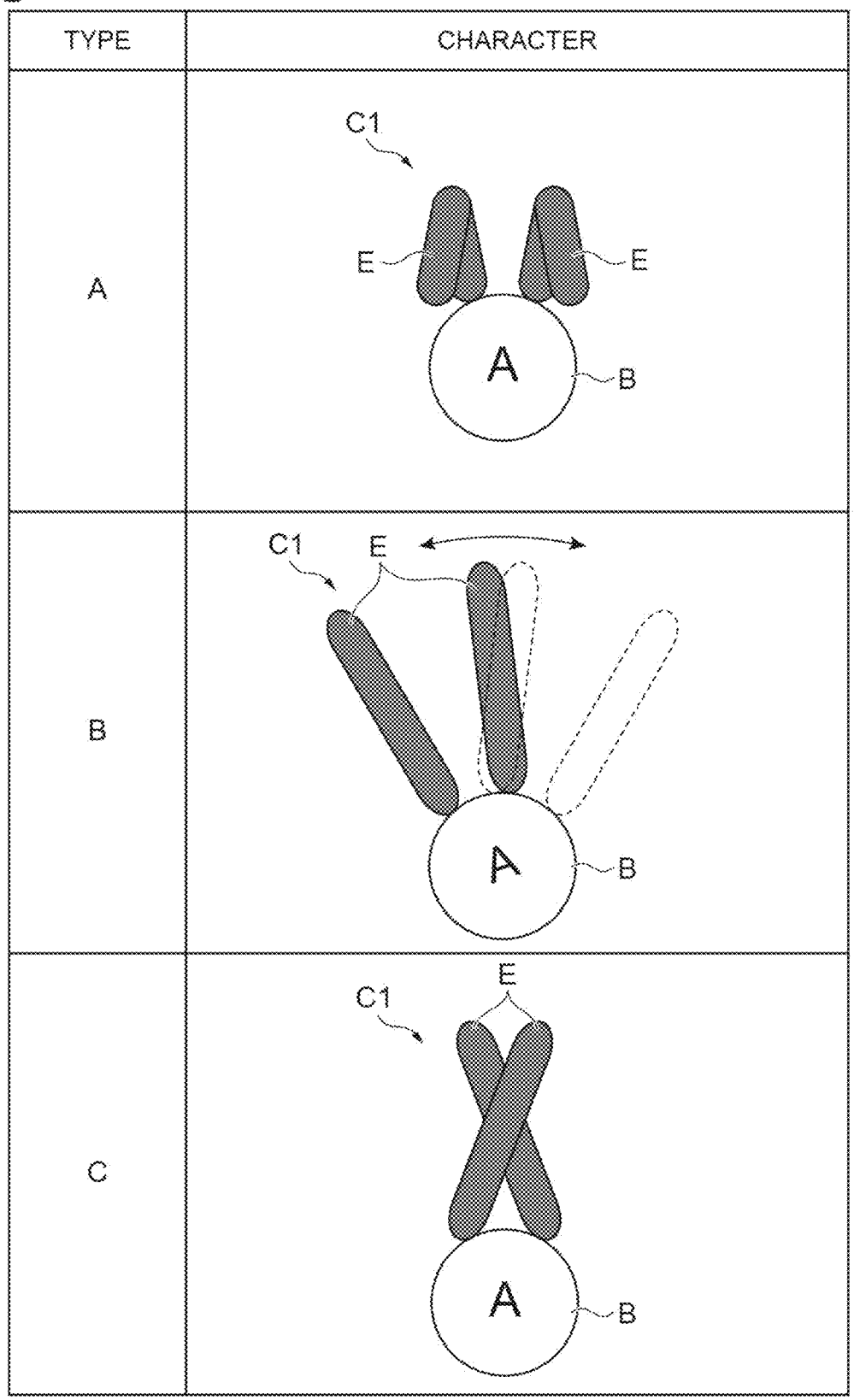
FIG. 5 is a diagram illustrating an example of an animation operation.

For example, in a case in which the user U1 shows an attitude of agreeing with generated speech of another user and/or in a case in which the user U1 gives predetermined words ("agree" or the like), as illustrated in Type A in FIG. 5, the control unit 12 generates control data for repeating bending ½ parts of the ears back and forth for a predetermined number of times (for example, twice) in the ear animations E of the character C1.

For example, in a case in which the user U1 is being in thought (tilting his or her head or the like) and/or in a case in which the user U1 gives predetermined words ("yes" or the like), as illustrated in Type B in FIG. 5, the control unit 12 generates control data for slowly shaking the character C1 horizontally.

For example, in a case in which the user U1 shows an attitude of disagreement to speech generated by another user (crossing index fingers in front of his or her chest or the like) and/or in a case in which the user U1 gives predetermined words ("disagree" or the like), as illustrated in Type C in FIG. 5, the control unit 12 generates control data for maintaining a state in which the ears are crossed for a predetermined time in the ear animation E of the character C1.

Figure 6:
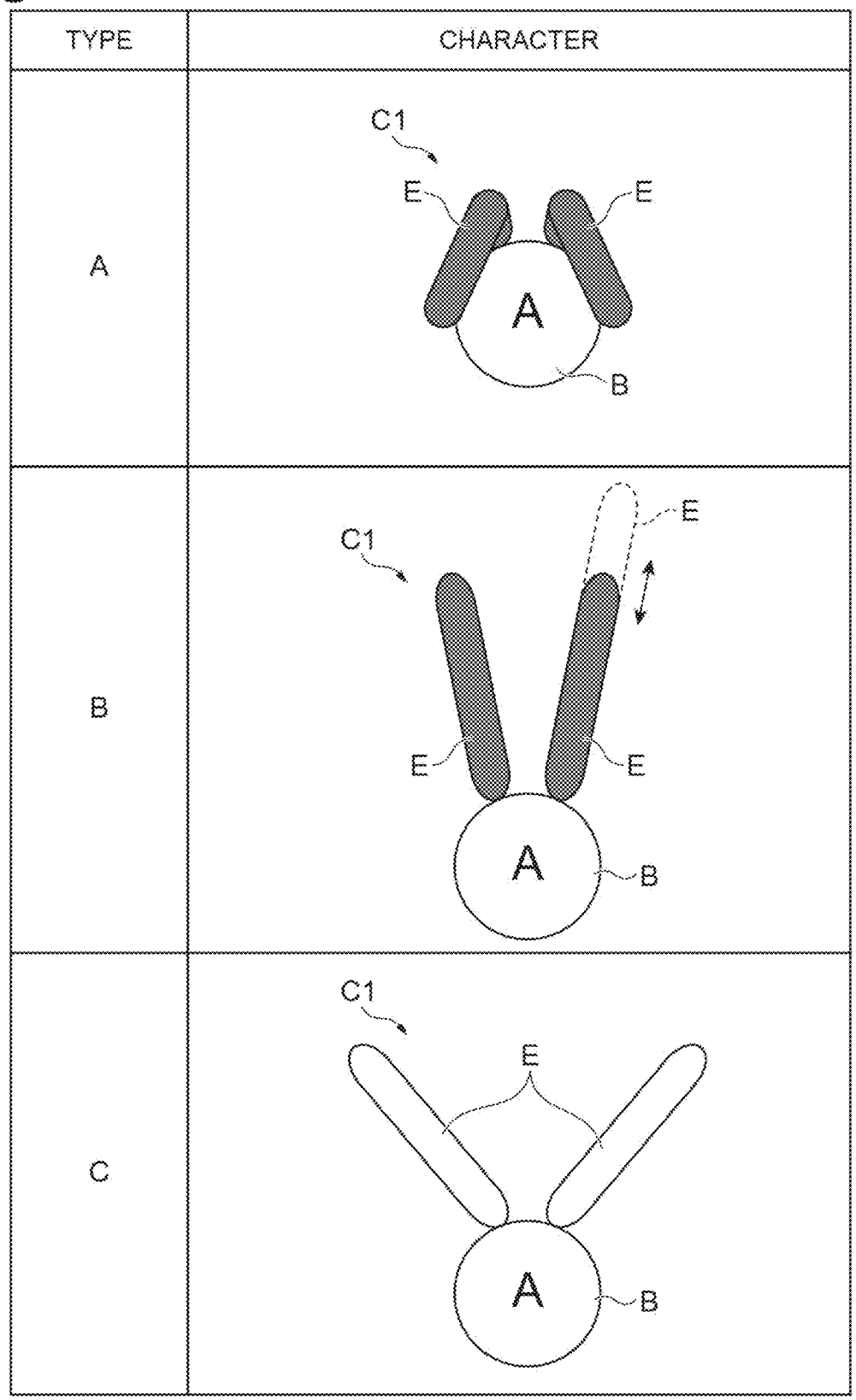
FIG. 6 is a diagram illustrating an example of an animation operation.

For example, in a case in which the user U1 is performing an operation of lowering his or her head and/or in a case in which the user U1 gives predetermined words ("Thank you", "I'm sorry", or the like), as illustrated in Type A in FIG. 6, the control unit 12 generates control data for maintaining bending at upper ⅔ parts of the ears for a predetermined time in the ear animations E of the character C1.

For example, in a case in which the user U1 is raising his or her hand, as illustrated in Type B in FIG. 6, the control unit 12 generates control data for expanding and then contracting one ear in the ear animations E of the character C1.

For example, in a case in which the visual line of the user U1 deviates from the phone call screen G for a predetermined time, as illustrated in Type C in FIG. 6, the control unit 12 generates control data for horizontally inclining the ears and changing the color thereof (to be colorless) in the ear animations E of the character C1.

Figure 7:
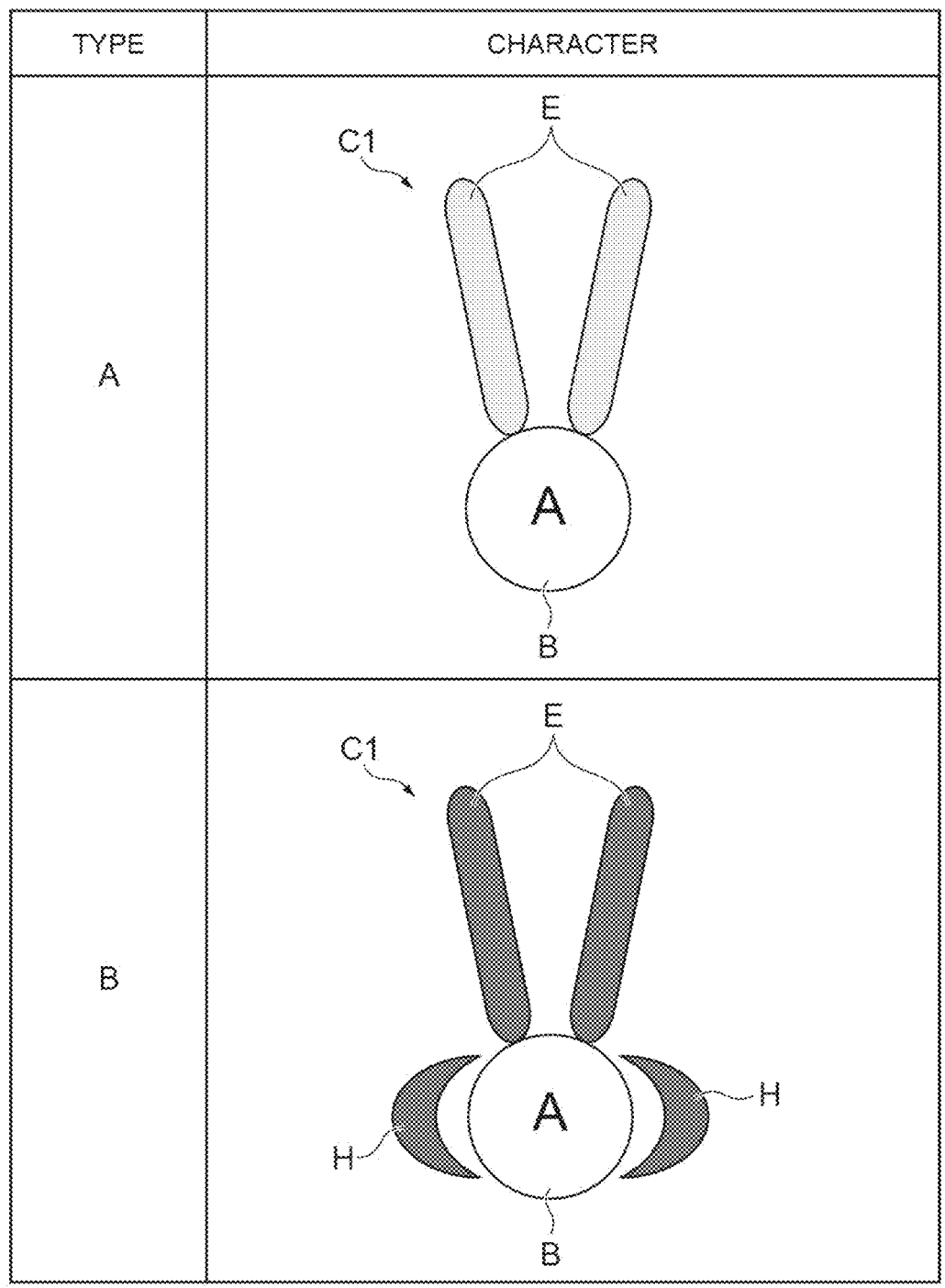
FIG. 7 is a diagram illustrating an example of an animation operation.

For example, in a case in which there is no speech generation person, and the user U1 is in silence in a state in which the visual line of the user U1 is within the phone call screen G, as illustrated in Type A in FIG. 7, the control unit 12 generates control data for slowly and continuously changing the color of the ears in the ear animation E of the character C1.

For example, in a case in which the user U1 is a speech generation person, as illustrated in Type B in FIG. 7, the control unit 12 generates control data for making the ears of the ear animation E to stand up and changing the color and displaying a speech generation animation H in the character C1. For example, the control unit 12 generates control data for horizontally expanding and then contracting the speech generation animations H during speech generation of the user U1.

The control unit 12 may include details for controlling the rhythm of the operation of the character C1 in the control data described above. The control unit 12 generates control data acquired by adjusting (setting) the rhythm of the operation (bending, expansion/contraction, vibration, color change, or the like) of the ear animation E. The control unit 12 generates control data acquired by adjusting the rhythm of the operation (expansion/contraction) of the speech generation animations H.

The control unit 12 detects a speech generation speed on the basis of the voice data and reflects a rhythm based on the speech generation speed in the operations of the ear animations E and the speech generation animations H. The control unit 12 can detect a speech generation speed by dividing the voice data into sub-words on the basis of a voice model or a sound model. The control unit 12 reflects a rhythm based on the speech generation speed of the user U1 in the operations of the ear animations E and the speech generation animations H of the character C1.

The control unit 12 detects an operation (shaking or the like) speed of the body of the user U1 on the basis of the image data and reflects a rhythm based on the operation speed in the operations of the ear animations E. The control unit 12 detects a key point (an articulation point of the body) on the basis of a posture estimation model, detects a locus of the movement of the same key point at a predetermined time interval from a scene of a time series, and can detect an operation speed. The control unit 12 reflects a rhythm based on the operation speed of the user U1 in the operations of the ear animations E of the character C1.

The control unit 12 is also a part that controls the operations of the characters C1, C2, and C3 on the basis of the control data. The control unit 12 displays the characters C1, C2, and C3 on the phone call screen G (see FIG. 2) and controls the operations of the ear animations E and the speech generation animations H of the characters C1, C2, and C3 on the basis of the generated control data and the received control data. In this embodiment, as illustrated in FIG. 2, the control unit 12 displays the character C1, the character C2, and the character C3 on the phone call screen G with the same size.

In a case in which the user U1 is a speech receiving person (a listener), the control unit 12 causes the operations of the ear animations E of the character C1 to conform to a rhythm based on the speech generation speed of the character C2 or the character C3 of the speech generation person on the basis of the received control data. In a case in which there is no speech generation person (no user is giving words), the control unit 12 causes the ear animations E of the characters C1, C2, and C3 to operate at a regulated rhythm (a rhythm applied to characters of all the users).

The control unit 12 is also a part that generates video data of the phone call screen G. The video data of the phone call screen G includes video data of the character C1, the character C2, and the character C3 controlled on the basis of control data. Other than those, various objects appearing on the phone call screen G may be included in video data of the phone call screen G.

The terminal 10 includes the storage unit 13. The storage unit 13 is a part that stores information required for controlling (processing) the terminal 10. In FIG. 3, a terminal program 13P and a learned model 13L are illustrated as information stored in the storage unit 13. The terminal program 13P is a program used for operating the terminal 10 and operates a computer such that control and the like according to the control unit 12 are performed. Since the system 100 is the communication assistance system, the terminal program 13P may be also regarded as a communication assistance program.

The learned model 13L, for example, may be provided for the terminal 10 after it is fixedly recorded on a recording medium of a type such as a CD-ROM, a DVD-ROM, or a semiconductor memory. Alternatively, the learned model 13L may be provided for the terminal 10 through a communication network as a data signal superimposed on a carrier wave.

The terminal 10 includes a communication unit 14. The communication unit 14 is a part that communicates with external devices of the terminal 10 through the network N (see FIG. 1). Examples of the external devices of the terminal 10 are the terminal 20, the terminal 30, and the server 40. The communication unit 14 transmits voice data and control data generated by the control unit 12 to the server 40 or receives voice data and control data from the server 40.

The terminal 10 includes an output unit 15. The output unit 15 outputs a video of the phone call screen G. The video of the phone call screen G is a video that is based on video data of the phone call screen G generated by the control unit 12.

<Configuration of Server>

The server 40 includes a control unit 42. The control unit 42 controls an operation of the server 40. The server 40 includes a storage unit 43. The storage unit 43 is a part that stores information required for controlling the server 40. In FIG. 3, a server program 43P and reception data 43S are illustrated as information stored in the storage unit 43. The server program 43P is a program for operating the server 40 and causes a computer such that control and the like using the control unit 42 are performed. The reception data 43S is data transmitted from the terminal 10, the terminal 20, and the terminal 30 to the server 40 and may include control data generated by the terminal 10, the terminal 20, and the terminal 30.

The server 40 includes a communication unit 44. The communication unit 44 is a part that communicates with external devices of the server 40 through the network N (see FIG. 1). Examples of external devices of the server 40 are the terminal 10, the terminal 20, and the terminal 30. The communication unit 44 receives control data of the user U1, control data of the user U2, and control data of the user U3 respectively from the terminal 10, the terminal 20, and the terminal 30 and transmits control data generated by the terminal 10, the terminal 20, and the terminal 30 respectively to the terminal 10, the terminal 20, and the terminal 30.

<Hardware Configuration>

An example of the hardware configuration of functional parts of the terminal 10 and the server 40 will be described. The communication unit 44 of the server 40 may be configured using a network card or a radio communication device for enabling an access to the network N. The control unit 42 of the server 40 may be configured using a processor such as a central processing unit (CPU) or a graphics processing unit (GPU), a clock, and an internal memory. The control unit 42 may be configured as one piece of hardware (a System On a Chip (SoC)) in which a processor, a clock, an internal memory, the storage unit 43, and the communication unit 44 are integrated. By operating on the basis of the server program 43P, the control unit 42 causes a server computer to operate as the server 40. The storage unit 43 of the server 40 may be configured using a nonvolatile storage medium such as a flash memory, a hard disk, or a solid state disk (SSD).

The input unit 11 of the terminal 10 may be configured using a microphone, a camera, and the like. A voice of the user U1 is obtained using the microphone. In other words, the microphone is one type of voice sensor that obtains a voice. An image of the user U1 is obtained by the camera. In other words, the camera is one type of image sensor that obtains an image. In addition, the input unit 11 may be configured also using operation devices of a keyboard, a mouse, and a touch panel. The control unit 12 of the terminal 10 may be configured similar to the control unit 42 of the server 40. By operating on the basis of the terminal program 13P, the control unit 12 causes a general-purpose computer to operate as the terminal 10. The storage unit 13 of the terminal 10 may be configured similar to the storage unit 43 of the server 40. The communication unit 14 of the terminal 10 may be configured similar to the communication unit 44 of the server 40. The output unit 15 of the terminal 10 may be configured using a display device such as a liquid crystal panel, an organic EL panel, or the like (it may be a touch panel). In addition, the output unit 15 may be configured also using a speaker.

<Operation of System>

Figure 8:
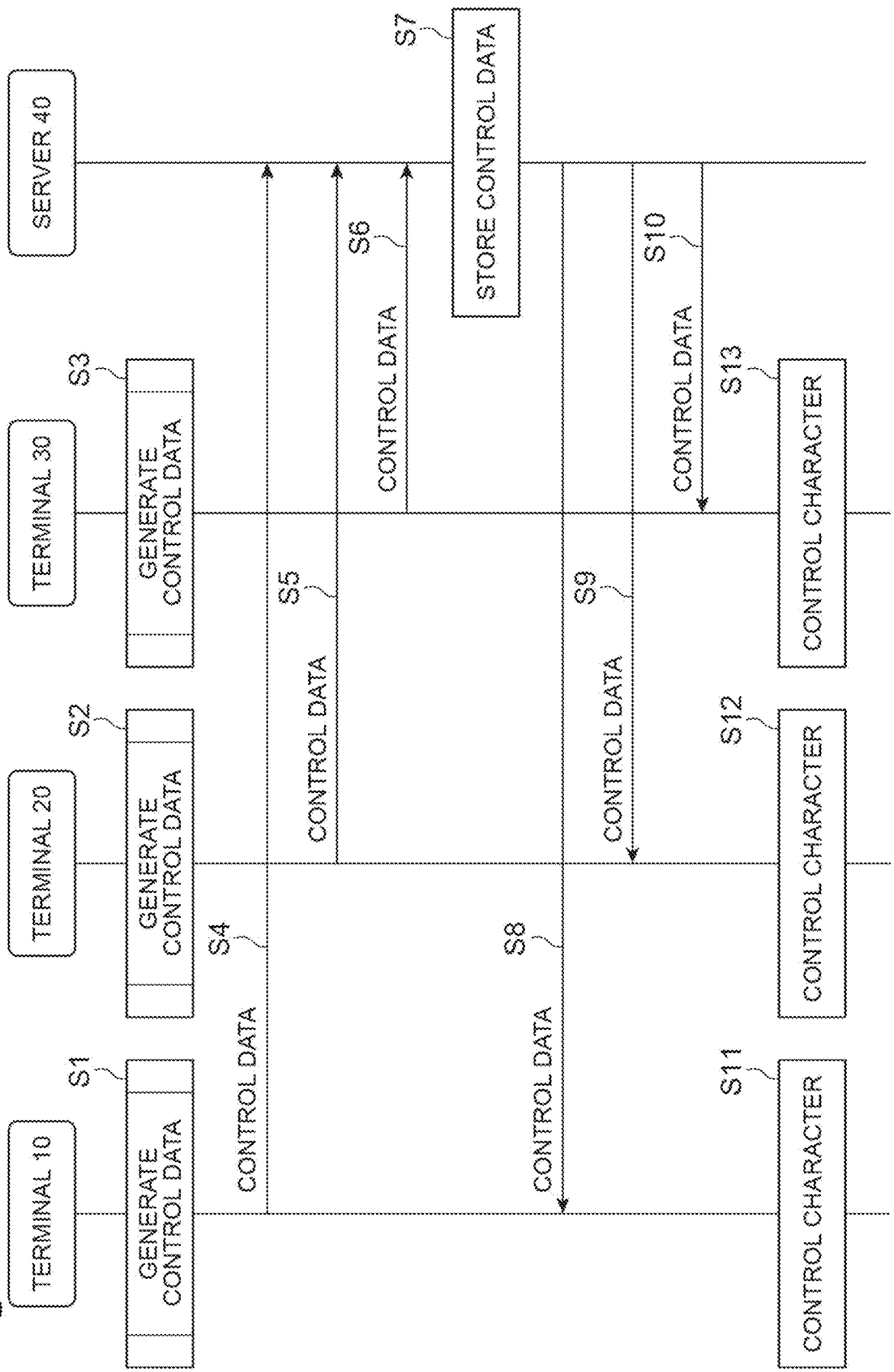
FIG. 8 is a sequence diagram illustrating an operation of a communication assistance system.

FIG. 8 is a sequence diagram illustrating an example of a process (a communication assistance method) performed by the system 100. The process illustrated in FIG. 8 may be repeatedly performed while communication continues.

Control data is generated in Step S1 to Step S3. More specifically, the terminal 10 generates control data in Step S1. The terminal 20 generates control data in Step S2. The terminal 30 generates control data in Step S3.

The control data is transmitted to the server 40 in Step S4 to Step S6. More specifically, the terminal 10 transmits control data to the server 40 in Step S4. The terminal 20 transmits control data to the server 40 in Step S5. The terminal 30 transmits control data to the server 40 in Step S6. The control data is stored in the storage unit 43 of the server 40 as reception data 43S in Step S7.

Control data is transmitted to the terminal 10, the terminal 20, and the terminal 30 in Step S8 to Step S10. More specifically, the server 40 transmits control data to the terminal 10 in Step S8. The server 40 transmits control data to the terminal 20 in Step S9. The server 40 transmits control data to the terminal 30 in Step S10.

Characters are controlled in Steps S11 to Step S13. More specifically, the terminal 10 controls characters on the basis of the control data received in the previous Step S8 in Step S11. In accordance with this, the characters on the phone call screen G displayed in the terminal 10 operate such that they reflect operations of the user U1, the user U2, and the user U3. The terminal 10 integrally displays icons B that can be used for identifying other users who are phone call partners and ear animations E representing states of the other users on the phone call screen.

In Step S12, the terminal 20 controls characters on the basis of the control data received in the previous Step S9. In accordance with this, characters on the phone call screen G displayed in the terminal 20 operate to have the operations of the user U1, the user, U2, and the user U3 reflected therein. In Step S13, the terminal 30 controls the characters on the basis of the control data received in the previous Step S10. In accordance with this, the characters on the phone call screen G displayed in the terminal 30 operate to have the operations of the user U1, the user U2, and the user U3 reflected therein.

Figure 9:
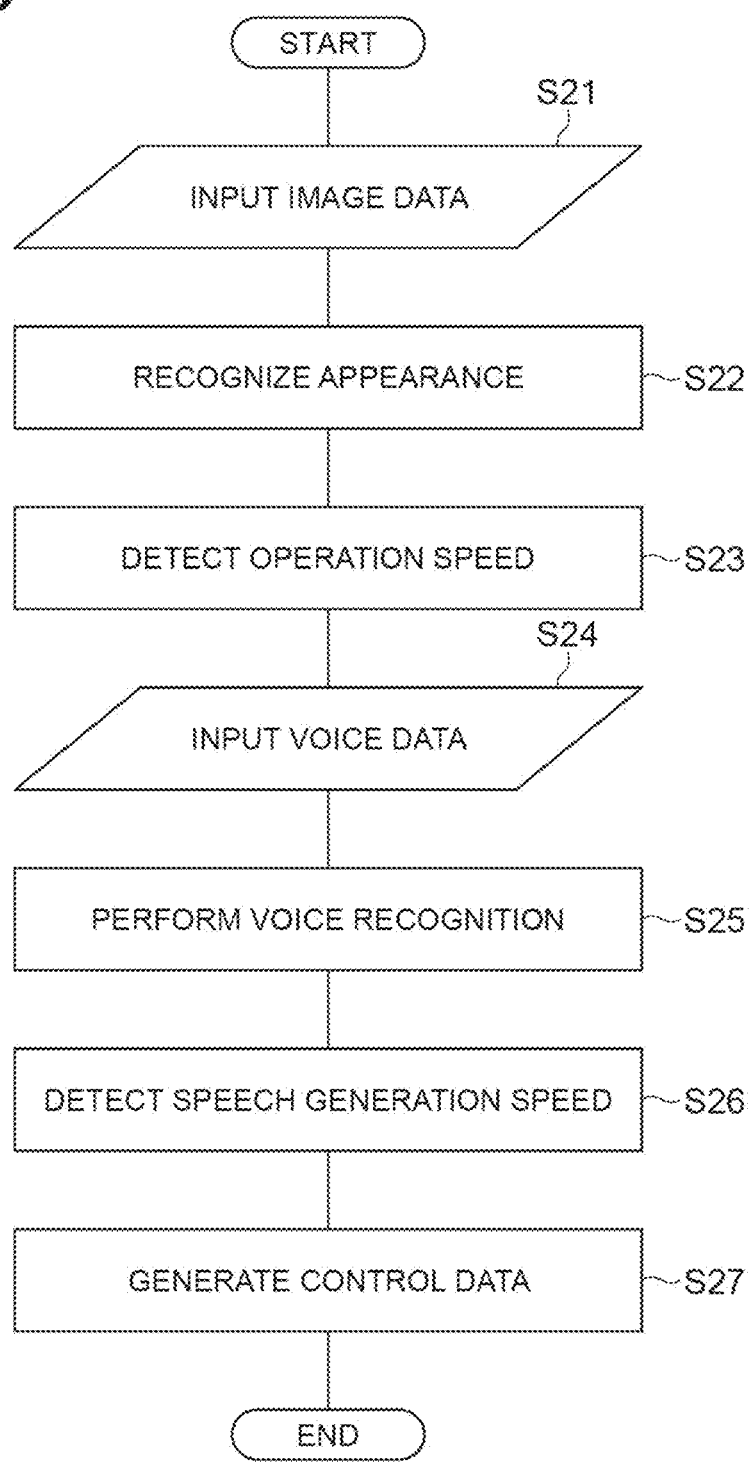
FIG. 9 is a flowchart illustrating an operation of a terminal.

FIG. 9 is a flowchart illustrating an example of a process (a communication assistance method) performed in the terminal 10, the terminal 20, and the terminal 30. The process illustrated in FIG. 9 may be repeatedly performed while communication continues.

In Step S21, image data is input. In Step S22, appearance recognition (feeling recognition and gesture recognition) is performed on the basis of the image data. More specifically, in the terminal 10, the terminal 20, and the terminal 30, image data is input to a learned model, and a result of estimation of appearance recognition is obtained. When image data is input, the learned model outputs a result of estimation of appearance recognition. In Step S23, an operation speed is detected.

In Step S24, voice data is input. In Step S25, voice recognition is performed on the basis of the voice data. More specifically, in the terminal 10, the terminal 20, and the terminal 30, voice data is input to the learned model, and a result of estimation of voice recognition is obtained. When voice data is input, the learned model outputs a result of estimation of voice recognition. In Step S26, a speech generation speed is detected. Then, in Step S27, control data is generated.

Effects

As described above, in the system 100 according to this embodiment, the control unit 12 of each of the terminal 10, the terminal 20, and the terminal 30 integrally displays the icons B and the ear animations E representing the states of the users U1, U2, and U3 on the phone call screen G. In accordance with this, in the system 100, states of other users who are phone call partners can be recognized. Thus, in the system 100, smooth communication can be realized in a phone call performed using the terminal 10, the terminal 20, and the terminal 30.

In communication, it is known that conformity to generated speech or an action such as nodding during a conversation increases sympathy for other users and improves the efficiency of a cooperative work. For this reason, by operating the ear animations E on the phone call screen G in accordance with states of the users U1, U2, and U3, improvement of communication can be achieved. Particularly, in the system 100 according to this embodiment, the control unit 12 detects a speech generation speed on the basis of voice data and reflects a rhythm based on the speech generation speed in the operations of the ear animations E and the speech generation animation H. In addition, the control unit 12 detects an operation (shaking or the like) speed of the body of the user U1 on the basis of image data and reflects a rhythm based on the operation speed in the operations of the ear animations E. Thus, in the system 100, the states of the users U1, U2, and U3 can be perceived more accurately.

In addition, the characters C1, C2, and C3 including the ear animations E have the following superiority over pictographs, avatars, and video conversations. The characters C1, C2, and C3 have superior real-time and dynamic properties over pictographs. In addition, in the case of avatars, an impression is strongly dependent on the design thereof. In addition, when an avatar is generated by simply imitating a user's face, there is an uncanny valley effect. On the other hand, the characters C1, C2, and C3 have similar designs, and thus an impression is not dependent on each user, and an uncanny impression is not given. In addition, since the visual line is not a camera visual line in a video phone call, an unnatural expression of which the visual line does not match the camera visual line is formed (in a case in which a camera is disposed above, a looking-down video or the like), and there is concern that a partner is likely to feel uncomfortable. Furthermore, a large transmission volume is required. In contrast to this, in the case of the characters C1, C2, and C3, an uncomfortable feeling can be inhibited from being given to partners, and the transmission volume can be configured to be low.

In addition, the characters C1, C2, and C3 do not have expressions as faces, which is applied to generation of effective communication as a feature. As non-verbal expressions that are not facial expressions, feelings corresponding to infinite facial expressions are conveyed using operations and inclinations of the ear animations E. Visual operations of the ear animations E linked with a context of voices and conversations enable the conveyance and are utilization of imagination of a recipient of a non-verbal expression. In accordance with utilization of imagination, deep and delicate feelings can be conveyed. For this reason, transformation into an operation part (the ear animation E) different from a facial expression becomes important.

In addition, since the ear animations representing the states of the users U1, U2, and U3 operate, for example, even in a status in which a speaker generates speech to one side in a remote lecture, a reaction of a listener can be obtained. For this reason, a speaker can take a correspondence in response to a reaction of a listener. Thus, smooth communication can be realized.

In addition, since the states of the users U1, U2, and U3 can be conveyed to other users using the ear animations, even in a case in which a user is poor at expressing feelings using a conversation, the state of the user can be conveyed to partners. In this way, the non-verbal expression can be reinforced, and thus smooth communication can be realized.

In the system 100 according to this embodiment, state animations representing the states of the users U1, U2, and U3 are the ear animations E imitating the ears and operate in accordance with changes in the states of the users U1, U2, and U3. For example, in a case in which state animations are face animations of users U1, U2, and U3 who are phone call partners, changes in feelings and the like need to be read from delicate changes in the face on the phone call screen G. In addition, since operations of various parts of face animations need to be focused on, it is not easy to perceive the states of the users U1, U2, and U3. In the system 100, since changes in the states of the users U1, U2, and U3 are expressed using the operations of the ear animations E imitating the ears, only the ear animations E may be focused on. Thus, states of the phone call partners can be easily perceived.

In the system 100 according to this embodiment, identification information is each icon B displayed on the phone call screen G and includes at least one of images representing the users U1, U2, and U3 and texts representing the users U1, U2, and U3. In this configuration, the users U1, U2, and U3 who are phone call partners can be recognized at a glance on the phone call screen G.

In the system 100 according to this embodiment, the ear animations E operate in accordance with at least one of feelings and operations of the users U1, U2, and U3. In this configuration, feelings and operations of the users U1, U2, and U3 who are phone call partners can be recognized.

In the system 100 according to this embodiment, a step of estimating states of users on the basis of at least one of voice data of the users U1, U2, and U3 and appearance data representing appearances of the users U1, U2, and U3, a step of generating control data for controlling operations of the ear animations E on the basis of the states of the users U1, U2, and U3, and a step of outputting the control data are performed. In this configuration, since control data for controlling operations of the ear animations E is output, a volume of data output (transmitted) from the terminal 10, the terminal 20, and the terminal 30 can be configured to be smaller than that of a case in which all the data relating to the states of the users U1, U2, and U3 is output. For this reason, even in a communication environment in which a communication speed is low, or data communication of a large volume cannot be performed, smooth communication can be realized in a phone call using the terminal 10, the terminal 20, and the terminal 30.

In the system 100 according to this embodiment, in the step of estimating the states of the users U1, U2, and U3, the states of the users U1, U2, and U3 are estimated using the learned model 13L, and when at least one of voice data and appearance data is input, the learned model outputs a state of a user. In this configuration, the states of the users U1, U2, and U3 can be estimated with high accuracy.

The system 100 according to this embodiment performs a step of displaying a speech generation animation H that is based on voice data of a speech generation person and is different from the ear animation E on the phone call screen G integrally with the icon B of the speech generation person. The speech generation animation H operates in accordance with a speech generation appearance of a speech generation person. In this configuration, a speech generation person can be recognized at a glance, and the speech generation state of the speech generation person can be recognized using the speech generation animation H.

In the system 100 according to this embodiment, for example, the character C1 of the user U1, the character C2 of the user U2, and the character C3 of the user U3 are displayed on the phone call screen G. In this configuration, the users U1, U2, and U3 can check their ear animations E. In addition, the ear animations E of the users U1, U2, and U3 are displayed together on the phone call screen G, and thus an impression of the users U1, U2, and U3 being present in the same space can be given, and a conversation having a sense of presence and a sense of unity can be realized. As a result, smooth communication can be realized.

In the system 100 according to this embodiment, the characters C1, C2, and C3 are displayed with the same size on the phone call screen G. In this configuration, by displaying the characters C1, C2, and C3 with the same size, an impression of the users U1, U2, and U3 being present in the same space can be further given, and thus a conversation having a sense of presence and a sense of unity can be further realized.

As above, although the first embodiment of the present disclosure has been described, the present disclosure is not necessarily limited to the embodiment described above, and changes can be performed in a range not departing from the concept thereof.

In the first embodiment described above, a form in which control data is generated by the terminal 10, the terminal 20, and the terminal 30 has been described as an example. However, the control data may be generated by the server 40. In this configuration, the terminal 10, the terminal 20, and the terminal 30 transmit voice data and image data to the server 40, and the server 40 generates control data on the basis of the voice data and the image data. In this case, the server program 43P can be also referred to as a communication assistance program. In addition, the control data may be generated by each of the terminal 10, the terminal 20, and the terminal 30 on the basis of voice data and image data transmitted from the other terminals 10, 20, and 30.

In the first embodiment described above, a form in which the input unit 11 of the terminal 10 is configured using a camera, and an image of the user U1 is obtained by the camera has been described as an example. However, the terminal 10 may obtain appearance data using laser or the like. In addition, an infrared sensor array, a triaxial sensor, a pressure sensor, or the like may be used for detecting an operation speed. This similarly applies also to the terminal 20 and the terminal 30. In the case of a head mount display (HMD) terminal, a visual line and a pupil of a user and an operation of a head part of the user can be appropriately detected.

In the first embodiment described above, a form in which icons B, ear animations E, and the like are displayed on the phone call screens G of the terminals 10, 20, and 30 has been described as an example. However, in a case in which the terminal is a wearable terminal or a head mount display (HMD) terminal, icons B, ear animations E, and the like may be displayed on a lens or the like or may be displayed as a hologram. In other words, the characters C1, C2, and C3 are displayed in a cyber space. The cyber space may include a virtual reality (VR), an augmented reality (AR), and a mixed reality (MR).

In the first embodiment described above, a form in which the control unit 12 estimates the states of the users U1, U2, and U3 on the basis of at least one of voice data of the user U1 and appearance data representing an appearance of the user U1 has been described as an example. However, the state of a user may be estimated with environment information additionally taken into account. The environment information, for example, is music (BGM), position information, and the like.

In the first embodiment described above, a form in which the states of users are estimated using the learned model 13L has been described as an example. However, the states of users may be estimated using another method. For example, voice data may be processed using natural language processing (NPL). The image data may be processed using pattern matching. For example, by analyzing the image data, patterns corresponding to appearances of the user U1, the user U2, and the user U3 may be determined. An image pattern may be selected from among given patterns of a finite number stored in the storage unit 43 in advance.

In addition, the states of users may be determined using voice recognition of words set in advance. For example, predetermined words (including text and voice) and an operation pattern of the ear animation E may be associated with each other, and in a case in which predetermined words are spoken, the ear animation E may be operated on the basis of an operation pattern corresponding to the predetermined words. An operation pattern may be selected from at least one of standard operation patterns set in advance and generation patterns generated by the users U1, U2, and U3 in advance and be associated with predetermined words.

As in the first embodiment described above, the operation of the ear animation E is set (determined) on the basis of sensing results of a voice, an operation, and the like. In addition to this, in a case in which predetermined words of a user to be used are registered, and predetermined words and an operation pattern of the ear animation E are associated with each other, recognition efficiency is improved, and thus state animations appropriate to the states of the users U1, U2, and U3 can be displayed in a speedy manner. In addition, non-verbal expressions for independent expressions of the users U1, U2, and U3 can be handled. An operation pattern can be selected from at least one of standard operation patterns set in advance and generation patterns generated by the users U1, U2, and U3 in advance. In this way, operation patterns are generated, and also the generated patterns can be used as operation patterns, and thus, an independent non-verbal expression corresponding to independent words of the user can be set as an operation pattern. In accordance with this, a non-verbal expression can be created. Thus, richer communication can be realized. In addition, new words and new non-verbal expressions can be updated by a user.

Regarding association between predetermined words and an operation pattern, for example, as words associated with an operation pattern that is lightly nodded, expressions that are ordinarily used frequently by a user, for example, words such as "ya~, ya~", "yes~, yes~", "I see!", "really?", "as expected", "Is that so?", "I understand", "I think so.", and the like are registered as words (a voice) of the user. During a conversation, by selecting an operation pattern associated with predetermined words through voice recognition of this registration information, a light nodding operation can be expressed. In addition, since predetermined words can be registered, a dialect and special words in a specific business, and the like can be handled. In accordance with this, an independent expression can be represented as a non-verbal expression. In addition, not only the ear animation E but also an arm animation A and a leg animation F to be described below can be associated with predetermined words.

In the first embodiment described above, a form in which an estimated result relating to the state of the user U1 is obtained by the control unit 12 inputting a first estimation result and a second estimation result to a third learned model has been described as an example. However, in a case in which the first estimation result and the second estimation result are obtained, the control unit 12 may estimate the state of a user through a rule base. In addition, the first estimation result and the second estimation result may be weighted.

In addition to the first embodiment described above, a function for being able to select whether or not his or her own character is displayed in the terminal of a phone call partner may be provided. In accordance with this, for example, a character of only one person among a plurality of users is displayed on the phone call screen G, and other users can display a video of the user. This function is effective for protection of privacy of a user and reduction of a transmission band.

Figure 10:
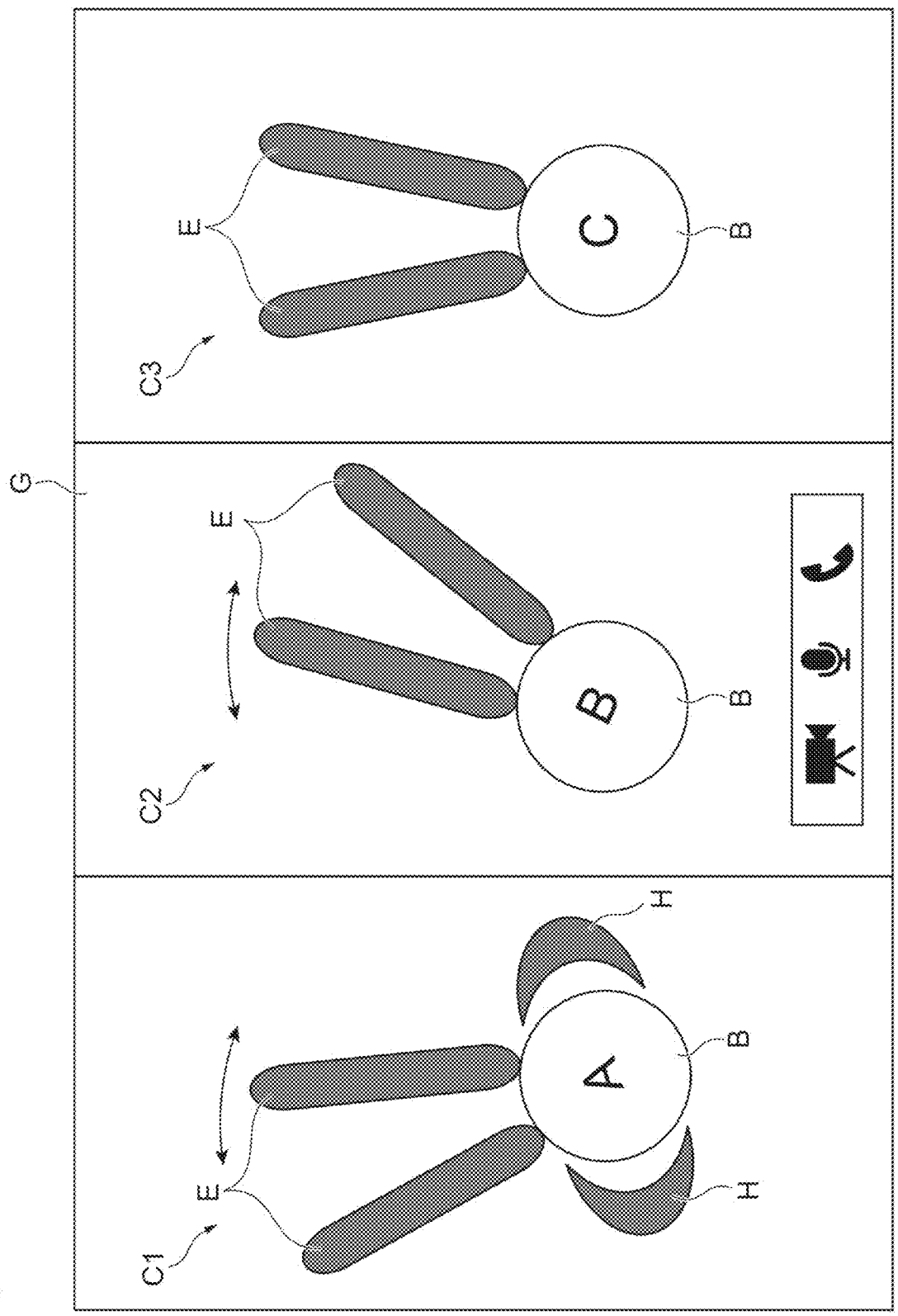
FIG. 10 is a diagram illustrating an example of communication provided by a communication assistance system according to a modified example.

In addition to the first embodiment described above, as illustrated in FIG. 10, each of the characters C1, C2, and C3 may be shaken with a predetermined period. The predetermined period is initially set in advance and is changed on the basis of the state (shaking of the body, respiration, a change in the visual line, a heartbeat, a blood pressure, and the like) of each of the users U1, U2, and U3. In the example illustrated in FIG. 10, the periods of the users U1, U2, and U3 are different, and thus shaking is not synchronized. In other words, a state in which the characters C1, C2, and C3 are shaken with different periods is illustrated.

The shaking periods of the characters C1, C2, and C3 change on the basis of situations of conversations of the users U1, U2, and U3 and an elapsed time. The shaking period changes using the state of a speech generation person as a reference. More specifically, the shaking period is on the basis of a sound volume change rhythm of a speech generation person, a sound tone of the speech generation person, and a speech generation speed of the speech generation person, and the shaking periods of the users U1, U2, and U3 are changed using an elapsed time as a parameter. The control unit 12 synchronizes shaking operations of the characters C1, C2, and C3 on the basis of the state of the speech generation person. For example, in a case in which a sound volume change rhythm, a sound tone, and a speech generation speed of a speech generation person are equal to or higher than respective thresholds, and an elapsed time after start of a phone call exceeds a predetermined time, the control unit 12 generates control data for causing the periods of shaking of the characters C1, C2, and C3 to be the same. More specifically, for example, in a case in which a speech generation person is the user U1, the control unit 12 adjusts the periods of the characters C2 and C3 to the period of shaking of the character C1. In addition, the control unit 12 may generate control data by detecting a mirroring level among the users U1, U2, and U3, a back tracking, a paging speech generation amount, and the like.

Figure 11:
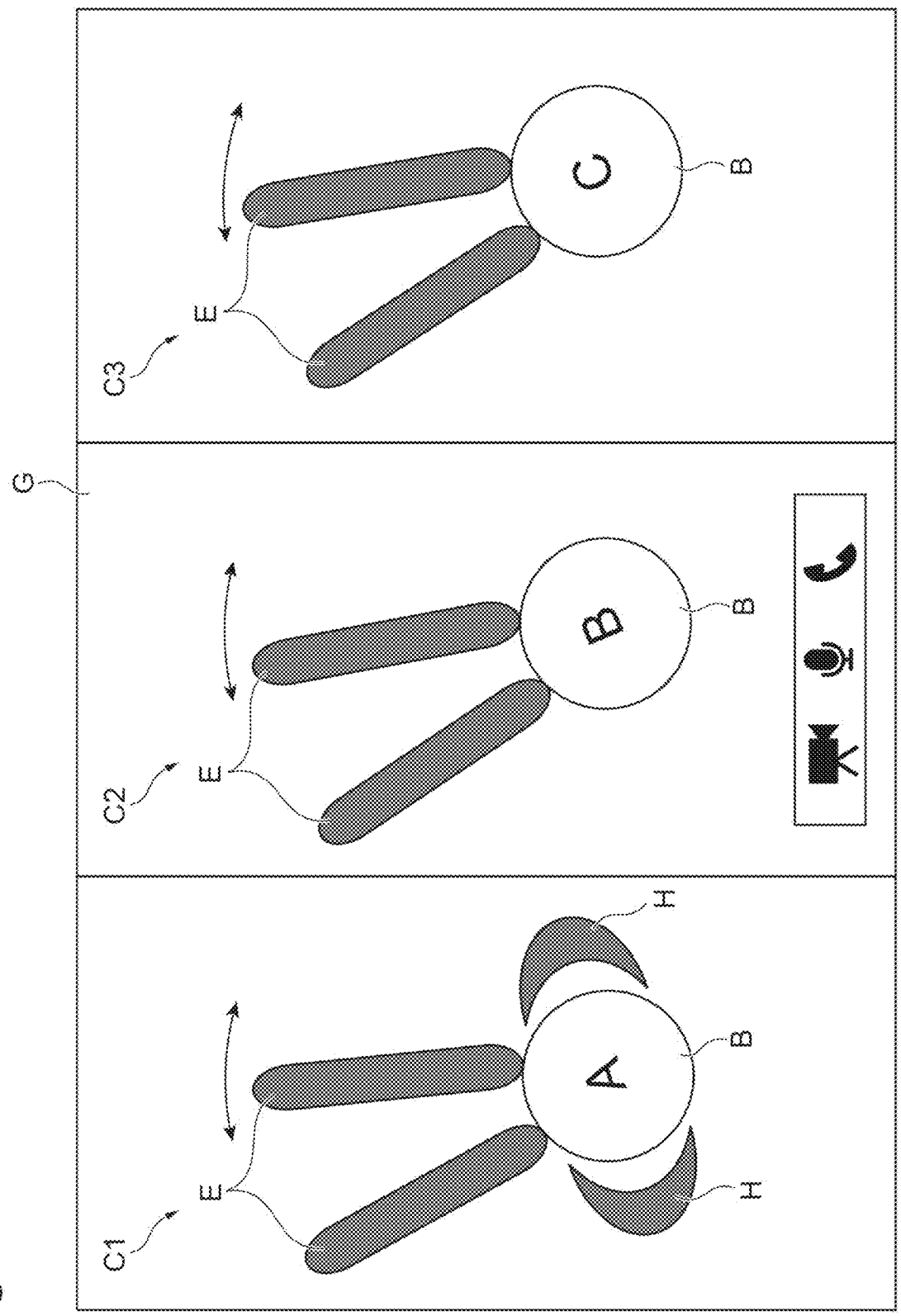
FIG. 11 is a diagram illustrating an example of communication according to the modified example.

When the periods of shaking of the characters C1, C2, and C3 are synchronized with each other, as illustrated in FIG. 11, the shaking of the characters C1, C2, and C3 is synchronized. In other words, the characters C1, C2, and C3 are shaken in the same direction with the same period. In this way, by synchronizing the shaking of the characters C1, C2, and C3 on the basis of the state of the speech generation person, a sense of unity is expressed in the operations of the characters C1, C2, and C3 is expressed in accordance with the state of a conversation. Thus, a conversation having a sense of presence and a sense of unity can be realized.

In addition to the first embodiment described above, as illustrated in FIG. 12, each of the characters C1, C2, and C3 may further include arm animations A. The arm animation A is an animation imitating at least one of an arm and a hand and operates in accordance with a change in the state of the user. Similar to the ear animation E, the arm animation A operates in accordance with at least one of a feeling and an operation of the user. The arm animation A may perform either an operation of the same details as those of the ear animation E or an operation of details different from those of the ear animation E. In the example illustrated in FIG. 12, the arm animation A and the ear animation E perform operations of the same details. More specifically, in accordance with an operation of a user U3 raising his or her hand, in the character C3, one ear of the ear animations E is expanded and then contracted, and one arm of the arm animations A is raised. In a case in which the user U3 raises his or her hand, the control unit 12 generates control data for expanding and contracting one ear of the ear animations E of the character C2 and raising one arm of the arm animation A.

Figure 12:
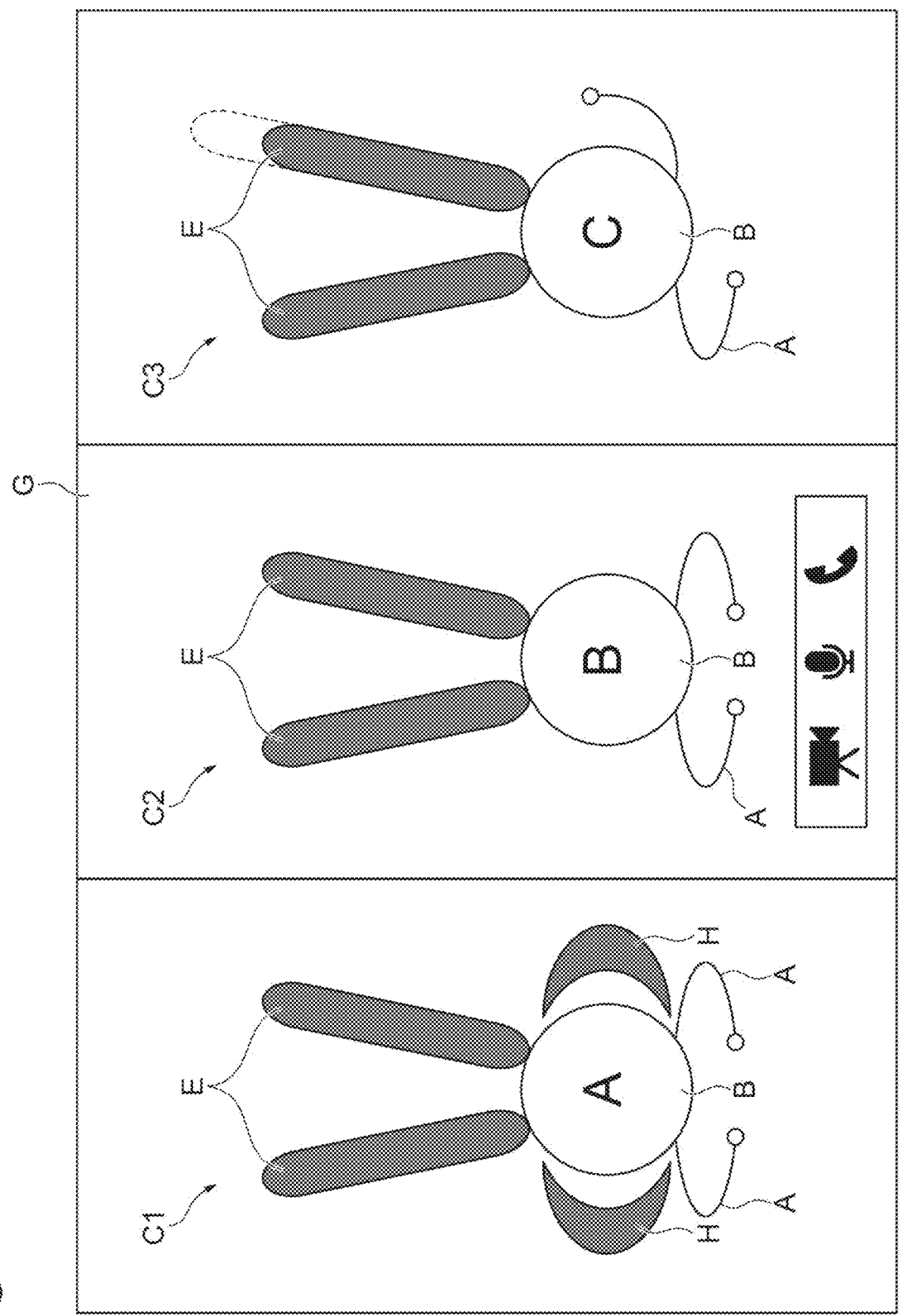
FIG. 12 is a diagram illustrating an example of communication according to the modified example.

For example, a state represented by each of the characters C1 and C2 illustrated in FIG. 12 represents a fixed position (an initial position) of the arm animation A. The arm animation A performs operations of hand clapping, swinging of the hand, crossing of arms, and the like in accordance with an operation of the user.

Figure 13:
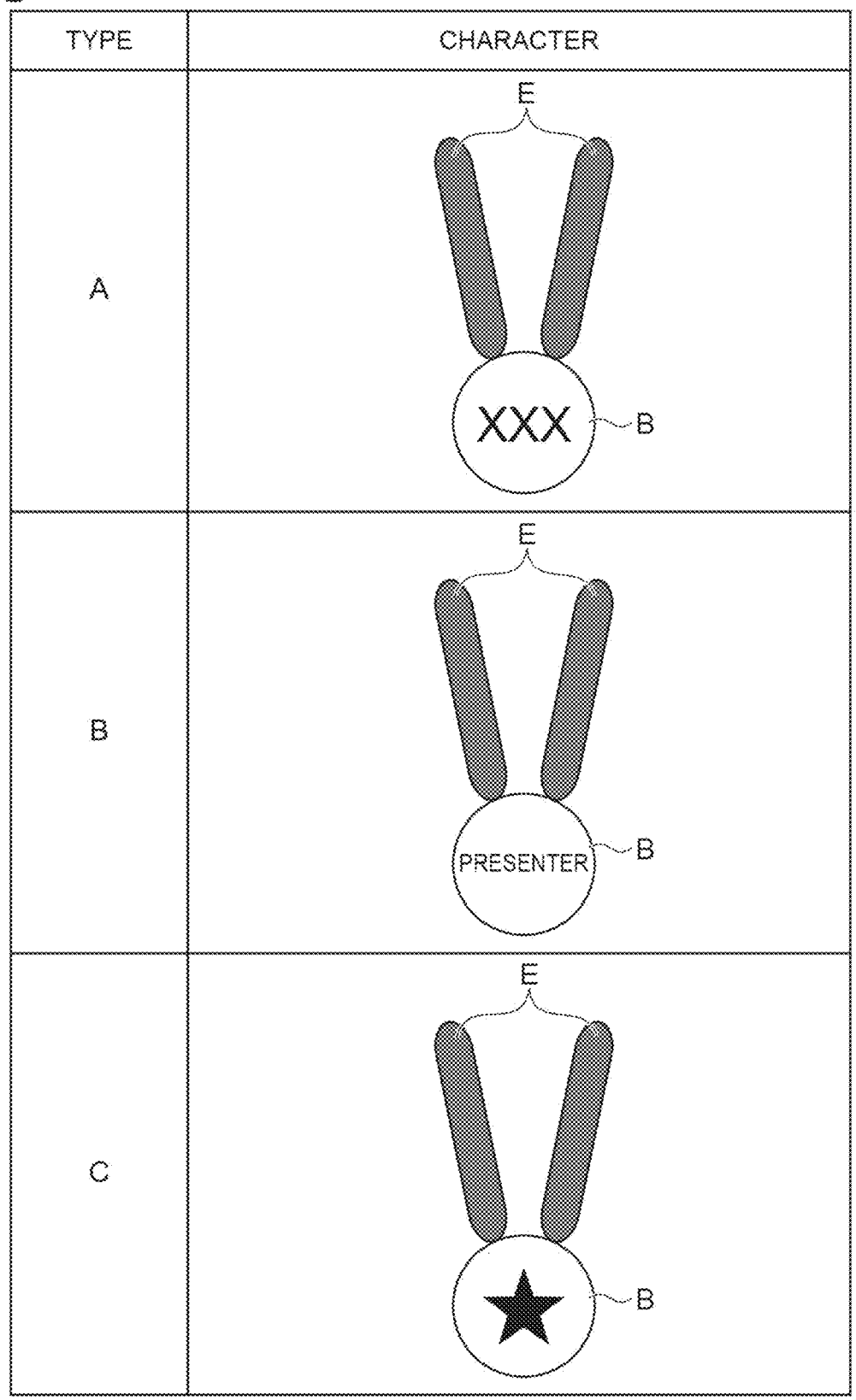
FIG. 13 is a diagram illustrating an example of an animation operation according to the modified example.

In the first embodiment described above, a form in which "A", "B", and "C" are displayed in the icons B as texts used for identifying users has been described as an example. However, in the icon B, as illustrated in Type A illustrated in FIG. 13, a company name (for example, "XXX"), a corporate name, a club name, a brand name, and the like may be displayed, as illustrated in Type B illustrated in FIG. 13, roles such as a presenter, a teacher, a student, a counselor, a client, and the like may be displayed, and as illustrated in Type C illustrated in FIG. 13, a logo of a company and the like may be displayed.

In addition to the first embodiment described above, at least one of a pictograph and an image and text set in advance may be displayed in the icon B. As illustrated in Type A illustrated in FIG. 14, a pictograph is displayed in the icon B. A pictograph is defined in Unicode. A pictograph may be automatically selected and displayed in accordance with at least one of a feeling and an operation of a user or may be selected and displayed in accordance with an operation of a user. In the case of automatic selection, for example, in a case in which a user shows a feeling of happiness and/or a user generates a laughing sound, the control unit 12 generates control data for displaying a pictograph representing a smiling face. In the case of manual selection according to an operation of a user, an arbitrary pictograph may be selected from a list of pictographs, or a pictograph may be selected in accordance with a predetermined operation (a key operation or the like).

Figure 14:
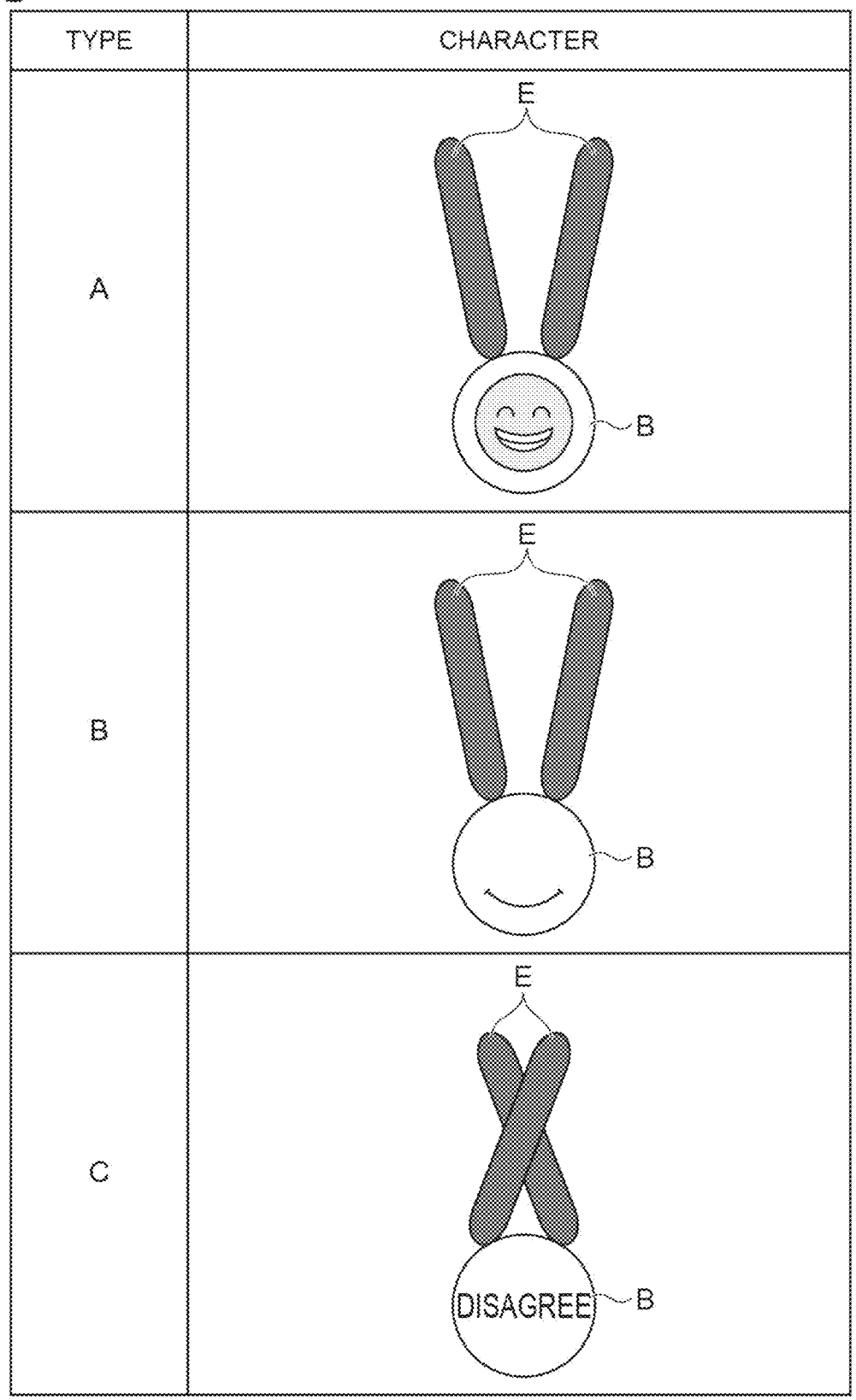
FIG. 14 is a diagram illustrating an example of an animation operation according to the modified example.

As illustrated in Type B in FIG. 14, an image set in advance is displayed in the icon B. The image can be arbitrarily set (generated) by a user. In the example representing Type B in FIG. 14, an image imitating a form of a mouth (a smile bar) is illustrated. Information relating to a feeling and an operation of a user is associated with each image. The image may be automatically selected and displayed in accordance with at least one of a feeling and an operation of a user or may be selected and displayed in accordance with an operation of a user. In the case of automatic selection, for example, in a case in which a user shows a feeling of happiness and/or a user generates a laughing sound, the control unit 12 generates control data for displaying an image representing a smiling face. In the case of manual selection according to an operation of a user, an arbitrary pictograph may be selected from a list of images, or an image may be selected in accordance with a predetermined operation (a key operation or the like).

As illustrated in Type C in FIG. 14, text is displayed in the icon B. The text may be set in advance or may be input by a user. The text may be automatically selected and displayed in accordance with at least one of a feeling and an operation of a user or may be selected and displayed in accordance with an operation of a user. In the case of automatic selection, for example, in a case in which a user shows an attitude of disagreement to speech generated by another user (crossing index fingers in front of his or her chest or the like) and/or in a case in which the user gives predetermined words ("disagree" or the like), the control unit 12 generates control data for displaying text of "disagreement". In the case of manual selection according to an operation of a user, an arbitrary pictograph may be selected from a list of texts, or text may be selected in accordance with a predetermined operation (a key operation or the like).

In addition to the first embodiment described above, information relating to a visual line of a user may be displayed in each of the characters C1, C2, and C3. The control unit 12 generates control data for displaying information relating to visual lines in the characters C1, C2, and C3 on the basis of the detected visual line of the user. Hereinafter, specific description will be presented with reference to FIGS. 15 to 18. In the following description, an appearance of a user U1 and a user U2 having a phone call will be described as an example. Type A illustrated in FIG. 15, Type A illustrated in FIG. 16, Type A illustrated in FIG. 17, and Type A illustrated in FIG. 18 represent phone call screens G of the terminal 10 of the user U1, and Type B illustrated in FIG. 15, Type B illustrated in FIG. 16, Type B illustrated in FIG. 17, and Type B illustrated in FIG. 18 represent phone call screens G of the terminal 20 of the user U2.

Figure 15:
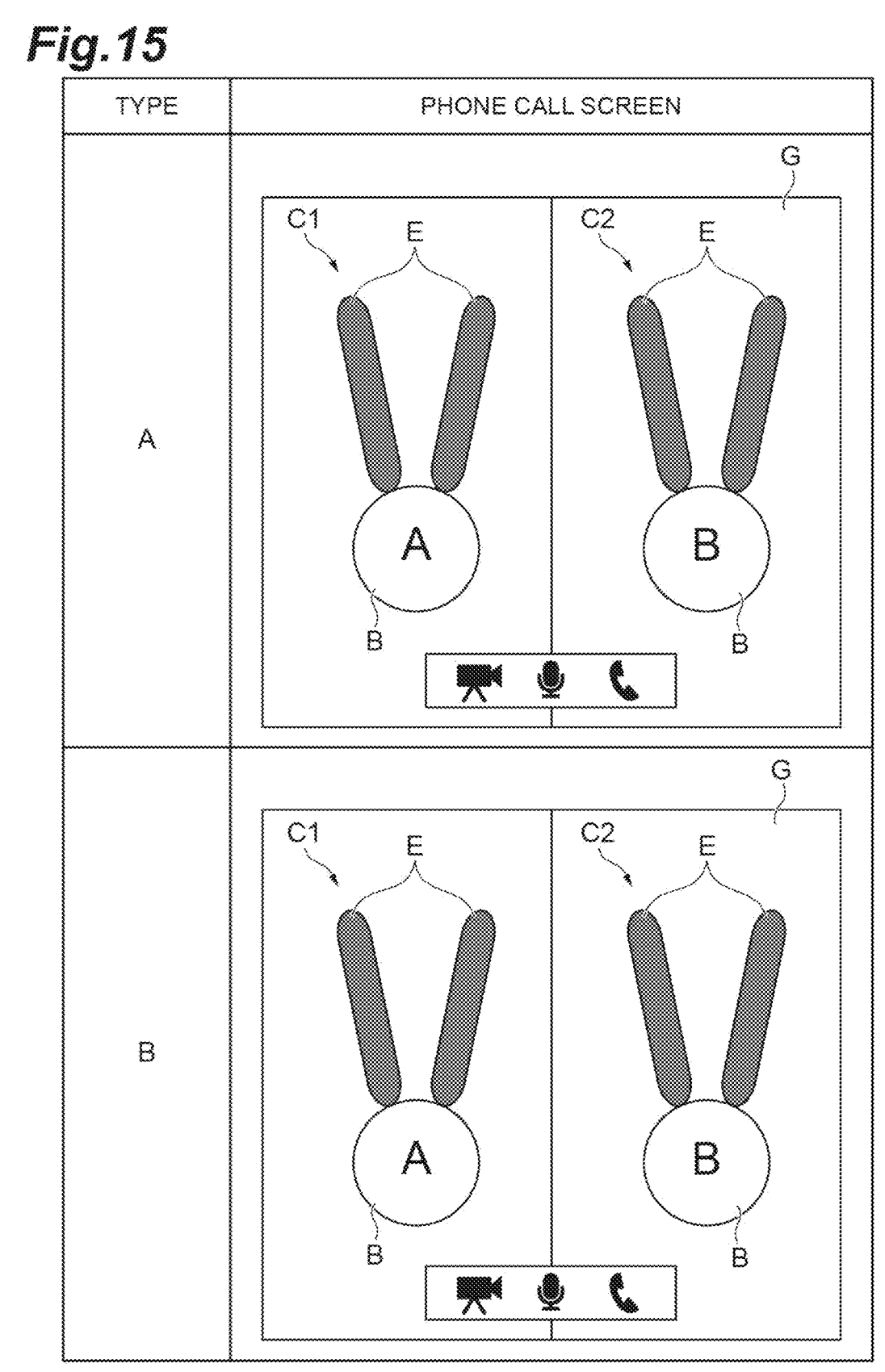
Figure 16:
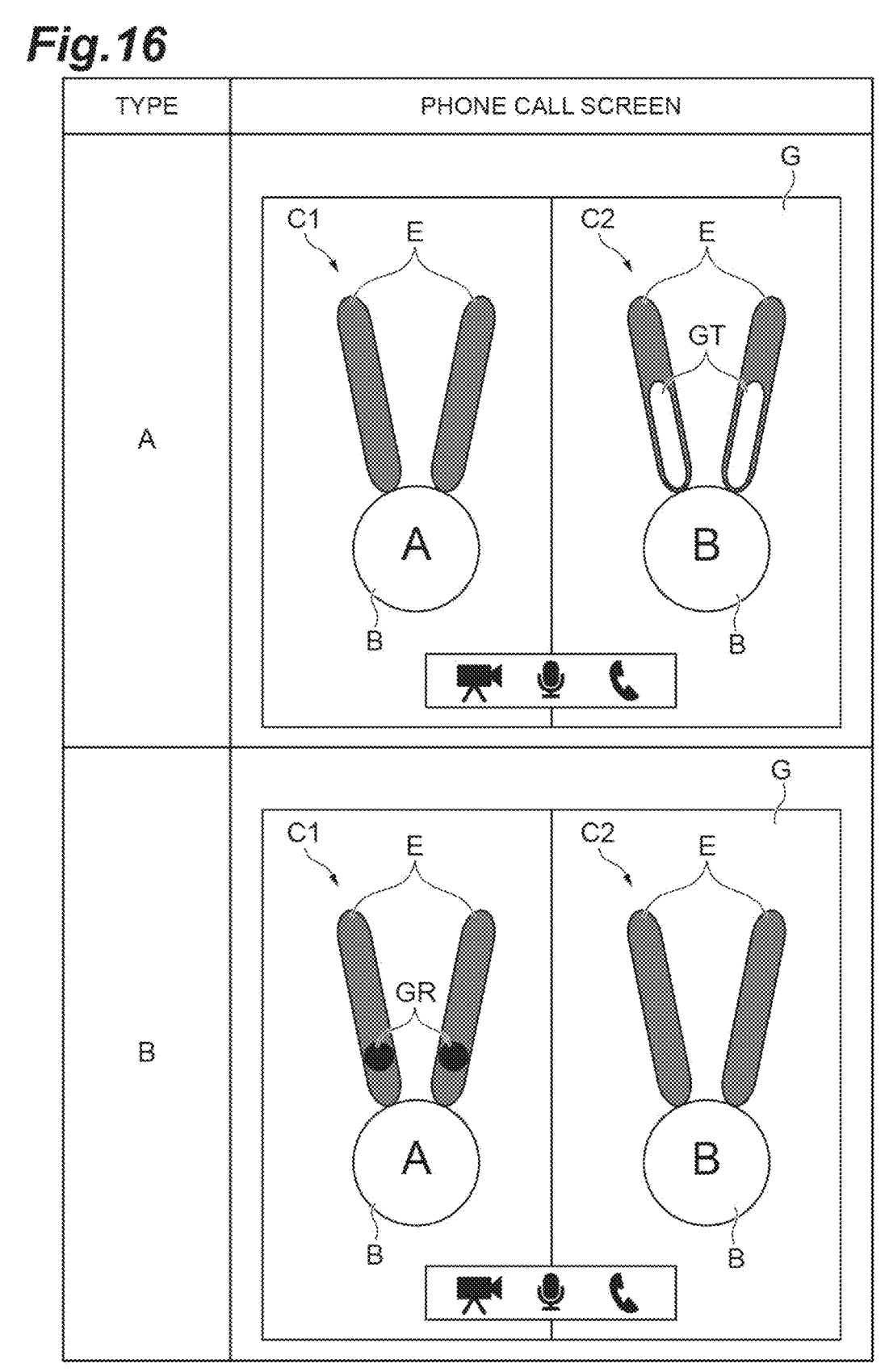

In Type A and Type B illustrated in FIG. 15, the user U1 and the user U2 do not respectively gaze at the character C1 and the character C2. In other words, the visual lines of the user U1 and the user U2 are not respectively on the character C1 and the character C2. As illustrated in Type A in FIG. 16, when the user U1 gazes at the character C2 of the user U2, visual line transmission information GT is displayed in the ear animation E of the character C2. The visual line transmission information GT represents that the user U1 gazes at the character C2. The visual line transmission information GT, for example, represents an oval or the like. The visual line transmission information GT, for example, imitates an eye line of the eye. In addition, when the user U1 gazes at the character C2 of the user U2, as illustrated in Type B in FIG. 16, visual line reception information GR is displayed in the ear animation E of the character C1. The visual line reception information GR represents that the user U1 gazes at the character C2. The visual line reception information GR, for example, is a black circle and exhibits a circle shape. The visual line reception information GR, for example, imitates a pupil of the eye.

Figure 17:
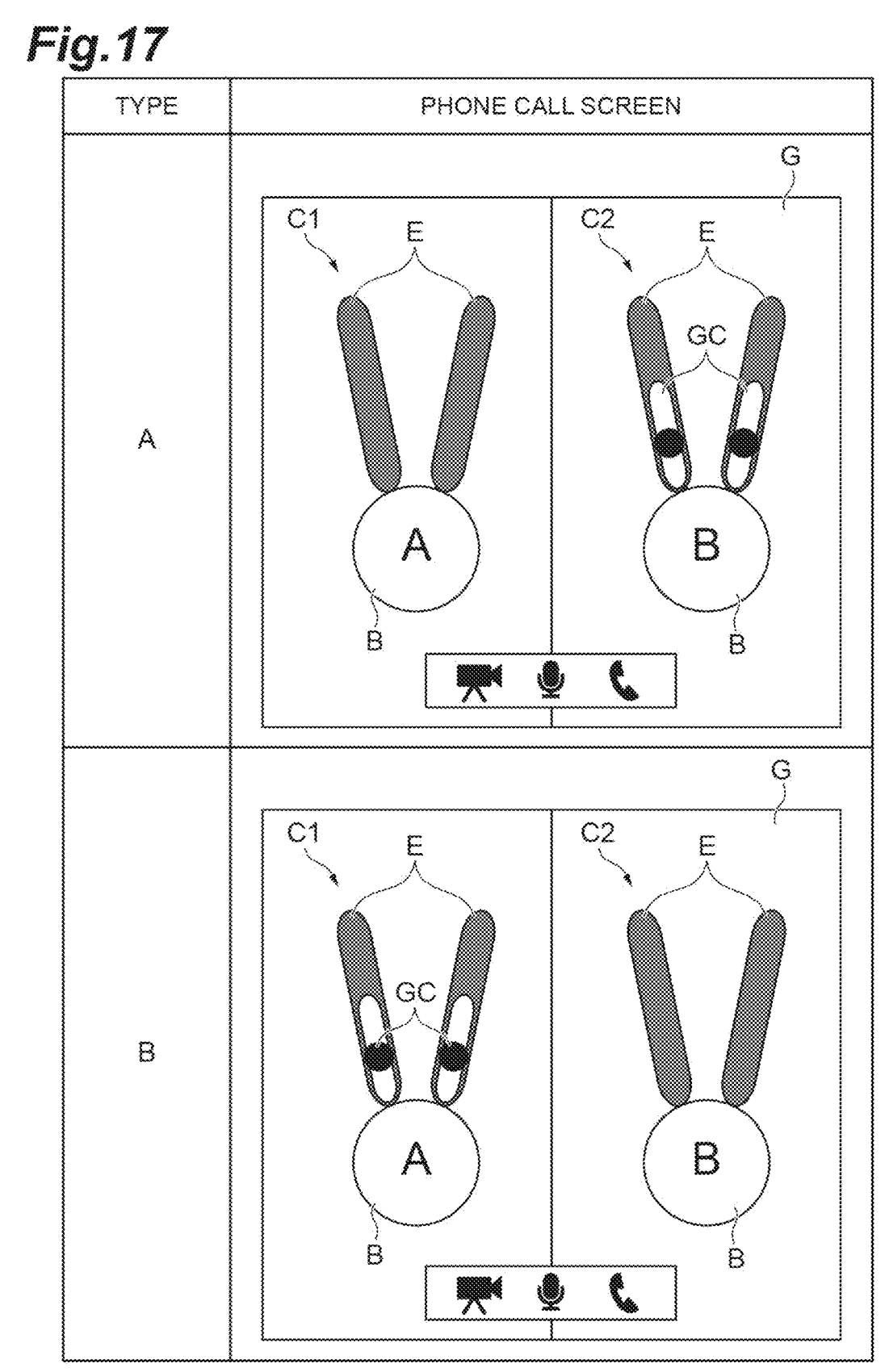

In addition, when the user U2 gazes at the character C1 of the user U1, as illustrated in Type A in FIG. 17, visual line match information GC is displayed in the ear animation E of the character C2. The visual line match information GC represents that the user U1 gazes at the character C2, and the user U2 gazes at the character C1. In other words, it presents that an eye contact is taken. The visual line match information GC, for example, has a form in which the visual line transmission information GT and the visual line reception information GR overlap each other. The visual line match information GC, for example, imitates an eye. Similarly, when the user U2 gazes at the character C1 of the user U1, as illustrated in Type B in FIG. 17, the visual line match information GC is displayed in the ear animation E of the character C1.

Figure 18:
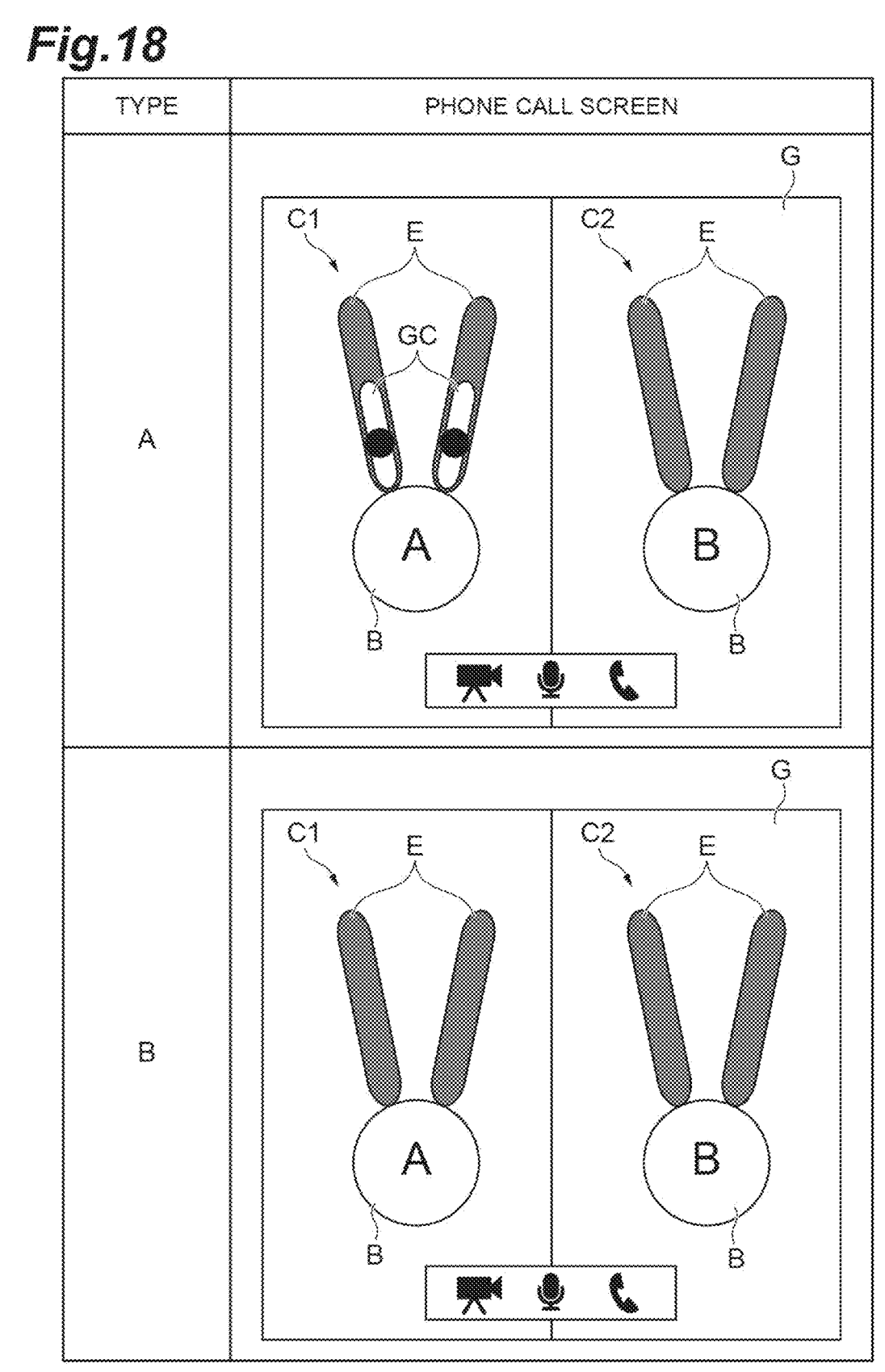

In addition, when the user U1 gazes at the character C1, as illustrated in Type A in FIG. 18, the visual line match information GC is displayed in the ear animation E of the character C1. At this time, the user U2 does not gaze at both the character C1 and the character C2, and thus as illustrated in Type B in FIG. 18, the visual line match information GC is not displayed on the phone call screen G of the user U2.

Designs, positions, sizes, and the like of the visual line transmission information GT, the visual line reception information GR, and the visual line match information GC can be appropriately set. In addition, in a case in which there are a plurality of users, and a specific user is a speech generation person (for example, in the case of a lecture or the like), the visual line transmission information GT can be set to be simultaneously displayed in characters of a plurality of users. In detecting visual lines, detection areas may be set. More specifically, as the detection areas, for example, wide areas including vicinities of the characters C1, C2, and C3 may be set, or narrow areas such as partial areas of the characters C1, C2, and C3 may be set. By setting the detection areas, control according to feelings and situations of the users U1, U2, and U3 can be performed.

A specific method for displaying the visual line transmission information GT, the visual line reception information GR, and the visual line match information GC described above will be described. In the following description, a case in which the users U1, U2, and U3 make a phone call in the terminals 10, 20, and 30 will be described. The control units 12 of the terminals 10, 20, and 30 generate control data including information relating to visual lines of the users U1, U2, and U3. The terminals 10, 20, and 30 transmit the control data to the server 40. The server 40 transmits control data to the terminals 10, 20, and 30.

The control units 12 of the terminals 10, 20, and 30 control the characters C1, C2, and C3 on the basis of the control data transmitted from the server 40. More specifically, the control unit 12 displays one of the visual line transmission information GT, the visual line reception information GR, and the visual line match information GC in each of the characters C1, C2, and C3 on the basis of control data.

As described above, by displaying the visual line transmission information GT, the visual line reception information GR, and the visual line match information GC in the characters C1, C2, and C3, the visual lines of the users U1, U2, and U3 are recognized (conceived), or an eye contact may be taken through the characters C1, C2, and C3. In accordance with this, a situation of whether a phone call partner has interest in him or her or the like can be checked, and whether a conversation is understood or the like can be checked. For this reason, smooth communication can be realized.

In the first embodiment described above, as illustrated in Type B in FIG. 7, a form in which the speech generation animation H operates to horizontally expand and contract has been described as an example. However, as the speech generation animation, in the ear animation E of the speech generation person, both ears may move from origins with the same phase, or the ears may alternately move with opposite phases. In addition, both ears of the ear animation E may change to simultaneously expand or contract in accordance with generated speech. An operation of the speech generation animation can be selected by a user.

Figure 19:
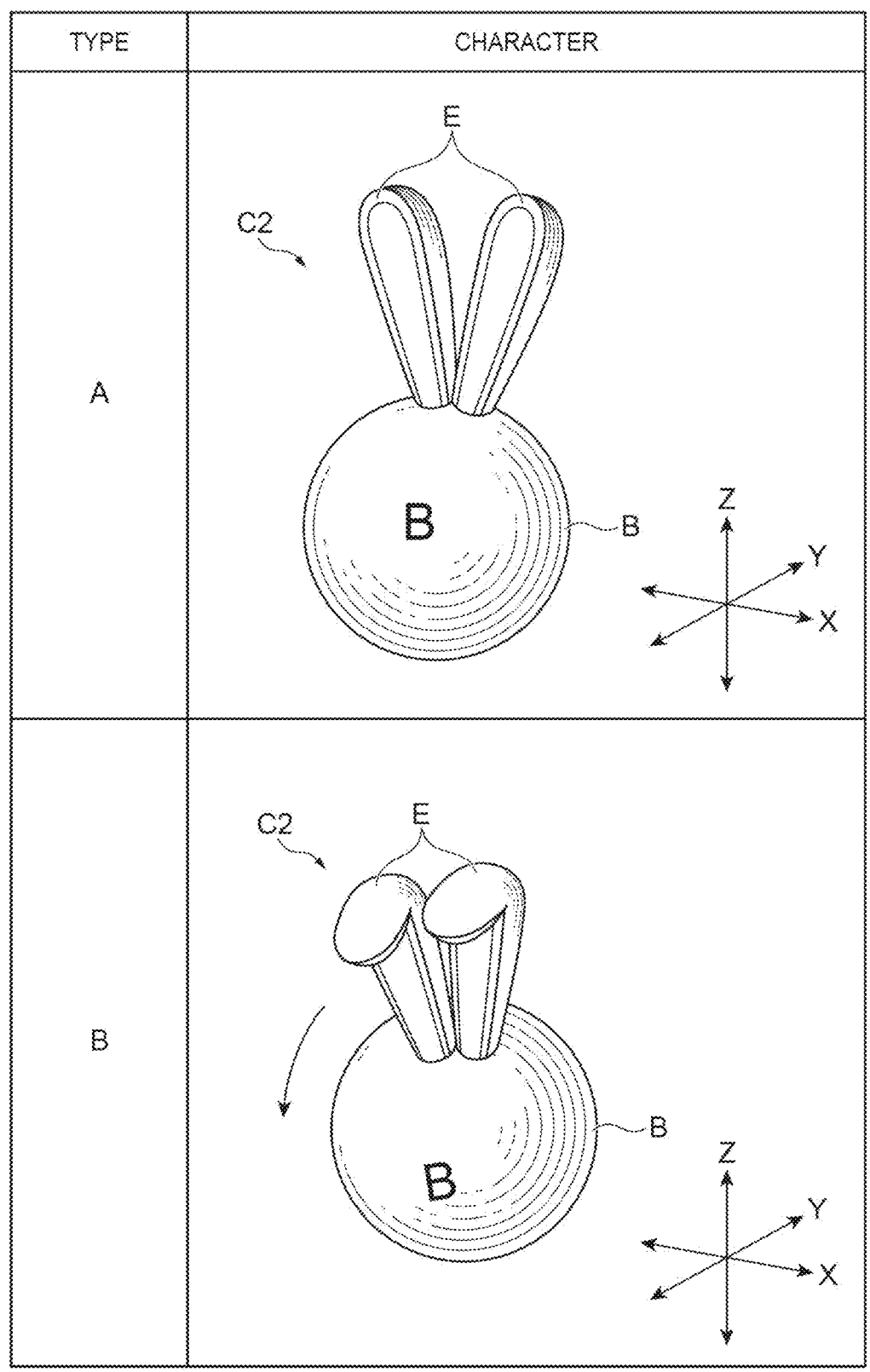
FIG. 19 is a diagram illustrating an example of an animation operation according to the modified example.
Figure 20:
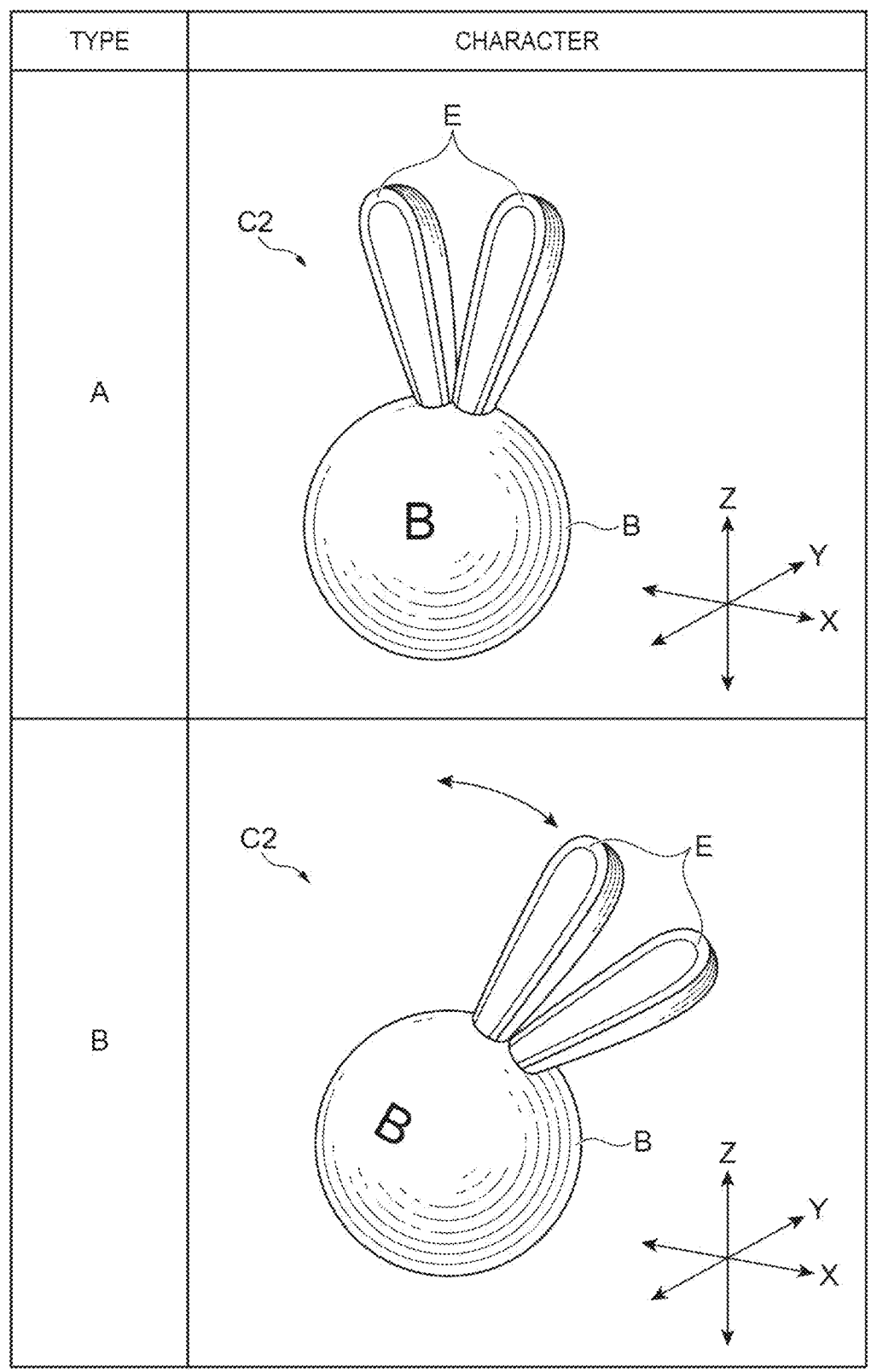
FIG. 20 is a diagram illustrating an example of an animation operation according to the modified example.
Figure 21:
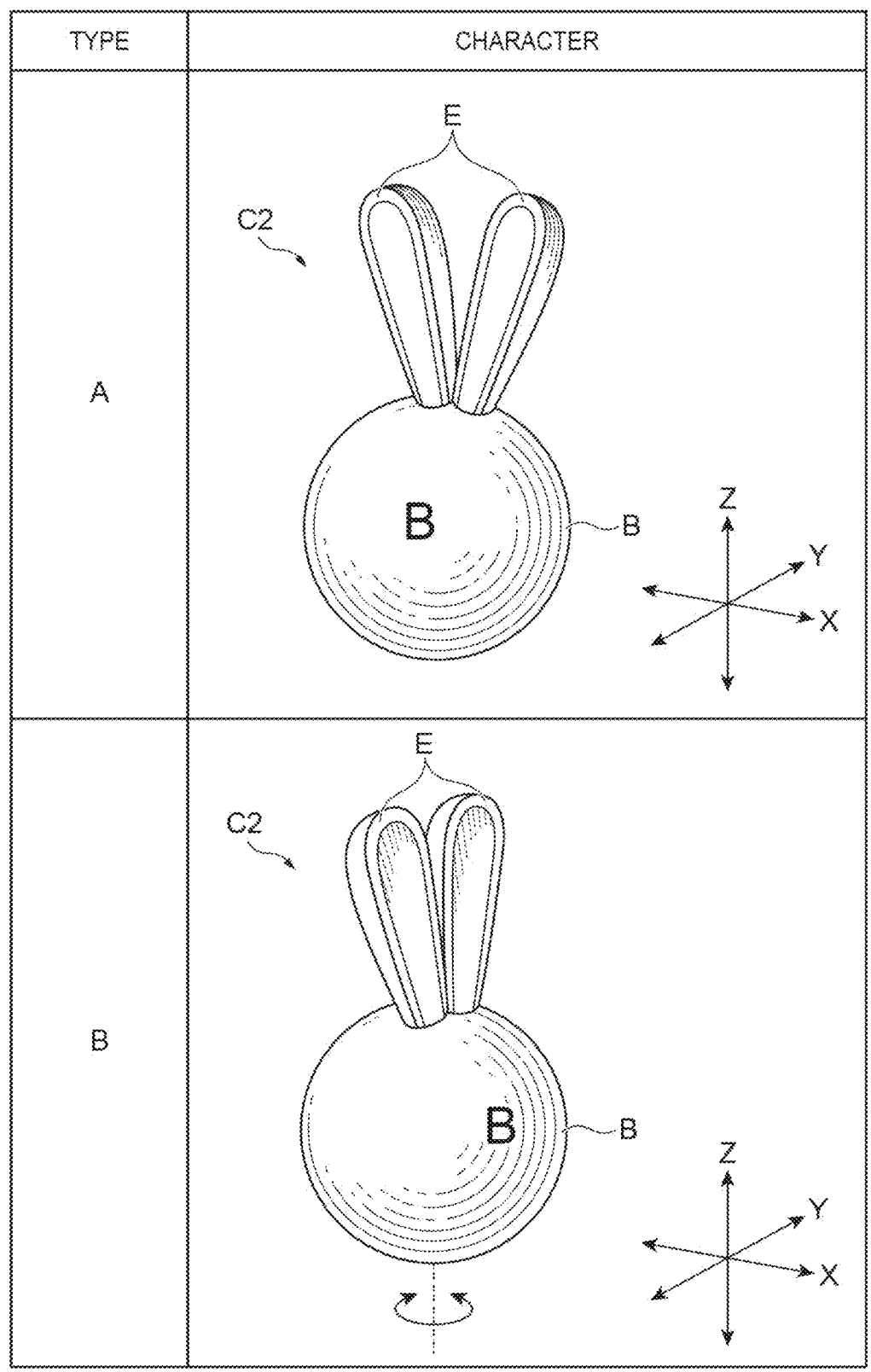
FIG. 21 is a diagram illustrating an example of an animation operation according to the modified example.

In the first embodiment described above, a form in which the characters C1, C2, and C3 are drawn using two-dimensional computer graphics has been described as an example. However, the characters C1, C2, and C3 may be drawn using three-dimensional computer graphics. A three-dimensional character will be described with reference to FIGS. 19 to 21. In FIGS. 19 to 21, a character C2 of a user U2 will be described as an example. Type A illustrated in FIG. 19, Type A illustrated in FIG. 20, and Type A illustrated in FIG. 21 represent states of the character C2 before operated, and Type B illustrated in FIG. 19, Type B illustrated in FIG. 20, and Type B illustrated in FIG. 2 represent states of the character C2 after operated.

Figure 22:
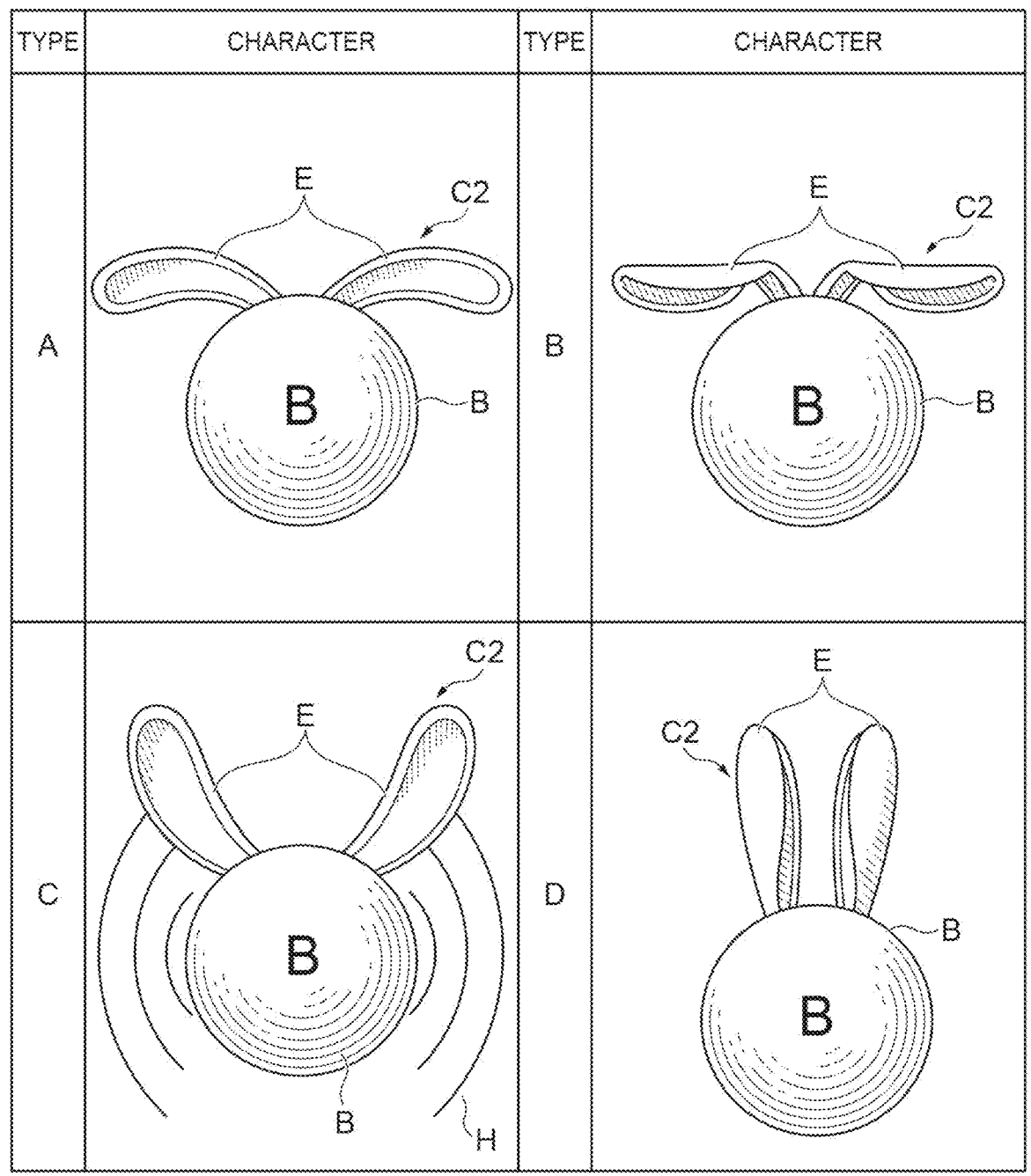
FIG. 22 is a diagram illustrating an operation of a character.

As illustrated in FIGS. 19 to 21, the character C2 is configured to include a body B and ear animations E. In the character C2, the body B and the ear animations E are integrally displayed on a phone call screen G. The body B is identification information that can be used for identifying a user who is a phone call partner. The body B includes at least one of an image representing a user and text representing the user. A shadow is displayed on the character C2. In the example illustrated in FIGS. 19 to 21, the body B exhibits a sphere shape and includes text ("B") that can be used for identifying a user. Similar to a two-dimensional character, the character C2 (C1 and C3) may be configured to include a speech generation animation (not illustrated) or may be configured to include an arm animation A (see FIG. 22).

Subsequently, an operation of the character C2 will be described. In the character C2, the body B can rotate around an X axis, a Y axis, and a Z axis. The body B operates in accordance with a change in the state of the user. Similar to the ear animation E, the body B operates in accordance with at least one of a feeling and an operation of a user. The body B may operate with details that are the same as those of the ear animation E or may operate with details different from those of the ear animation E. In the example represented in Type B illustrated in FIG. 19, Type B illustrated in FIG. 20, and Type B illustrated in FIG. 21, the body B and the ear animation E operate with the same details.

As represented in Type B illustrated in FIG. 19, in the character C2, the body B repeats an operation of rotating around the X axis back and forth, and upper parts of the ears in the ear animation E repeat bending. In a case in which the user U2 is nodding or expressing an agreement and/or the user U2 gives predetermined words (for example, "OK", "yes", or the like), the control unit 12 generates control data for causing the body B to repeat rotation back and forth around the X axis and the ear animation E of the character C1 to repeat bending at upper ⅓ parts of the ears back and forth.

As represented in Type B illustrated in FIG. 20, in the character C2, the body B repeats an operation of horizontally rotating around the Y axis, and ears are horizontally shaken in the ear animation E. In a case in which the user U2 is being in thought (tilting his or her head or the like) and/or in a case in which the user U2 gives predetermined words ("yes" or the like), the control unit 12 generates control data for causing the body B to repeat to horizontally rotate around the Y axis and causing the ears to be horizontally shaken in the ear animation E.

As represented in Type B illustrated in FIG. 21, in the character C2, the body B repeats an operation of horizontally rotating around the Z axis, and ears are horizontally shaken in the ear animation E. In a case in which a user U2 shows an attitude of disagreement to speech generated by another user (crossing index fingers in front of his or her chest or the like) and/or in a case in which the user U2 gives predetermined words ("disagree" or the like), the control unit 12 generates control data for causing the body B to repeat to rotate around the Z axis and causing the ears to be horizontally shaken in the ear animation E. In the operation of the body B, the body B and the text ("B") may be integrally moved, or only the body B may be moved with the text fixed.

As the operation of the character C2, in addition to the operations described above, as illustrated in Type A in FIG. 22, in a case in which the user U2 is away from his or her seat, the ears may be horizontally tilted in the ear animation E, and as illustrated in Type B in FIG. 22, in the case of an apology, the ears may be deeply bent in the ear animation E. In addition, as illustrated in Type C in FIG. 22, in the case of during speed generation, the speech generation animation H may be displayed on the background. Furthermore, as illustrated in Type D in FIG. 22, in the case of being comfortable, the ears may be rotated in the ear animation E.

Figure 23:
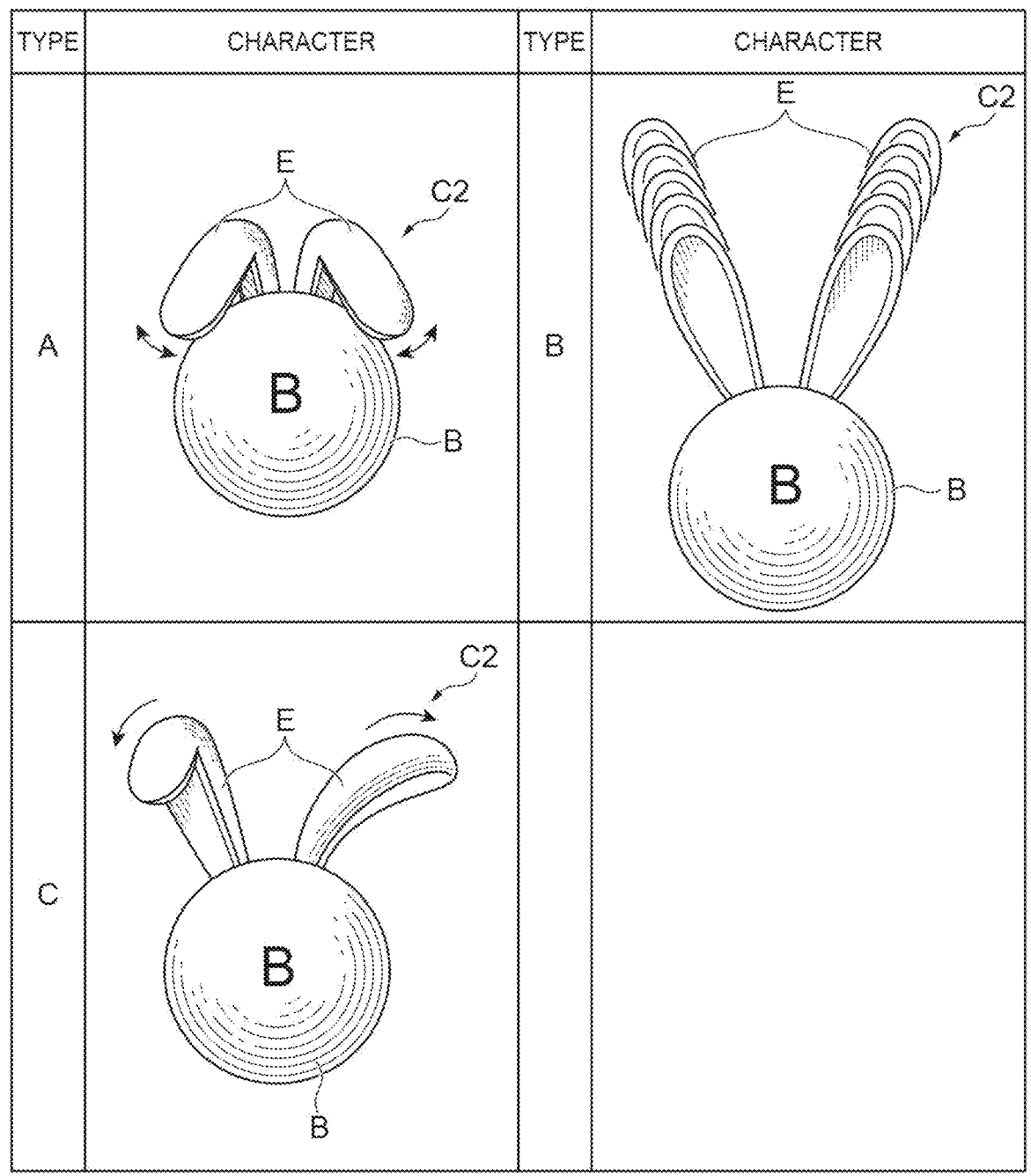
FIG. 23 is a diagram illustrating an operation of a character.

In addition, as illustrated in Type A in FIG. 23, in the case of being in through, an operation of scratching the body B may be caused to be performed in the ear animation E. Furthermore, in the case of during speech generation, as illustrated in Type B in FIG. 23, the ears may be expanded and contracted to a voice rhythm in the ear animation E, and as illustrated in Type C in FIG. 23, the ears may be shaken back and forth to a voice rhythm.

In addition, the shadow displayed in the character C2 may be changed in accordance with the state of the user U2. For example, in a case in which the feeling of the user U2 is "sad", the number shadows may be increased. In such a configuration, the state of the user U2 is expressed using shadows, and thus other users U1 and U3 can perceive the state of the user U2 more accurately. In addition, in accordance with the presence of the shadows, a stereoscopic effect is emphasized, and the expression and the non-verbal representation of the character C2 can be reinforced.

Figure 24:
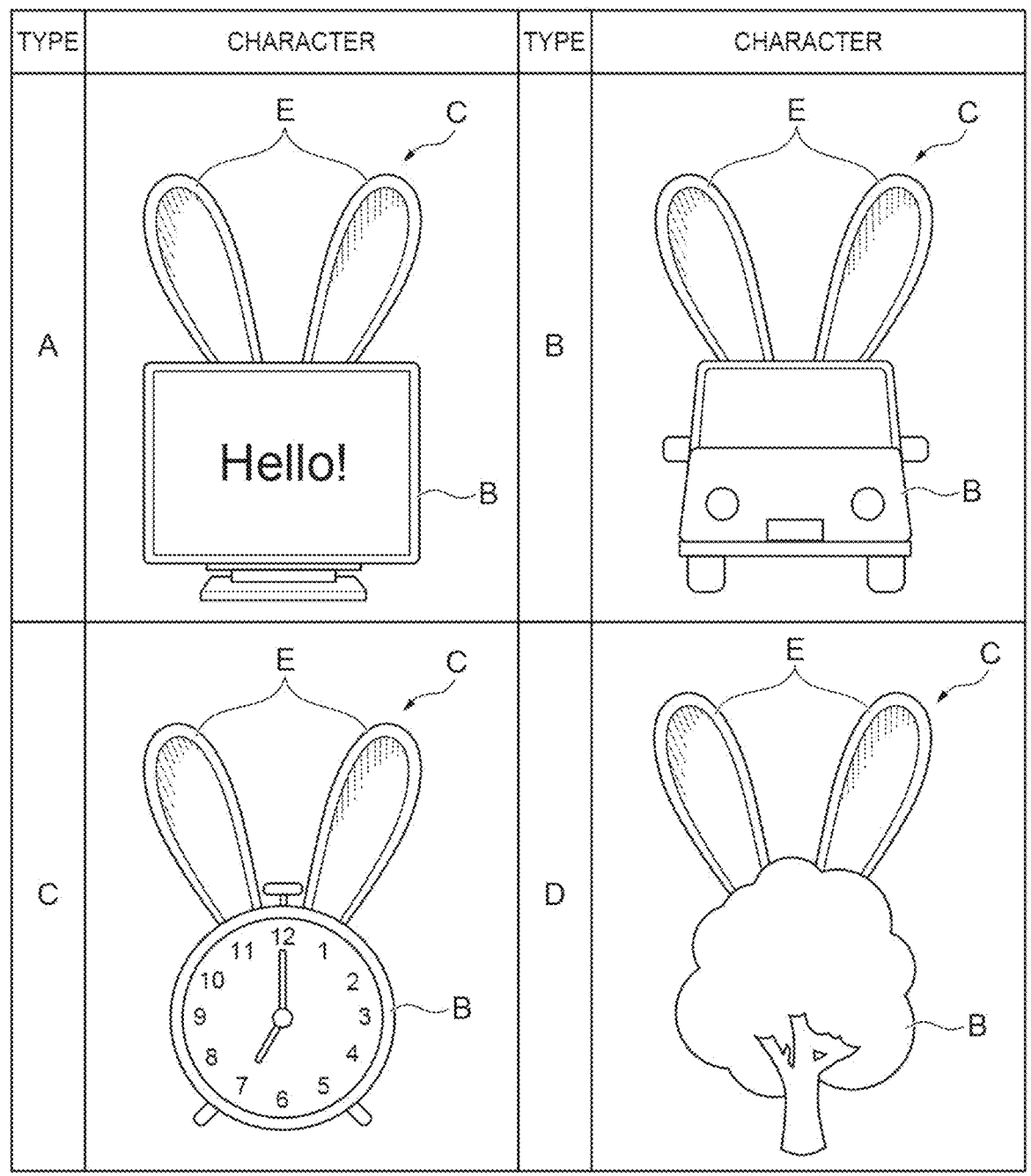
FIG. 24 is a diagram illustrating a character according to a modified example.

In addition, the body B is not limited to the sphere shape. As illustrated in Type A in FIG. 24, in the character C, the body B may have a form imitating a display. In such a case, for example, a translated sentence of generated speech details of a speech generation person (for example, "Hello!" or the like) may be displayed in the body B. In addition, the body B may have a shape imitating a car as illustrated in Type B in FIG. 24, may have a shape imitating an alarm clock as illustrated in Type C in FIG. 24, or may have a shape imitating a tree as illustrated in Type D in FIG. 24. The body B may be changed, transformed, or the like in accordance with the state of the user.

Figure 25:
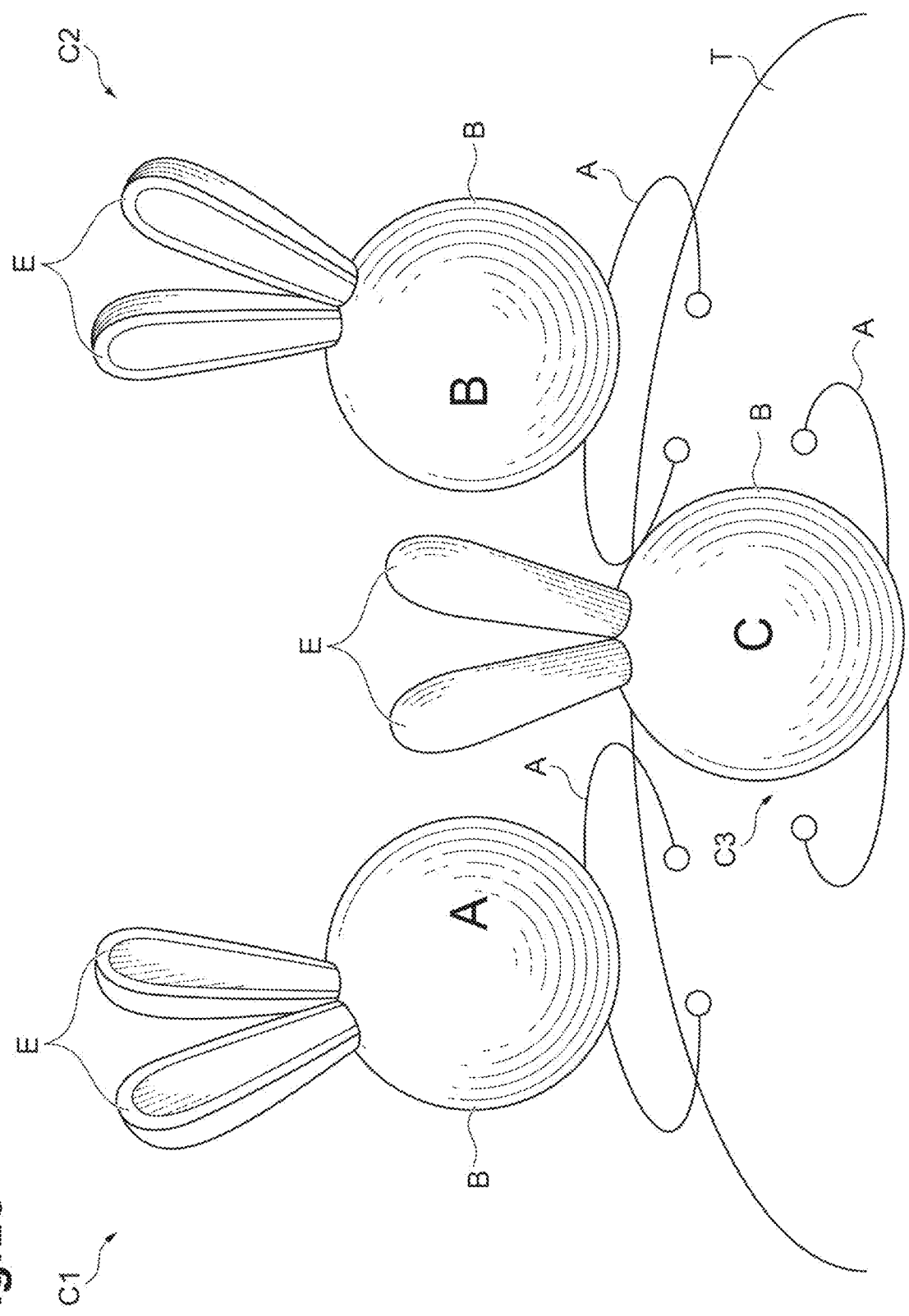
FIG. 25 is a diagram illustrating an example of communication according to a modified example.

In the first embodiment described above, as illustrated in FIG. 2, a form in which the characters C1, C2, and C3 are displayed inside respective partitioned areas on the phone call screen G has been described as an example. However, the characters C1, C2, and C3 may be displayed in one space (a continuous background space). FIG. illustrates a state in which characters C1, C2, and C3 of three dimensions are on the phone. As illustrated in FIG. 25, for example, a table T is displayed as an object in one space. The characters C1, C2, and C3 are displayed to surround the table T and face each other. The characters C1, C2, and C3, for example, are disposed at even intervals (intervals of 60°) in the table T. In the example illustrated in FIG. 25, the characters C1 and C2 are displayed to surround the table T and face each other in a state of being diagonally inclined. The character C3 is displayed to be on the rear side at the center of the screen. In a case in which the screen illustrated in FIG. 25 is a screen of the terminal 30 of the user U3, the character C3 of the user U3 may be displayed to be on the rear side as a default. In such a case, the ear animations E of the characters C1 and C2 of other users U1 and U2 become easily viewable, and thus the states of the other users U1 and U2 can be perceived accurately.

By rotating the table T, the positions of the characters C1, C2, and C3 can be changed. In addition, the observation point of view can be changed. For example, the observation point of view can be changed to a point of view (a bird's eye viewpoint) like looking down the characters C1, C2, and C3 from the above. The change of the point of view may be performed by a manual operation using a keyboard or the like or may be performed on the basis of sensing of a wearable sensor. In this way, by displaying the characters C1, C2, and C3 in one continuous space, a sense of presence in the same space can be generated. In accordance with this, a conversation having a sense of presence and a sense of unity can be realized.

For example, in the form of a remote lesson, the observation point of view may be set to a point of view at which a student gazes at a teacher. In the case of the teacher, the observation point of view may be set to a point of view at which students are gazed from a platform. In this way, by setting the observation point of view to the same point of view as that of an actual lesson, a sense of presence and a sense of immersion can be improved. In addition, the teacher can easily take reactions of students and can feed back the reactions to the progress of a lesson.

In addition, as illustrated in FIG. 25, for example, even in a case in which the rear side of the character C3 is displayed or in a case in which display is performed at the bird's eye visual point, each ear animation E is disposed at an upper part of the body B, and thus the operations of the ear animations E of the characters C1, C2, and C3 can be checked from every direction. For this reason, even in any display form, the states and the situations of the characters C1, C2, and C3 can be recognized (perceived).

The operations of the characters C1, C2, and C3 may be controlled on the basis of information relating to visual lines of the users U1, U2, and U3. The control unit 12 generates control data for controlling the operations of the characters C1, C2, and C3 on the basis of the detected visual lines of the users. For example, in a case in which the user U1 gazes at the character C2, the character C1 is caused to face the character C2. In other words, the body B and the ear animation E of the character C1 are rotated around the Z axis, for example, by 30° such that the character C1 faces the character C2. In accordance with this, the ear animation E of the character C1 faces the character C2. In a case in which the visual lines of the users U1, U2, and U3 are not on the characters C1, C2, and C3, the characters C1, C2, and C3, may be configured to face the front side.

The operations of the characters C1, C2, and C3 based on information relating to the visual lines may not completely match the visual lines of the users U1, U2, and U3. For example, even in a case in which the user U1 matches his or her visual line to the character C2 and then immediately avoids the visual line, the character C1 may face the character C2 for a predetermined time. In other words, a stop time may be set such that the characters stop in the state facing each other for a predetermined time. In addition, a speed at which the user U1 moves the visual line to the character C2 and a speed at which the characters C1, C2, and C3 rotate may not match each other. In other words, the rotation speed of the characters C1, C2, and C3 may be configured to be settable. In accordance with such a setting, the characters C1, C2, and C3 can be configured not to frequently rotate in accordance with the visual lines of the users U1, U2, and U3, and thus movement of the characters C1, C2, and C3 can be avoided from being an obstacle for a conversation.

As described above, by operating the characters C1, C2, and C3 on the basis of information relating to the visual lines, the visual lines of the users U1, U2, and U3 can be recognized (perceived), or an eye contact can be taken through the characters C1, C2, and C3. In accordance with this, a situation of whether a phone call partner has interest in him or her or the like can be checked, and whether a conversation is understood or the like can be checked. For this reason, smooth communication can be realized.

In addition, the characters C1, C2, and C3 may be operated regardless of the visual lines of the users U1, U2, and U3. For example, the characters C1, C2, and C3 may be operated on the basis of detection results acquired by wearable sensors (acceleration sensors or the like) of the users U1, U2, and U3. The characters C1, C2, and C3 may be operated on the basis of the visual lines and the detection results. In addition, for example, in a case in which the user U1 generates speech, the characters C2 and C3 may be configured to face the character C1. Furthermore, for example, in a case in which the user U1 calls the user U3, the character C1 may be configured to face the character C3. In addition, the directions of the characters C1, C2, and C3 may be configured to be manually changeable arbitrarily, the characters C1, C2, and C3 may be configured to be sequentially directed, or the characters C1, C2, and C3 may be configured to be randomly directed.

In the embodiment described above, a form in which the ear animations E and/or the arm animations A operate in accordance with changes (a feeling and an operation) in the states of users has been described as an example. However, the ear animations E and/or the arm animations A may operate in accordance with an input of a user. In such a configuration, the operations of the animations, for example, are controlled by an input according to a key operation on a device operated by the user (an operation result). More specifically, an animation operation and a key operation are associated with each other in advance. A user controls operations of characters by performing a predetermined key operation. For example, upper parts of the ears of the ear animation E may be configured to be bent back and forth once by clicking (pressing) a down arrow key. In accordance with this, agreement, appreciation, apology, and the like can be expressed. In addition, the ear animation E may be configured to perform hand clapping in accordance with a click on an up arrow key. In accordance with this, compliment, gratitude, happiness, and the like can be expressed. In addition, a right ear of the ear animation E may be configured to be grown and inclined in accordance with a click on a right cursor key. In accordance with this, interruption, surprise, disagreement, and the like can be expressed. In addition, the ear animation E may be configured to be grown and entangled in accordance with a click on a left cursor key. In accordance with this, a doubt, anxiety, a problem, and the like can be expressed. An operation may be continued in accordance with a time interval during which a key is pressed. In addition, the operation performed by a user is not limited to a key operation but may be a screen touch, a gesture, movement of a visual line, or the like.

In addition, the ear animations E and/or the arm animations A may be operated in accordance with an operation time of a device. For example, in a click on a down cursor key, upper parts of the ears of the ear animation E are lightly bent back and forth once in accordance with one click of the key, and the upper parts of the ears of the ear animation E are slowly bent back and forth once in accordance with a long press of the key. In other words, one click can express light bending, and a long press can express deep bending. Similarly, in a click on each of an up arrow cursor key, a right arrow cursor key, and a left arrow cursor key, the operation can be changed in accordance with one click or long-press click.

In addition to the embodiment described above, levels of magnitudes, speeds, and the like of the operations of the ear animation E and/or the arm animation A may be configured to be adjustable. The magnitude of the operation, for example, is a swing angle, an inclination angle, or the like of the ear animation E. For example, for the magnitude of the operation, a strength level (a strength coefficient) is set, and the strength level is configured to be arbitrary adjustable for a user. In accordance with this, the ear animation E and/or the arm animation A can be operated with magnitudes intended by the user. In such a configuration, even in a case in which a user is poor at expressing feelings, the user can convey his or her state more strongly. In addition, adjustment of various levels may be set in advance or may be performed during a phone call. In a case in which adjustment is performed during a phone call, for example, two numbers can be used. For example, in a case in which the operation speed is operated, the operation speed may be increased when "1" is pressed, and the operation speed may be decreased when "2" is pressed. In a case in which the magnitude of the operation is adjusted, the operation may become smaller when "3" is pressed and the operation may become larger when "4" is pressed.

In addition, the magnitudes, the speeds, and the like of the operations of the ear animation E and/or the arm animation A may be changed on the basis of at least one of voice data and appearance data, in other words, at least one of a feeling and an operation of the user. For example, the magnitudes, the speeds, and the like of the operations of the ear animation E and/or the arm animation A may be changed in accordance with the magnitude of movement of the user and the magnitude of the sound. More specifically, for example, the inclination of the ears may be set on the basis of the tone of the sound, and the flattering condition of the ears may be set on the basis of the speed of the sound. In details, in the case of a user quickly talking with a high pitch, the inclination of the ears is changed to a small inclination of the ears with a short period. On the other hand, in the case of a user slowly talking with a low pitch, the inclination of the ears is changed to a large inclination of the ears with a long period.

In addition to the embodiment described above, at least one of the positions and the sizes of the characters C1, C2, and C3 may be configured to be changeable for the users U1, U2, and U3. The users U1, U2, and U3 can freely change the positions and the sizes by performing a predetermined operation. In accordance with this, positions can be set like in a space in an actual situation such as a panel discussion, a guest seat, a speaker seat, and the like. In addition, the positions can be determined on the basis of the name of the user, or the position can be determined on the basis of the role. Furthermore, in the case of a lecture, a visual emphasis such as enlargement of a lecturer can be performed as well.

In addition to the embodiment described above, the ear animations E may be operated as basic biological presence information of the users U1, U2, and U3. The basic biological presence information is information that indicates presence of the users U1, U2, and U3. In a case in which the users U1, U2, and U3 participate in a video conference or the like, when the users sit in front of the terminals 10, 20, and 30, in addition to a standing-up operation of the ear animation E, a vibration corresponding to respiration is given. In accordance with this, even when the users U1, U2, and U3 are doing nothing, motion of a life as presence can be conveyed. In addition, in a case in which a user is performing typing as presence with no conversation or a state observation mode, the ear animation E can be configured to perform a typing image operation (a typing operation at an ear tip end). When a user leaves the seat in front of the terminal, ears may be configured to fall in the ear animation E.

In the embodiment described above, as illustrated in FIG. 2, a form in which all the users U1, U2, and U3 are represented by the characters C1, C2, and C3 has been described as an example. However, in a case in which a phone call is performed by a plurality of users, some of the users may use actual videos.

In addition to the embodiment described above, a function for adding a representation design to the state animation and/or the arm animation A may be provided. For example, even in a case in which the arm of the user is not moving, the arm animation A may be operated in accordance with generated speech details, a sound volume, a rhythm, and the like. In addition, in a case in which the users U1, U2, and U3 are singing songs or moving parts of the bodies (for example, a hand, a foot, a neck, a head, or the like), the characters C1, C2, and C3 may be designed to do performances (dances or the like). In addition, in a case in which music is playing, the operations may be synchronized or tuned with the music. The movement of the body can be sensed using an acceleration sensor, a myoelectric sensor, or the like. The representation design function is settable for a user. The representation design function, for example, may be a function that is effective for users who are physically disabled.

In addition to the embodiment described above, AI characters may be displayed in addition to the characters C1, C2, and C3. For example, an AI character as a facilitator may be displayed in addition to the characters C1, C2, and C3. In addition, AI stewards, which are dedicated for users, assisting the users U1, U2, and U3 may be configured to be accompanied. The AI stewards, for example, are displayed besides the characters C1, C2, and C3. The AI stewards are responsible for a role of multilaterally assisting conversations of the users U1, U2, and U3. As assisting, there are schedule management, file management, provision of text, video, and visual materials, output of voice information, and the like. In addition, the AI steward may automatically display information relating to a conversation or may search for necessary information and display the information.

In addition to the embodiment described above, details of a video conference and the like may be recorded and analyzed. For example, by collecting and analyzing information relating to generation of control data of the ear animations E and/or the arm animations A, a situation and characteristics of a conversation and characteristics, relationship, feelings, and the like of members, participating in the conversation can be multilaterally analyzed. A result of the analysis may be displayed using graphs, text, and the like.

In addition to the embodiment described above, a use status of operation patterns used in state animations (the ear animations E and/or the arm animations A) may be displayed at a predetermined timing. As the use status, at least one of a use ratio of operation patterns used by the users U1, U2, and U3 and a change in the use frequency of operation patterns corresponding to the time axis may be displayed. In this configuration, by displaying a use status (a use history)

of operation patterns of the state animation at a predetermined timing (for example, during communication (during presentation, during a conversation, or the like), after the end of communication, a trend of reactions of the users U1, U2, and U3 and the like can be checked.

As described above, by displaying the use status of operation patterns used in the state animation during communication or at the end of communication, communication in which reactions such as a thinking state, a feeling state, and the like of participants of a video conference or the like are taken can be easily taken. For example, a feedback can be performed on the basis of whether a use ratio of an operation pattern reacting for an agreement such as "Yes" to a question of "Are you sufficiently understood in accordance with this description?" from a presenter or a teacher is 100% or about 20 to 30%, and a way in which the progress is made is also changed. Particularly, by displaying a use ratio of participants in real time, reaction learning in real time and reinforcement of reactions can be easily advanced.

In addition, for example, by representing a use frequency change in the operation patterns of state animations corresponding to "nodding" on the time axis, it can be perceived which feeling reactions and which thinking reactions could have been acquired using non-verbal information as a clue in the entire flow. In addition, for example, by using data of speech generation non-verbal information, switching pattern between a listener and a speaker, a time ratio as a standpoint of a listener, a reaction status thereof, and the like can be used also as analysis data of the quality of communication and enhancement information of communication power. By checking a use status of operation patterns together with voice recording, post-checking of a non-verbal expression for conversation details can be easily performed.

In addition to the embodiment described above, the operation of the ear animation E may be changed in accordance with attributes of the users U1, U2, and U3. Examples of the attributes include nationality, a people, gender, a language, and the like. For example, although "agreement" is expressed by shaking the neck back and forth in a culture of a certain country, "agreement" may be expressed by horizontally shaking the neck in a culture of another country. In this case, when the same ear animation E is used for "agreement", the thinking way of a recipient is different in accordance with a difference in culture. For this reason, the operation of the ear animation E is changed (set) on the basis of information relating to attributes of the users U1, U2, and U3. In this configuration, by changing the operation of the ear animation E, for example, in accordance with the nationality as an attribute, occurrence of misunderstanding according to a difference in culture can be avoided. In this way, various different cultures can be handled, and thus smooth communication can be realized.

In the embodiment described above, a form in which the state animation is the ear animation E has been described as an example. However, the state animation may be in a different form. For example, the state animation may be an animation imitating an angle, hair, or the like. For example, as illustrated in Type A in FIG. 26, the state animation may imitate a tactile sense of an insect (for example, an ant). As illustrated in Type B in FIG. 26, the state animation SA may imitate a structure such as an antenna. As illustrated in Type C in FIG. 26, the state animation SA may imitate a horn of an animal (for example, a deer). As illustrated in Type D in FIG. 26, the state animation SA may imitate a plant (for example, a sunflower).

Figure 26:
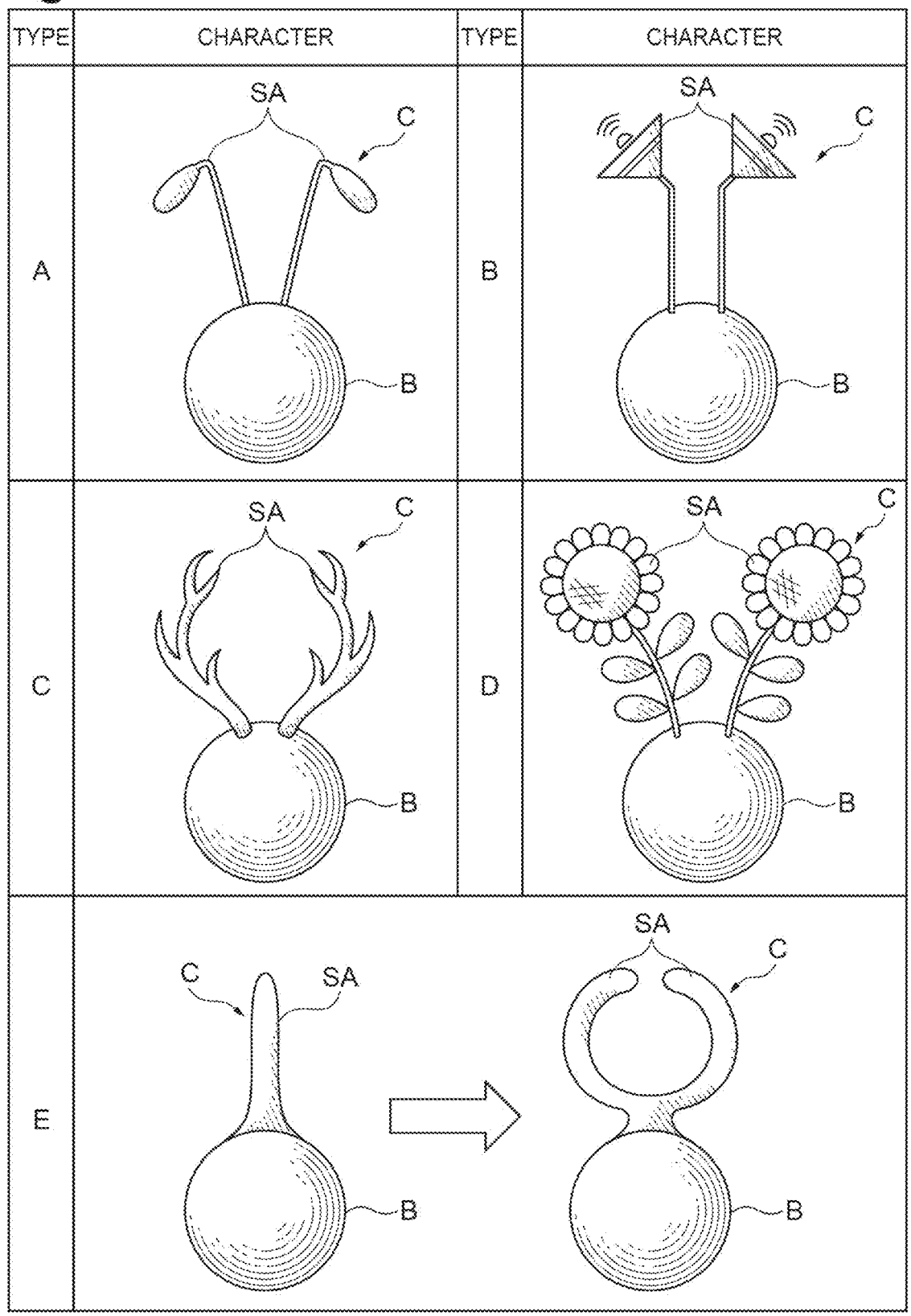
FIG. 26 is a diagram illustrating a character according to a modified example.

In addition, as illustrated in Type E in FIG. 26, the display form of the state animation SA may be transformed in accordance with the state of a communication target. For example, one angle may be transformed into two angles. In addition, for example, the body B having a sphere shape may be transformed into a display illustrated in Type A in FIG. 24. In this configuration, by transforming the state animation, the state of the communication target can be perceived more accurately.

Figure 27:
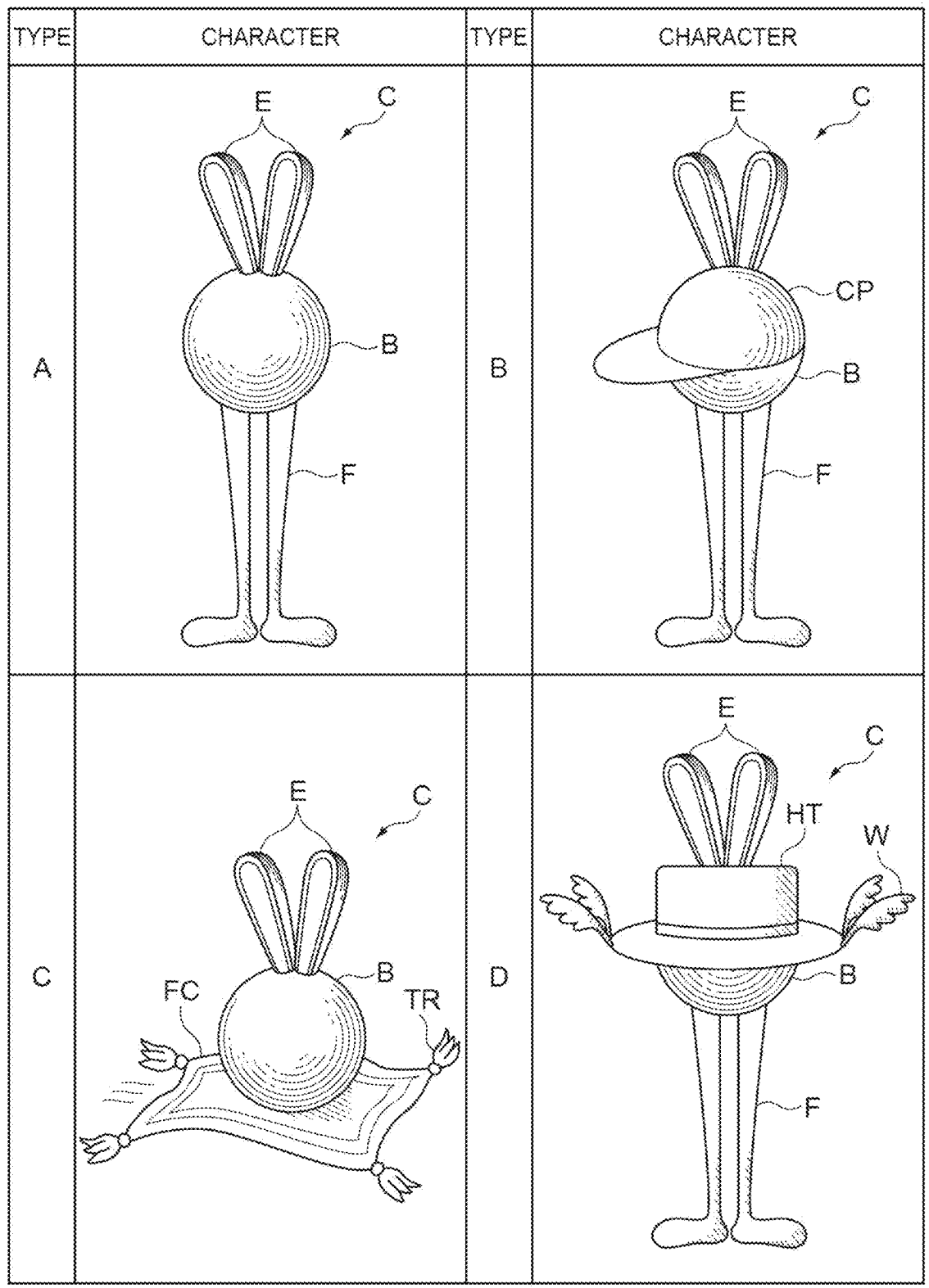
FIG. 27 is a diagram illustrating a character according to a modified example.

In addition, as illustrated in Type A in FIG. 27, the character C may further include a leg animation F. The leg animation F is an animation imitating a leg and operates in accordance with a change in the state of the user. The leg animation F, similar to the ear animation E, may operate in accordance with at least one of a feeling and an operation of a user or may operate on the basis of environment information. A character C may move in accordance with the states of the users U1, U2, and U3. As illustrated in Type B in FIG. 27, the character C may wear a cap CP. In such a configuration, in a case in which the character C moves, the direction of a flange of the cap CP may be changed in accordance with a movement direction of the character C. As illustrated in Type C in FIG. 27, the character C may ride on a rider such as a flying carpet FC or the like. The flying carpet FC is displayed to accompany the body B in the vicinity of the body B. In the example illustrated in Type C in FIG. 27, the flying carpet FC is displayed below the body B. Tassels TR are disposed at corners of the flying carpet FC. The tassels TR may operate in accordance with a change in the state of the user. In addition, the flying carpet FC may operate in accordance with basic biological presence information of the user. Furthermore, objects other than the flying carpet FC may be additionally displayed in the vicinity of the body B. In addition, accompanying objects such as the flying carpet FC may be displayed on the upper side or the lateral side of the body B. As illustrated in Type D in FIG. 27, the character C may wear a hat HT. A wing W is provided in the hat HT. The wing W may operate on the basis of the basic biological presence information of the user.

Figure 28:
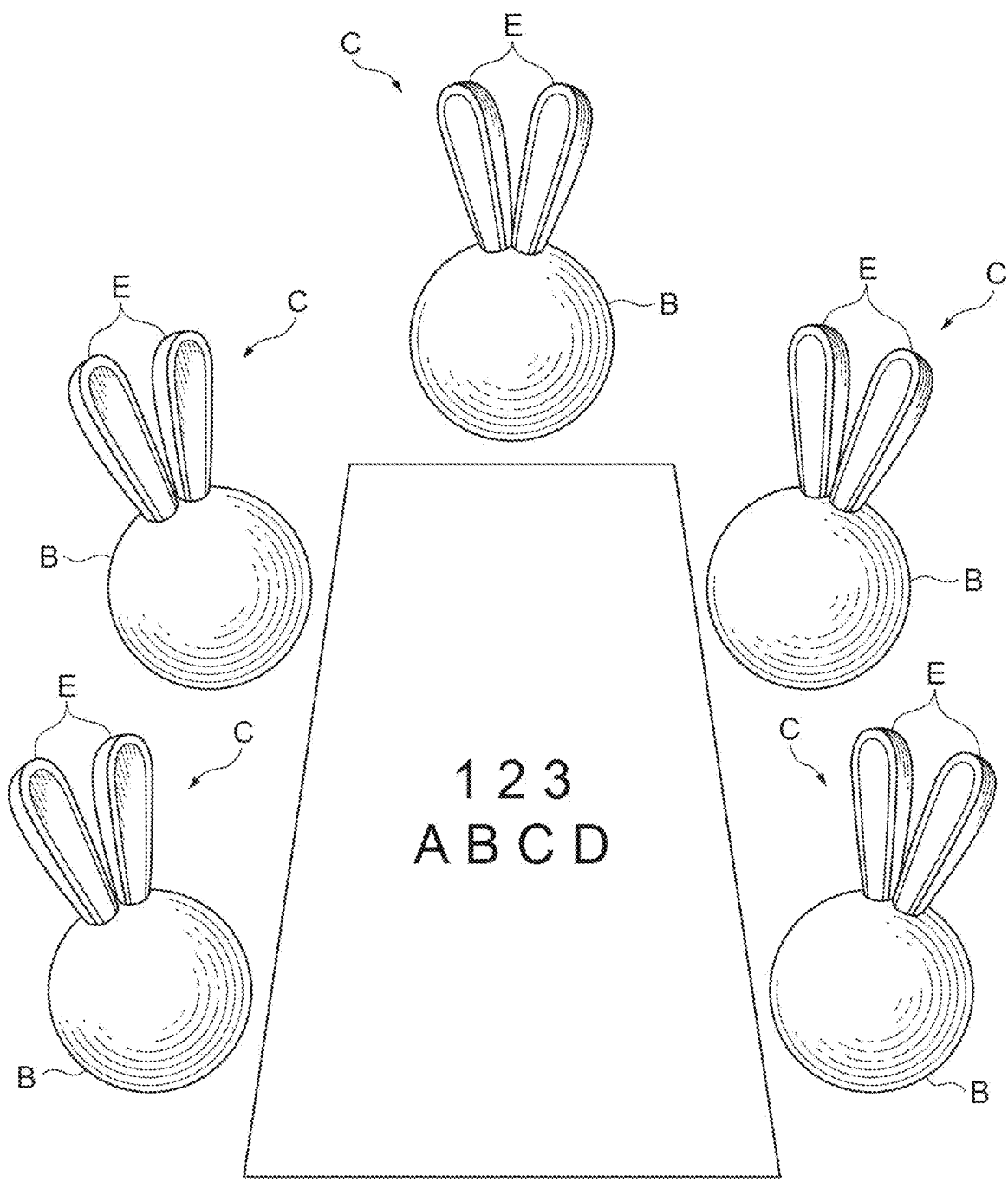
FIG. 28 is a diagram illustrating an example of communication according to a modified example.

In the embodiment described above, as illustrated in FIG. 25, a form in which the characters C1, C2, and C3 are displayed to surround the table T and face each other has been described as an example. However, as illustrated in FIG. 28, a plurality of characters C may be displayed to surround a white board WB. Each user may write text (for example, "1, 2, 3 . . . ", "A, B, C, D . . . ", and the like) or display an image or the like on the white board WB. The positions and the sizes of the characters C for the white board WB may be freely changed.

Figure 29:
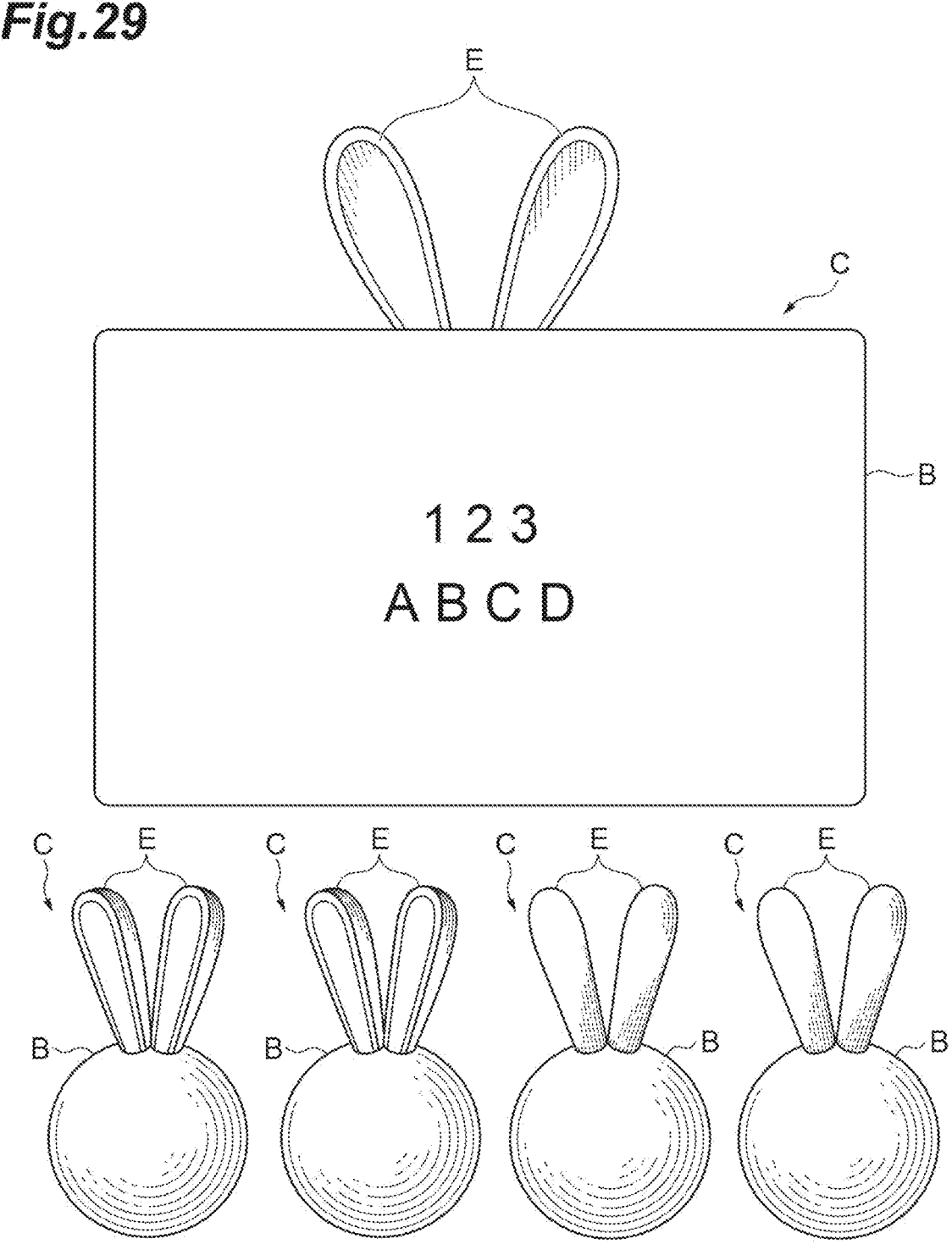
FIG. 29 is a diagram illustrating an example of communication according to a modified example.

In addition, as illustrated in FIG. 29, a body B of one character C among a plurality of characters C may be used as a display, and the character C may be displayed to be enlarged, and the other characters may be displayed to be disposed before the character C. Text (for example, "1, 2, 3 . . . ", "A, B, C, D . . . ", and the like), an image, or the like may be displayed on the display. The orientations of the characters C other than the character C that is displayed to be enlarged may be arbitrarily set by the user. For example, the character C may have his or her back displayed to be in a direction for seeing the display or may be displayed to be turned to the front face away from the display, or the characters may be displayed to face each other.

Figure 30:
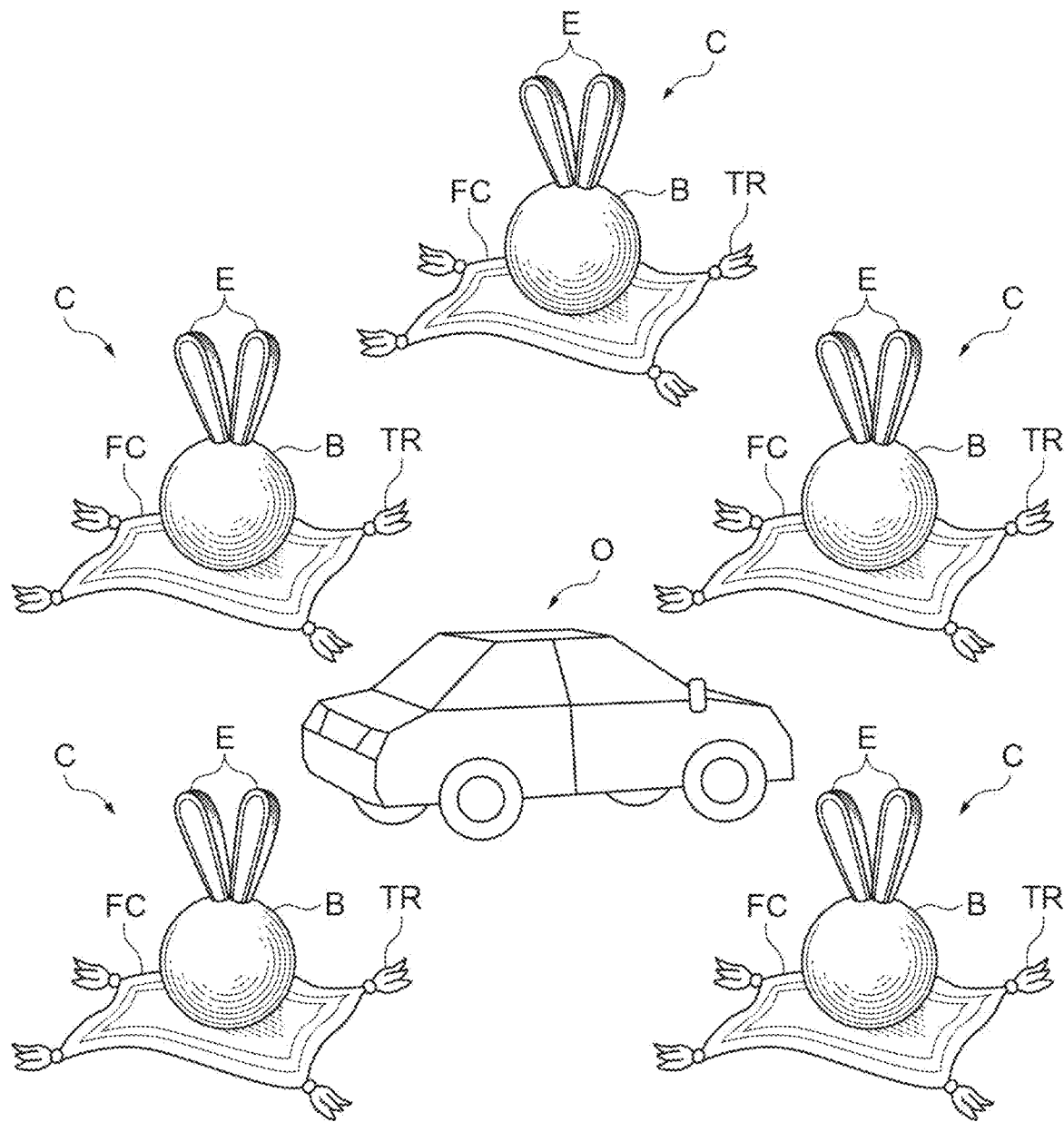
FIG. 30 is a diagram illustrating an example of communication according to a modified example.

In addition, as illustrated in FIG. 30, for example, a plurality of characters C riding on a flying carpet FC may be displayed to surround an object O. The object O, for example, is a target (for example, a car or the like) that is an agenda of a conference. The orientation of the object O may be configured to be arbitrary changeable for each user. In this case, only the orientation of the object O displayed for a user who has changed the orientation of the object O may be changed, or when one user changes the orientation of the object O, the orientation of the object O displayed for all the users may be changed. In addition, only a user set in advance may be able to change the orientation of the object O. Furthermore, a point of view for the object O displayed for each user may be changed in accordance with a change in the position of the character C.

Figure 31:
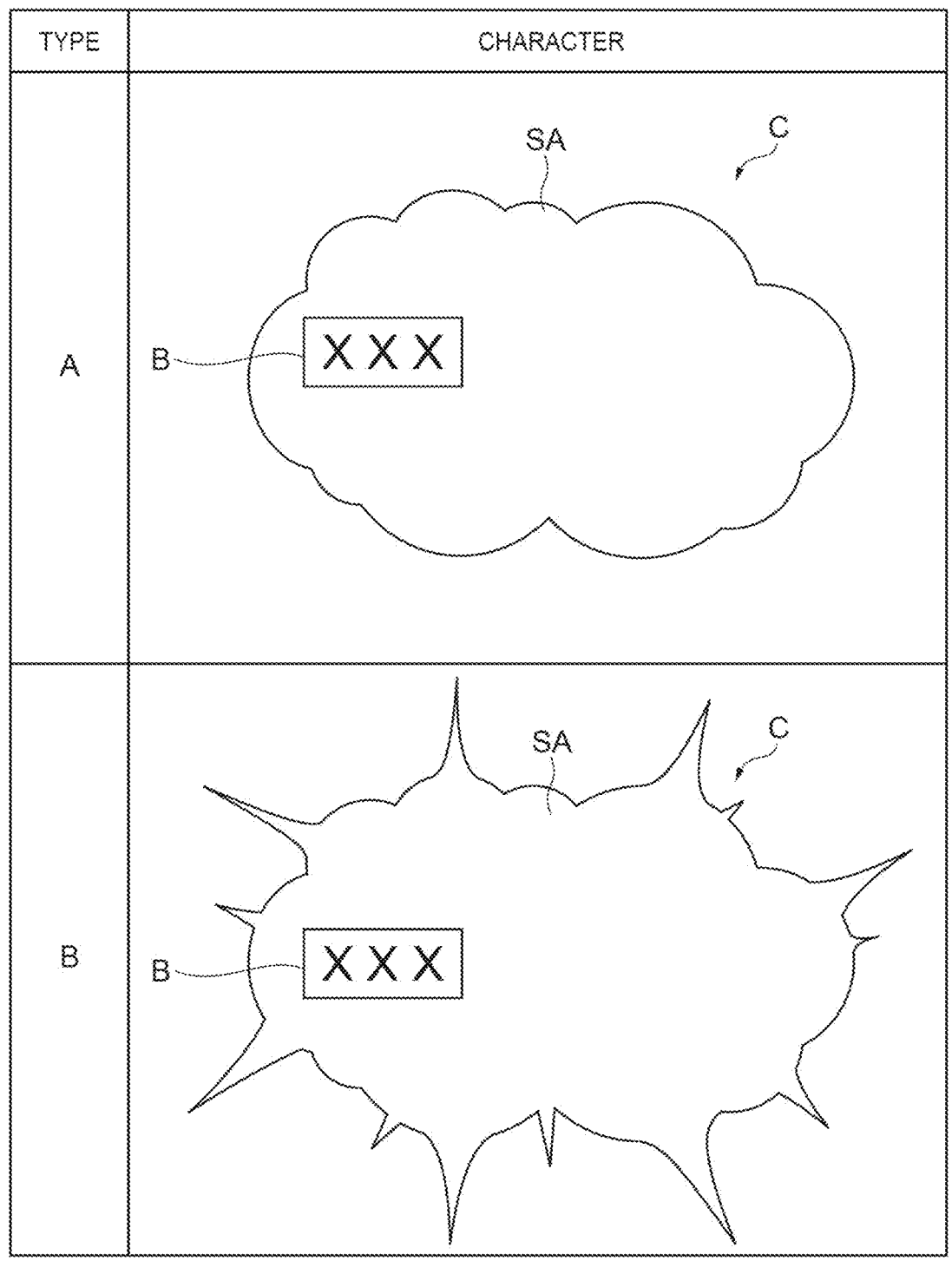
FIG. 31 is a diagram illustrating a character according to a modified example.

In the embodiment described above, a form in which the state animation is displayed to protrude from a display area to an outer side of the display area of the icon B or is displayed to accompany the body B in the vicinity of the body B has been described as an example. However, the state animation may be displayed integrally with identification information. As illustrated in FIG. 31, the character C may imitate a cloud. The character C is configured to include an icon B and a state animation SA. As illustrated in Type A in FIG. 31, the icon B is displayed, for example, inside the state animation SA. The state animation SA of the character C operates in accordance with a change in the state (a feeling or an operation) of the user, an operation of the user, and the like. For example, as illustrated in Type B in FIG. 31, in a case in which the state of the user is "anger", a part of the state animation SA of the character C protrudes. The character C is not limited to imitating the cloud and may imitate various objects that are not limited to tangible objects or intangible objects.

The designs of the characters C1, C2, and C3 and the operations of the ear animation E, the arm animation A, and the leg animation F can be set (changed) by the users U1, U2, and U3. The character may be drawn using computer graphics according to a combination of two dimensions and three dimensions. In addition, the design of the character may be updated (changed, added or the like) in accordance with an update of data or the like.

In the embodiment described above, as illustrated in FIG. 2 or 25, a form in which the characters C1, C2, and C3 of all the users U1, U2, and U3 participating in communication are displayed on the phone call screen G has been described as an example. However, only characters of users who are communication targets may be displayed on the phone call screen. For example, only the character C2 of the user U2 and the character C3 of the user U3 may be displayed on the phone call screen G of the terminal 10 of the user U1.

Second Embodiment

Subsequently, a second embodiment will be described. In a communication assistance system according to the second embodiment, a communication target is an artificial intelligence (AI) assistant. The AI assistant, for example, is Siri (registered trademark), Google assistant (registered trademark), Alexa (registered trademark), Cortana (registered trademark), or the like. An example of communication of a system according to the second embodiment includes exchange with the AI assistant.

The system includes a terminal (terminal device) 50. The terminal 50 may be a laptop personal computer (PC), a mobile phone (a smartphone or the like), or a desk top PC, and a tablet terminal, a wearable terminal, a head mount display (HMD) terminal, a smart speaker with a display, or any of various terminals may be used. As illustrated in FIG. 1, the terminal 50 can communicate with a server 40 through a network N. The terminal 50 has a configuration similar to the terminal 10.

Figure 32:
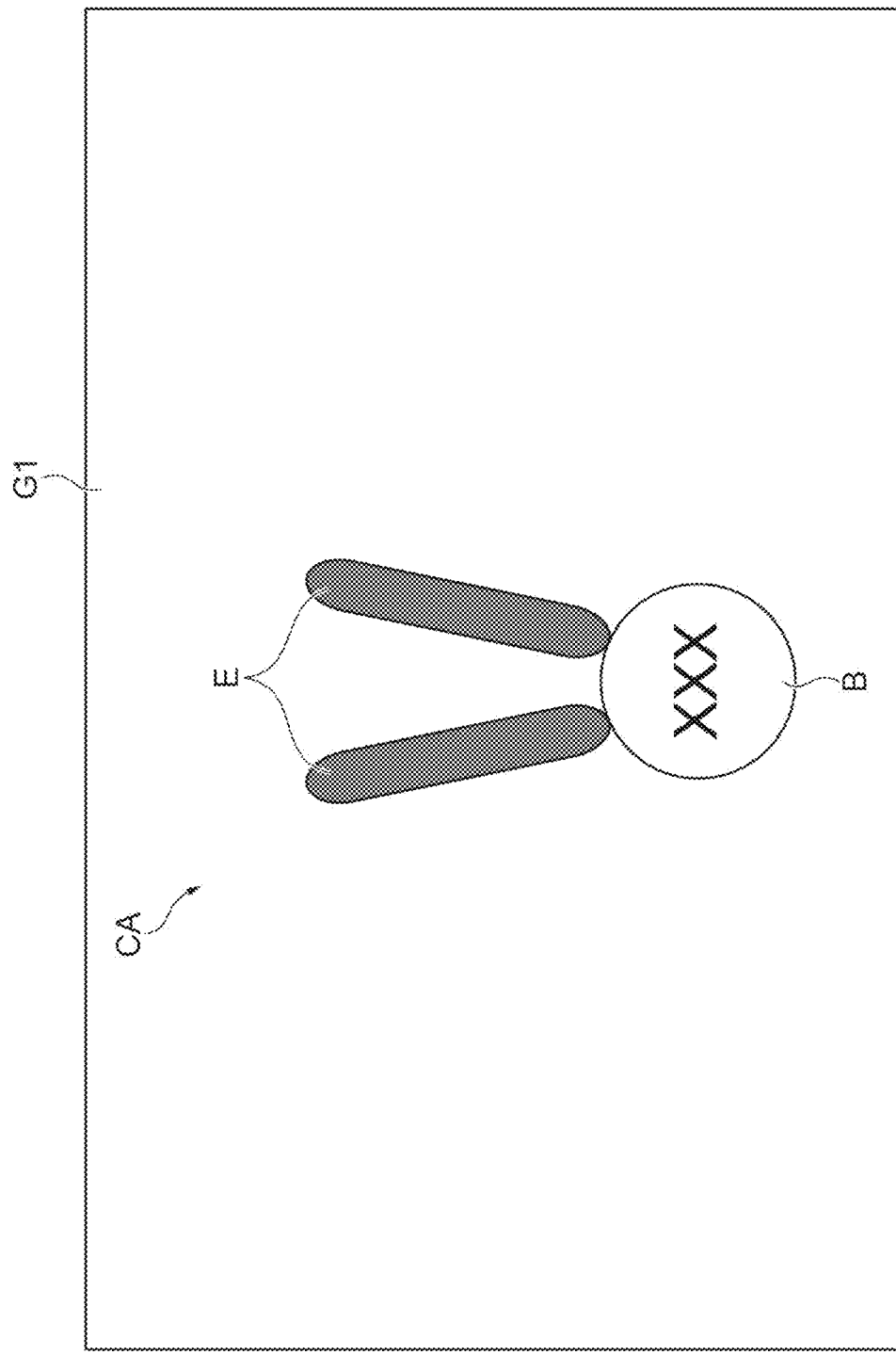
FIG. 32 is a diagram illustrating an example of communication provided by a communication assistance system according to a second embodiment.

As illustrated in FIG. 32, communication is performed on a screen G1 (an output unit 15) expressed by a computer. The screen G1 is displayed in the terminal 50, thereby being presented to a user. In the example illustrated in FIG. 32, a character CA of an AI assistant appears on the screen G1. The character CA represents the AI assistant on the screen G1. The character C is a dynamic character. The character CA may be drawn using two-dimensional or three-dimensional computer graphics (CG). The character CA is configured to include an icon B and an ear animation E. In the character CA, the icon B and the ear animation E are integrally displayed on the screen G1.

The icon B is identification information that can be used for identifying an AI assistant that is a communication target. The icon B includes at least one of an image representing the AI assistant and text representing a user. In the example illustrated in FIG. 32, the icon B shows a circular shape and includes text (for example, "XXX") that can be used for identifying a user. The ear animation E is a state animation that represents a state of the AI assistant. The ear animation E operates in accordance with at least one of a feeling and an operation of the AI assistant and voice data of a user using the AI assistant.

A control unit 12 is a part that generates control data of AI. The control unit 12 generates control data of a character CA on the basis of at least one of voice data (language data) of AI and appearance data representing an appearance of the AI and a voice and an action of the user using the AI assistant. An operation of the user may be included in the action of the user using the AI assistant. The control unit 12, for example, estimates a state of the AI assistant using the following operations as a trigger and generates control data.

Keywords ("I don't know!", "Please say it again", or the like) spoken by the AI assistant Keywords (a name of the AI assistant, "hey", "hi", or the like) spoken by the user Operation of user (approaching to the terminal 50, separating away from the terminal 50, or the like)

The control unit 12 estimates the state of the AI assistant using a learned model 13L. By inputting voice data (text) of the AI assistant and action data (voice data and the like) of the user to the learned model 13L, the control unit 12 obtains an estimation result based on the data. The control unit 12 estimates the state of the AI assistant on the basis of the estimation result of the learned model.

The control unit 12 generates control data for controlling the operation of the ear animation E on the basis of the estimated state of the AI assistant. For example, in a case in which the AI assistant speaks "I don't know!", the control unit 12 generates control data of inclining ears to one of the left side and the right side in an ear animation E of the character CA. For example, in a case in which details such as "disagreement" and "prohibition" are included in a reply to a question from a user, the control unit 12 generates control data for maintaining a state in which the ears are crossed for a predetermined time.

For example, in a case in which the user speaks "a name (for example, "XXX") of the AI assistant", the control unit 12 generates control data for causing the ears to stand up in the ear animation E of the character CA. In a case in which the user is giving words (a question or the like), the AI assistant is in a listening state, and thus the control unit 12 generates control data for repeating to bend upper ⅓ parts of the ears back and forth. For example, in a case in which a user approaches the terminal 50 or in a case in which a user is separated away from the terminal 50, the control unit 12 generates control data for horizontally shaking the ears in the ear animation E of the character CA. In addition, in a case in which the AI assistant is in the standby state, the control unit 12 may generate control data for horizontally shaking the ears in the ear animation E or generate control data for changing the color of the ears.

Conventionally, the AI assistant uses only a voice or displays an abstract video. In this case, it is difficult to convey the feeling of the AI assistant to a user, and thus a sense of presence of a conversation is insufficient. In addition, in the case of a mechanical reply such as "I don't know" from the AI assistant, a user feels an artificial conversation. On the other hand, when a specific character (an animation, an avatar, or the like) is set in the AI assistant, an uncomfortable feeling may occur. In addition, an analysis method for a character such as an animation is different in accordance with age, gender, and the like, and thus reliability of the character is insufficient, or familiarity thereof is insufficient.

Thus, the control unit 12 of the terminal 50 displays a character CA including the icon B and the ear animation E indicating the state of the AI assistant on the screen G1. The ear animation E can give a neutral impression in terms of age and a sexual difference. In addition, the state of the AI assistant can be recognized using the ear animation E. Thus, smooth communication between the AI assistant and the user can be realized.

The present disclosure can be also applied to the following forms.

(1) Application to Telephone

In a conventional telephone, non-verbal information is not displayed. By applying the present disclosure, non-verbal information can be visually generated from a sound of the telephone. A communication target (another user) and his or her own state animation can be displayed integrally with identification information, and thus a visual effect is added to a telephone voice, and richer communication is generated. In addition to the state animation, material information and a white board function for sharing writing can be simultaneously provided, and thus a conventional "listening telephone" can be regarded as being transformed into a "viewing telephone" for viewing a feeling, information, and the like. Furthermore, a telephone conference can be transformed into a visual conference in which non-verbal information is added.

(2) Application to Voice Chatting

Similar to a telephone, by performing voice recognition of voice chatting of a plurality of persons, identification information of each person and a state animation can be integrally displayed. For the identification information and the state animation, a design prepared as a standard may be used, or an independent design may be installed and used. Not only words but also songs can be provided as operation rendering. By integrally displaying the identification information and the state animation, person recognition of participants and a speech generation person of voice chatting and recognition of non-verbal information of a speech generation person and participants can be performed, and communication richer than chatting only using voices can be realized. In addition, personal information of faces can be hidden.

In addition, software of which a processing load is lighter than that in the case of an avatar having facial expressions having reality can be used, and a transmission volume can be decreased. Regarding facial expressions of an avatar, a problem of so-called "uncanny valley" occurs. In addition, when an animation face is used, the age and the like are hidden, and information may be easily misunderstood. As a result, manipulative information may be obtained. In this way, according to the present disclosure, a problem occurring due to animation faces that are independently designed can be avoided.

(3) Application to Conversation in Cyber Space, VR Space, AR Space, and MR Space Conventionally, in remote conversation participation in a VR space using an HMD or a smart glass, person-type avatars are used. However, in many cases, non-verbal information such as feeling information is not sufficiently conveyed. In case of avatars, a processing load for smooth control of facial expressions of each person increases. Faces, facial expressions, and the like can be freely designed, that is, the design can be freely performed, which enables an excessive manipulation of an impression that is originally desired to be conveyed. In accordance with this, a harmful effect such as conveyance of information far from reality may occur. In entertainment such as a game, although there are cases in which free designability shows a positive effect, there is a problem in that a manipulative expression can be performed in an interview or a conference in works or the like. For example, an expression far from reality such as age or the like can be performed. According to the present disclosure, such a manipulative design can be excluded, and non-verbal information can be conveyed to be easily understood. Particularly, a non-verbal expression is performed using the ear animation E, which protrudes to an upper part of identification information, imitating ears, a feeling and non-verbal information can be easily recognized even from the rear side of a target person or a far place, and a communication space having a high sense of presence can be generated. For example, when a presenter is applauded using both ears in the ear animation E, it also leads to elation, a sense of fulfillment, and a sense of accomplishment of the presenter. In addition, it leads to a meeting, transitions to a light talk, or activates the conversation. Particularly, by automatically generating a state animation from voice information, operation information, and the like of a user, non-verbal information can be expressed without efforts. Furthermore, in a case in which the arrangement of 3D characters can be freely changed (moved) in a VR space, by integrally displaying a character and an accompanying object having a feeling of air floating such as a carpet, a natural feeling of air floating presence inside the VR space can be created.

According to another point of view, the present disclosure is a non-verbal expression program causing a computer to perform: a step of inputting at least one of voice data, image data, video data, music data, sensing data, and operation input data; a step of transforming the data into an animation as a non-verbal expression; and a step of integrally displaying identification information representing a target relating to the data and the animation.

The non-verbal expression program described above causes the computer to perform: a step of estimating a state of the target on the basis of the data; and a step of generating control data used for controlling an operation of the animation on the basis of the state of the target.

The animation described above may be displayed on an outer side of a display area of the identification information to protrude from the display area or may be displayed in the vicinity of the display area of the identification information to accompany the display area. In addition, the animation described above does not include a facial expression that dynamically changes.

The non-verbal expression program performs rendering of input data into an animation (for example, the ear animation). The input data is at least one of voice data (including music), image data, video data, sensing data, and operation input data. The sensing data, for example, is data detected by a wearable sensor (an acceleration sensor, a myoelectric sensor, or the like). The operation input data is data that is input by a user's operation in a device such as a terminal.

For example, when voice data of a radio is input, the non-verbal expression program performs rendering of details of the radio into an animation not including a facial expression that dynamically changes. More specifically, the non-verbal expression program estimates a state of a target on the basis of voice data. In the case of a radio, the target is a personality or the like. The non-verbal expression program generates control data (a code) for controlling the operation of the animation on the basis of the state of the target. In addition, the non-verbal expression program generates identification information representing a target relating to voice data by analyzing the voice data on the basis of the voice data. For example, in a case in which an interview is performed by two personalities in a radio, the two personalities are identified, and identification information of each personality is generated. The non-verbal expression program integrally displays the identification information and the animation.

The animation may be displayed on an outer side of a display area of the identification information to protrude from the display area (see FIGS. 4, 19, and the like) or may be displayed in the vicinity of the display area of the identification information to accompany the display area (see Type C illustrated in FIG. 27). In accordance with this, for example, in a case in which an interview is performed by two personalities in a radio, ear animations of characters of two persons can be configured to be displayed with linkage to a voice (voice recognition is also operated). Other than the radio, video data such as YouTube (registered trademark) can be input.

In addition, when music data is input, the non-verbal expression program performs rendering of details (lyrics and a rhythm) of music into an animation. More specifically, the non-verbal expression program estimates a state of a target on the basis of voice data. The target described here is a rhythm, a tempo, lyrics, and the like of music. In other words, as the state of music, happiness, sadness, brightness, darkness, or the like can be estimated. The non-verbal expression program generates control data (a code) for controlling the operation of the animation on the basis of the estimated state. In addition, the non-verbal expression program generates identification information on the basis of voice data. The identification information, for example, can be configured to be a title or the like of music. The non-verbal expression program integrally displays the identification information and the animation. In accordance with this, the ear animation can be caused to play performance on the basis of details of music. The rendering may be creation of an image in a cyber space using AI, or acceleration sensors or the like may be worn around both wrists of targets such as actual singers, dancers, and the like, and the movement of the ear animation may be linked to the movement of the acceleration sensors, that is, changes in the wrists. In the case of linkage, the identification information may be set as a name or the like of a singer or a dancer. Other changes such as myoelectricity of wrists and brain waves may be sensed using various means other than the acceleration sensors, and rendering may be performed.

REFERENCE SIGNS LIST 10 terminal (terminal device)
11 input unit (sensor)
12 control unit
13 storage unit
13L learned model
13P terminal program (communication assistance program)
14 communication unit
15 output unit
20 terminal (terminal device)
30 terminal (terminal device)
40 server
42 control unit
43 storage unit
43P server program
43S reception data
44 communication unit
50 terminal (terminal device)
100 communication assistance system
A arm animation
B icon, body
AP access point
BS base station
C character
C1 character
C2 character
C3 character
CA character
CP cap
E ear animation (state animation)
F leg animation
FC flying carpet
G phone call screen
G1 screen
GC visual line match information
GR visual line reception information
GT visual line transmission information
H speech generation animation
HT hat
N network
O object
S1 step
S2 step
S3 step
S4 step
S5 step
S6 step
S7 step
S8 step
S9 step
S10 step
S11 step
S12 step
S13 step
S21 step
S22 step
S23 step
S24 step
S25 step
S26 step
S27 step
SA state animation
T table
TR tassel
U1 user
U2 user
U3 user
W wing
WB white board

The invention claimed is:

1. A non-transitory computer readable medium including executable instructions, which when executed by a computer cause the computer to:
   receive data from a target user, the data including at least one of image data and video data;
   generate an icon that includes identification information representing the target user;
   transform the received data into an animation graphics that moves based on the at least one of image data and video data as a non-verbal expression; and
   integrally display, on a screen, the animation graphics and the icon, the animation graphics and the icon being two separate graphics,
   wherein the animation graphics is displayed on the screen such that the animation graphics extends upward from the icon to an outside of the icon.

2. The non-transitory computer readable medium according to claim 1, wherein the computer is caused to perform:
   a step of estimating a state of the target user on the basis of the data; and
   a step of generating control data used for controlling an operation of the animation graphics on the basis of the state of the target user.

3. The non-transitory computer readable medium according to claim 1, wherein the animation graphics does not include a facial expression that dynamically changes.

4. The non-transitory computer readable medium according to claim 1, wherein the animation graphics is an animation of the upward extending portion undergoing a deformation operation on the basis of the operation pattern selected from a plurality of operation patterns set to control an operation of the animation graphics so as to cause another user to imagine a state of the target user.

5. The non-transitory computer readable medium according to claim 4, wherein the animation graphics is operated to change from an initial state of the portion extending upward into the selected operation pattern.

6. The non-transitory computer readable medium according to claim 1, wherein the transformation of the data to the animation graphics is performed by creation of an image by AI.

7. The non-transitory computer readable medium according to claim 1, wherein the executable instructions, which when executed by the computer cause the computer to: generate the icon based on voice data.

8. The non-transitory computer readable medium according to claim 1, wherein the icon is capable of at least one of deformation, rotation and movement.

9. The non-transitory computer readable medium according to claim 1, wherein a shape of the animation graphics is transformed in accordance with the state of the target user.

10. The non-transitory computer readable medium according to claim 1, wherein the animation graphics is an animation imitating ears and operates in accordance with a change in the state of the target user.

11. The non-transitory computer readable medium according to claim 1, wherein the animation graphics extends upward directly from the icon to an outside of the icon, the animation graphics and the icon being connected.

12. A non-transitory computer readable medium including executable instructions, which when executed by a computer cause the computer to:
   receive data from a target user, the data including at least one of image data and video data;
   generate an icon that includes identification information representing the target user;
   transform the received data into an animation graphics that moves based on the at least one of image data and video data as a non-verbal expression; and
   integrally display, on a screen, the animation graphics and the icon, the animation graphics and the icon being two separate graphics, wherein
   the animation graphics is displayed on the screen such that the animation graphics extends upward from the icon to an outside of the icon,
   the animation graphics does not include a facial expression that dynamically changes, and
   the animation graphics is an animation imitating ears and operates in accordance with a change in the state of the target user.

13. The non-transitory computer readable medium according to claim 12, wherein the computer is caused to perform:
   a step of estimating a state of the target user on the basis of the data; and
   a step of generating control data used for controlling an operation of the animation graphics on the basis of the state of the target user.

14. The non-transitory computer readable medium according to claim 12, wherein the animation graphics is an animation of the upward extending portion undergoing a deformation operation on the basis of the operation pattern selected from a plurality of operation patterns set to control an operation of the animation graphics so as to cause another user to imagine a state of the target user.

15. The non-transitory computer readable medium according to claim 14, wherein the animation graphics is operated to change from an initial state of the portion extending upward into the selected operation pattern.

16. The non-transitory computer readable medium according to claim 12, wherein the transformation of the data to the animation graphics is performed by creation of an image by AI.

17. The non-transitory computer readable medium according to claim 12, wherein the executable instructions, which when executed by the computer cause the computer to: generate the icon based on voice data.

18. The non-transitory computer readable medium according to claim 12, wherein the icon is capable of at least one of deformation, rotation and movement.

19. The non-transitory computer readable medium according to claim 12, wherein a shape of the animation graphics is transformed in accordance with the state of the target user.

20. The non-transitory computer readable medium according to claim 12, wherein the animation graphics extends upward directly from the icon to an outside of the icon, the animation graphics and the icon being connected.

* * * * *